United States Patent
Iwasaki

(10) Patent No.: US 8,052,315 B2
(45) Date of Patent: *Nov. 8, 2011

(54) PLANAR ILLUMINATION DEVICE

(75) Inventor: Osamu Iwasaki, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 215 days.

This patent is subject to a terminal disclaimer.

(21) Appl. No.: 12/375,388

(22) PCT Filed: Jul. 30, 2007

(86) PCT No.: PCT/JP2007/064880
§ 371 (c)(1),
(2), (4) Date: Jan. 27, 2009

(87) PCT Pub. No.: WO2008/013304
PCT Pub. Date: Jan. 31, 2008

(65) Prior Publication Data
US 2009/0303744 A1 Dec. 10, 2009

(30) Foreign Application Priority Data

Jul. 28, 2006 (JP) ................. 2006-206787
Nov. 2, 2006 (JP) ................. 2003-299310
Dec. 28, 2006 (JP) ................. 2006-355487

(51) Int. Cl.
*F21V 7/04* (2006.01)

(52) U.S. Cl. ........ 362/609; 362/615; 362/628; 362/623; 362/608; 362/621

(58) Field of Classification Search .......... 362/615–629, 362/612–613, 97.1–97.3, 608–609; 349/62, 349/65, 69
See application file for complete search history.

(56) References Cited

U.S. PATENT DOCUMENTS
5,986,727 A 11/1999 Fukui et al.
(Continued)

FOREIGN PATENT DOCUMENTS
| JP | 07-036037 A | 2/1995 |
| JP | 08-248233 A | 9/1996 |
| JP | 08-271739 A | 10/1996 |
| JP | 09-274807 A | 10/1997 |
| JP | 11-133419 A | 5/1999 |

(Continued)

OTHER PUBLICATIONS

International Preliminary Report on Patentability and Written Opinion, mailed Feb. 3, 2009, issued in corresponding International Application No. PCT/JP2007/064880, 10 pages.

*Primary Examiner* — Robert May
(74) *Attorney, Agent, or Firm* — Sughrue Mion, PLLC

(57) ABSTRACT

It is an object to provide a planar illumination device that is thin and light weight, and can emit uniform illumination light with little brightness unevenness and can be enlarged in size. It is to provide a planar illumination device comprising: a first light source and a second light source which are arranged at predetermined intervals; and a light guide plate which is arranged between the first light source and the second light source and has: a light exit surface; a first light incident surface which is opposed to the first light source and includes a side of the light exit surface; a second light incident surface which is opposed to the second light source and includes an opposite side to the side; and a rear surface which is formed to be opposed to the light exit surface, wherein a cross section on a plane perpendicular to the side, of the rear surface of the light guide plate has a curved line in which a distance from the light exit surface increases with a shift from the first light incident surface and the second light incident surface to a center, an inclined angle relative to the light exit surface reduces with a shift from the first light incident surface or the second light incident surface to the center, and the inclined angle relative to the light exit surface is zero degrees at the center.

20 Claims, 26 Drawing Sheets

U.S. PATENT DOCUMENTS

| | | | |
|---|---|---|---|
| 5,993,020 A | 11/1999 | Koike | |
| 6,217,184 B1 | 4/2001 | Koike et al. | |
| 6,871,972 B2 | 3/2005 | Ju | |
| 6,871,973 B2 | 3/2005 | Ju | |
| 7,244,059 B2 * | 7/2007 | Onishi | 362/628 |
| 7,360,937 B2 | 4/2008 | Han et al. | |
| 2003/0012008 A1 | 1/2003 | Chang et al. | |
| 2004/0100788 A1 | 5/2004 | Ju | |
| 2004/0100789 A1 | 5/2004 | Ju | |
| 2005/0180167 A1 * | 8/2005 | Hoelen et al. | 362/613 |
| 2005/0201706 A1 | 9/2005 | Iwasaki | |

FOREIGN PATENT DOCUMENTS

| | | |
|---|---|---|
| JP | 11-153963 A | 6/1999 |
| JP | 11-307241 A | 11/1999 |
| JP | 2001-093318 A | 4/2001 |
| JP | 2001-281655 A | 10/2001 |
| JP | 2003-279977 A | 10/2003 |
| JP | 2003-344852 A | 12/2003 |
| JP | 2004-117594 A | 4/2004 |
| JP | 2004-171948 A | 6/2004 |
| JP | 2004-186124 A | 7/2004 |
| JP | 2005-215171 A | 8/2005 |

* cited by examiner

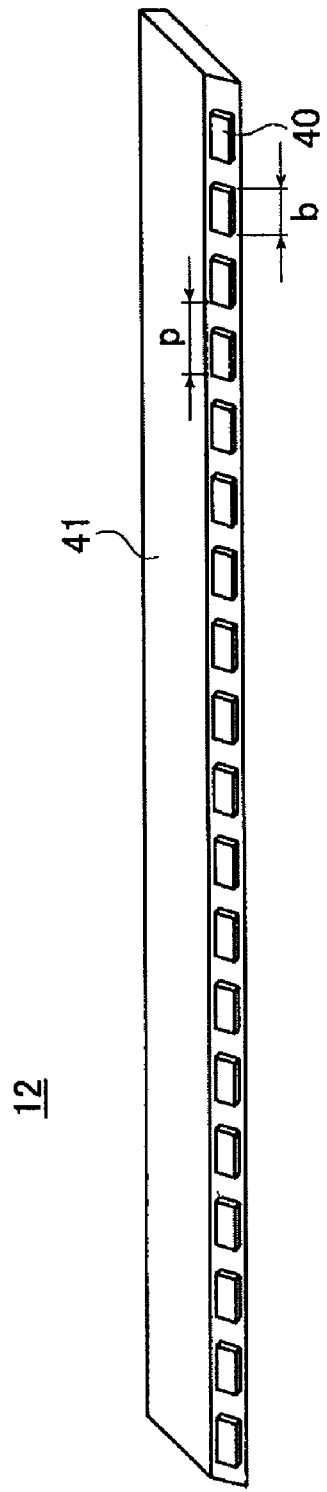
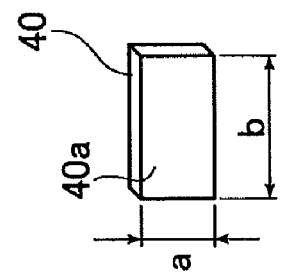
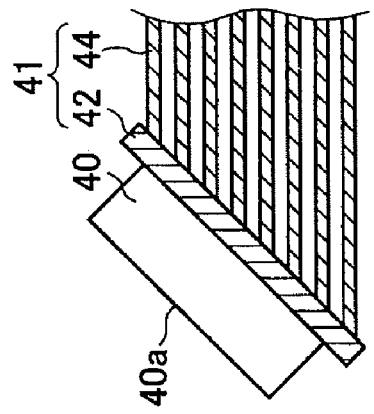
FIG. 4A
FIG. 4C
FIG. 4B

FIG.5A
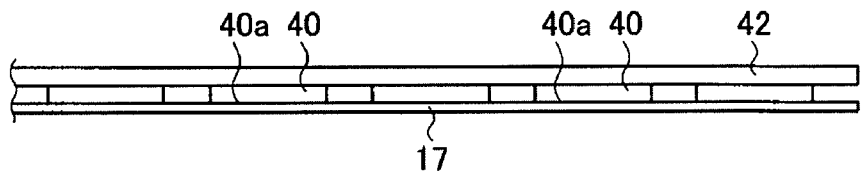
FIG.5B  FIG.5C
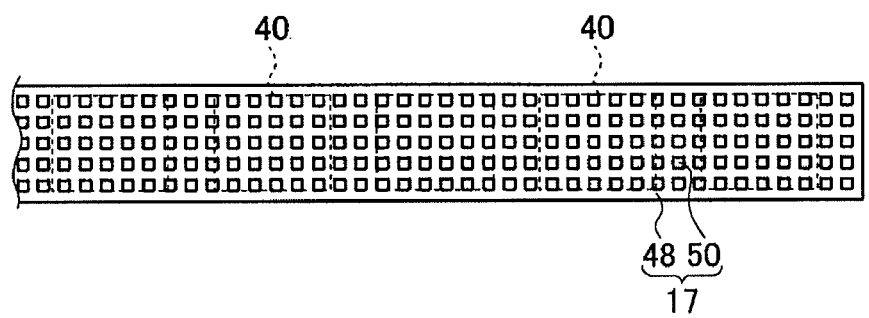 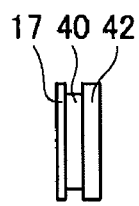
FIG.6
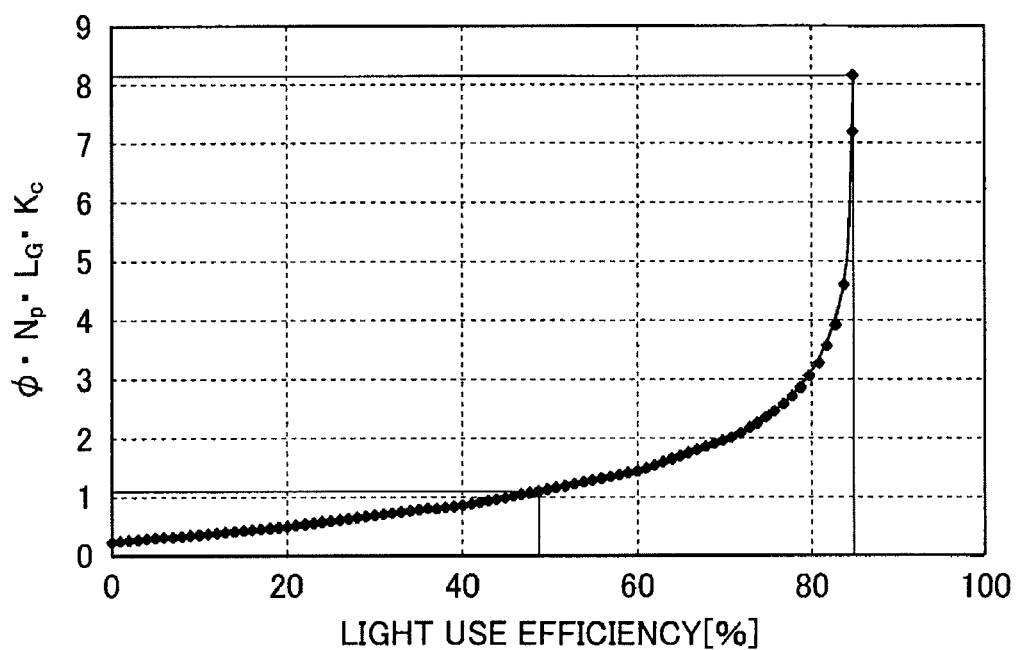

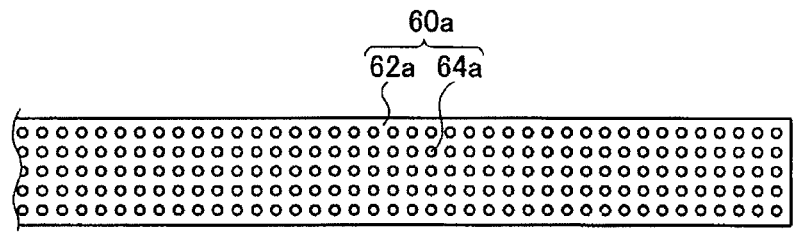
FIG.13A
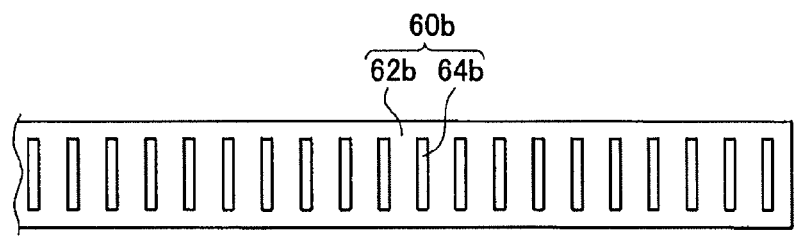
FIG.13B
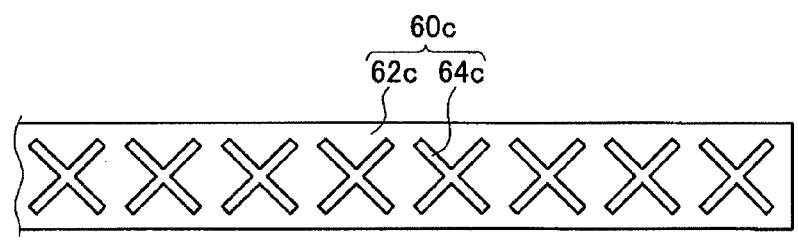
FIG.13C
FIG.14
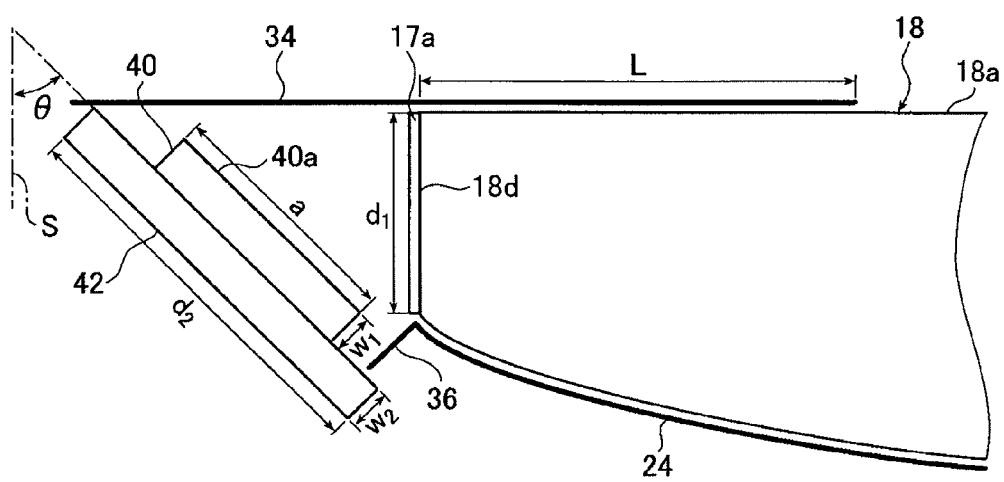

FIG.15A
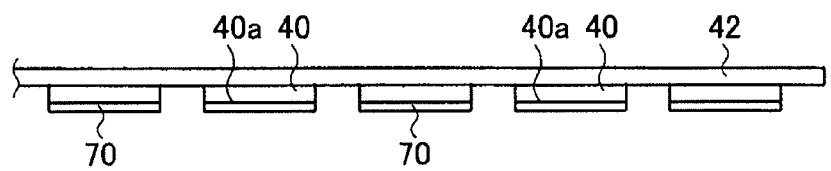
FIG.15B    FIG.15C
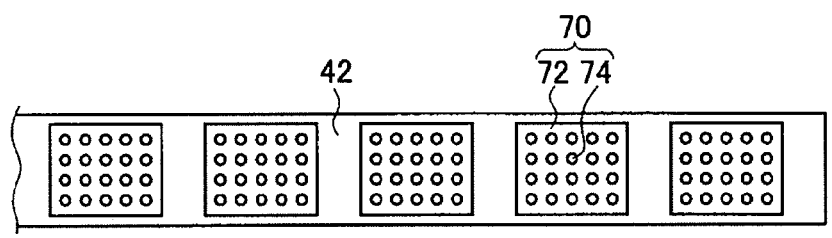 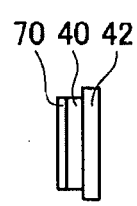
FIG.16A
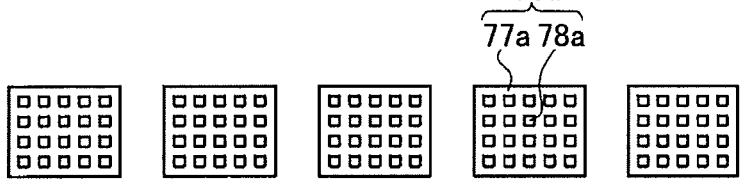
FIG.16B
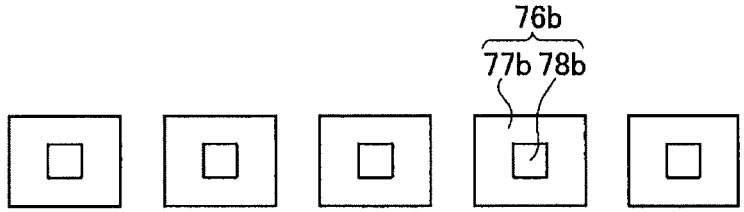
FIG.16C
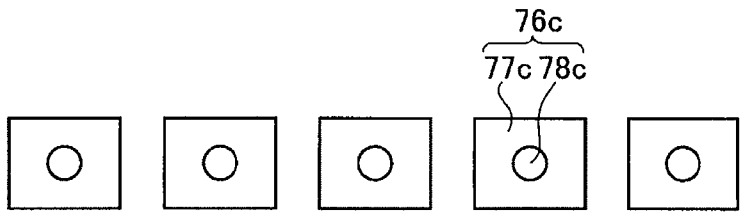

PLANAR ILLUMINATION DEVICE

TECHNICAL FIELD

The present invention relates to a planar illumination device including a light guide plate for diffusing light emitted from a light source to emit illumination light from a light exit surface, and more particularly, to a planar illumination device which is used as a planar illumination device for illuminating indoors and outdoors, a backlight unit for illuminating a liquid crystal display panel of a liquid crystal display device, or a backlight unit for an advertising panel, an advertising tower, a signboard, or the like.

BACKGROUND ART

For a liquid crystal display device, a backlight unit that emits light from a backside of a liquid crystal display panel to illuminate the liquid crystal display panel has been used. The backlight unit is configured by using a light guide plate for diffusing light emitted from a light source for illumination to illuminate the liquid crystal display panel, and optical members such as a prism sheet and a diffusion film for uniformizing the light emitted from the light guide plate.

The current mainstream of a backlight unit of a large-size liquid crystal television set is a so-called direct type system in which the light guide plate is not provided and an optical member such as a diffusion plate is provided just above a light source for illumination. In the system, a plurality of cold cathode tubes serving as light sources are arranged to a rear surface of the liquid crystal display panel and a white reflection surface is provided in an inner portion to ensure a uniform light amount distribution and necessary brightness.

In order to obtain the uniform light amount distribution in the direct type backlight unit, a thickness in a direction perpendicular to the liquid crystal display panel is required to be a predetermined thickness, for example, approximately 30 mm. A thinner backlight unit may be desired in the future. However, according to the direct underneath type, in view of light amount unevenness, it may be difficult to realize a backlight unit having a thinner thickness, for example, a thickness equal to or smaller than 10 mm.

Therefore, a backlight unit using a light guide plate in which scattering particles for scattering light are mixed into a transparent resin is proposed (see, for example, JP 07-36037 A, JP 08-248233 A, JP 08-271739 A, or JP 11-153963 A).

For example, JP 07-36037 A discloses a light scattering guide light source device characterized by including: a light scattering guide having at least one light incident surface region and at least one light extraction surface region; and a light source means for causing light to be incident on the light incident surface region, in which the light scattering guide has a region whose thickness is reduced with an increase in distance from the light incident surface region.

JP 08-248233 A discloses a plane light source device which includes: a light scattering guide; a prism sheet provided on a light extraction surface side of the light scattering guide; and a reflector provided on a rear surface side of the light scattering guide. JP 08-271739 A discloses a liquid crystal display provided with a light exit direction adjustment element which includes a light incident surface having prism-row-shaped repeated unevenness and a light exit surface with light diffusion and is made of a plate-shaped optical material. JP 11-153963 A discloses a light source device which includes a light scattering guide whose inner portion has scattering power and a light supply means for supplying light from an end surface portion of the light scattering guide.

In the planar illumination devices as described above, light which is emitted from the light source and enters the light scattering guide from the light incident surface undergoes a single or multiple scattering action at a constant rate while the light propagates through the inner portion thereof. A substantial part of the light which reaches both surfaces of the light scattering guide or a surface of the reflector undergoes a reflection action to return to the inner portion of the light scattering guide.

During such a complex process, a light beam emitted from the light extraction surface at high efficiency is produced with the directivity to a forward oblique direction as viewed from a direction of the light source. In other words, the light emitted from the light source is emitted from the light extraction surface of the light scattering guide.

As described above, it is disclosed that the uniform light may be emitted at high emission efficiency when the light guide plate mixed with the scattering particles is used.

A planar illumination device is disclosed in which, in addition to a light guide plate having a region whose thickness is reduced with an increase in distance from the light incident surface, a flat-shaped light guide plate, or a light guide plate fit to the light guide plate having the region whose thickness is reduced with the increase in distance from the light incident surface is used as a light guide plate.

Patent Document 1: JP 07-36037 A
Patent Document 2: JP 08-248233 A
Patent Document 3: JP 08-271739 A
Patent Document 4: JP 11-153963 A

DISCLOSURE OF THE INVENTION

Problems to be Solved by the Invention

In the light guide plate having the shape whose thickness is reduced with an increase in distance from a light source incident position or the flat shape, which is disclosed in JP 07-36037 A, JP 08-248233 A, JP 08-271739 A, or JP 11-153963 A, a light reach distance is limited. Therefore, there is a problem that there is a limitation in increasing a size.

In the planar illumination device using the light guide plate disclosed in JP 07-36037 A, JP 08-248233 A, JP 08-271739 A, or JP 11-153963 A, when light is sent to a position farther away from the light source in order to increase the size, it is necessary to thicken the light guide plate. In other words, there is a problem that the planar illumination device may not be increased in size and reduced in thickness and weight.

In addition to a fluorescent tube such as a cold cathode tube, a light emitting diode (hereinafter also referred to as "LED") may be used as the light source for causing light to be incident on the light guide plate of the planar illumination device as described above.

The LED may emit light with high directivity. Therefore, when the LED is used as the light source, light incident on the light guide plate may reach the deeper portion of the light guide plate, and hence the planar illumination device may be increased in size. The structure of the power supply may also be simplified.

An example of an LED for emitting white light is a structure in which a blue light emitting diode (hereinafter also referred to as "blue LED") and an yttrium aluminum garnet (YAG) phosphor are combined to convert blue light emitted from the blue light emitting diode into white light by the YAG phosphor.

When the blue LED and the phosphor are combined as described above, the white light may be emitted by the simple structure.

However, there is a problem that the light emitted by the combination of the blue LED and the phosphor has a low color temperature and it is difficult to adjust the color temperature without a reduction in light use efficiency. Therefore, there is also a problem that the color temperature of the light emitted from the light exit surface of the planar illumination device becomes lower and the adjustment is difficult.

The wedge-shaped side light type light guide plate (type in which a light incident surface is provided in a side end surface) as described above has a limit on the reach of light from the light source, that is, a light guide length. Therefore, light emission surface brightness becomes weaker as a distance from the light source increases, and hence the uniformity of the light emission surface brightness may not be sufficiently ensured. In addition, the side light type light guide plate also has a limit on a light source arrangement pitch and a light emission density. Therefore, there is also a problem that it is difficult to obtain a necessary incident light amount and thus it is difficult to obtain a necessary light emission surface brightness.

Specifically, in the light guide plate having the shape whose thickness is reduced with an increase in distance from a light source incident position or the flat shape, which is disclosed in JP 07-36037 A, JP 08-248233 A, JP 08-271739 A, or JP 11-153963 A, a light reach distance is limited. Therefore, there is a problem that there is a limitation in increasing a size.

In the planar illumination device using the light guide plate disclosed in JP 07-36037 A, JP 08-248233 A, JP 08-271739 A, or JP 11-153963 A, when light is sent to a position farther away from the light source in order to increase the size, it is necessary to thicken the light guide plate. In other words, there is a problem that the planar illumination device may not be reduced in thickness and weight.

An object of the present invention is to solve the problems in the conventional technologies described above and to provide a planar illumination device which is thin and light in weight, may emit illumination light having no brightness unevenness, and may be increased in size.

In addition to the object described above, another object of the present invention is to provide a planar illumination device capable of efficiently using light emitted from a light source and emitting light having higher brightness from a light exit surface.

In addition to the objects described above, another object of the present invention is to provide a planar illumination device having a simple structure capable of emitting light having a desired color temperature and increasing light use efficiency.

Another object of the present invention is to provide a planar illumination device capable of efficiently using light emitted from a light source and emitting light having higher brightness from a light exit surface.

Means for Solving the Problem

In order to solve the problems, the inventors of the present invention intensively studied and proposed a planar illumination device including a light guide plate (hereinafter also referred to as "reversed wedge-shaped light guide plate") having an inclined surface which is a surface located on an opposite side of the light exit surface and inclined so as to increase a distance from the light exit surface with an increase in distance from the light incident surface provided at a side end (JP 2006-167926 A).

When the wedge-shaped light guide plate is used as the light guide plate of the planar illumination device, excellent functions are obtained as follows. While a thickness and a weight are reduced, light may be sent to a position farther away from a light source with a single light scattering guide plate, thereby realizing a uniform light amount distribution and an increase in size. Efficiency for extracting incident light from the light guide plate (light use efficiency) may be improved.

In order to solve the problems, according to the present invention, there is provided a planar illumination device comprising: a first light source and a second light source which are arranged at predetermined intervals; and a light guide plate which is arranged between the first light source and the second light source and has: a light exit surface; a first light incident surface which is opposed to the first light source and includes a side of the light exit surface; a second light incident surface which is opposed to the second light source and includes an opposite side to the side; and a rear surface which is formed to be opposed to the light exit surface, wherein a cross section on a plane perpendicular to the side, of the rear surface of the light guide plate has a curved line in which a distance from the light exit surface increases with a shift from the first light incident surface and the second light incident surface to a center, an inclined angle relative to the light exit surface reduces with a shift from the first light incident surface or the second light incident surface to the center, and the inclined angle relative to the light exit surface is zero degrees at the center.

Preferably, the cross section on the plane perpendicular to the side, of the rear surface of the light guide plate is expressed by a part of a curved line satisfying a higher-order polynomial expression.

Preferably, the cross section on the plane perpendicular to the side, of the rear surface of the light guide plate is expressed by a part of a curved line satisfying the following expression (where $a_i$, $a_j$, $a_k$, $b_i$, $b_j$, and $b_k$ denote arbitrary real numbers, i, j, and k denote arbitrary natural numbers, $S_i$, $S_j$, and $S_k$ denote real numbers satisfying $-1 \leq S_i \leq 1$, $-1 \leq S_j \leq 1$, and $-1 \leq S_k \leq 1$, and $n_1$, $n_2$, and $n_3$ denote arbitrary natural numbers)

$$\sum_{i=1}^{n_1} S_i \left( \frac{x^{2i}}{a_i^{2i}} + \frac{y^{2i}}{b_i^{2i}} \right) + \sum_{j=1}^{n_2} S_j \left( \frac{x^{2j}}{a_j^{2j}} - \frac{y^{2j}}{b_j^{2j}} \right) + y^2 - \sum_{k=1}^{n_3} S_k (a_k (x^{2k})^2) = C. \qquad \text{[Equation 1]}$$

Preferably, a function of the curved line expressing the cross section of the rear surface of the light guide plate on the plane perpendicular to the side is a function whose derivative has no discontinuity.

Preferably, the cross section on the plane perpendicular to the side, of the rear surface of the light guide plate is expressed by a part of an ellipsoid.

Preferably, the cross section on the plane perpendicular to the side, of the rear surface of the light guide plate has a symmetrical shape with respect to a straight line which is perpendicular to the light exit surface and passes through an intermediate point between the first light incident surface and the second light incident surface.

Preferably, the light guide plate contains a large number of scattering particles, and when a scattering cross section of the scattering particles is expressed by $\Phi$, a density of the scattering particles is expressed by $N_p$, a correction coefficient is expressed by $K_C$, and a length between the first or second light incident surface of the light guide plate and a position in which a thickness of the light guide plate is maximum, in a light incident direction, is expressed by $L_G$, it is to satisfy inequalities $1.1 \leq \Phi \cdot N_p \cdot L_G \cdot K_C \leq 8.2$ and $0.005 \leq K_C \leq 0.1$.

Further, preferably, the light source includes: at least one LED chip for emitting blue light from a light emitting surface; and a fluorescent member which is arranged between the light emitting surface of the LED chip and the light guide plate and has: a phosphor applying portion for converting the blue light emitted from the light emitting surface into white light and emitting the white light; and a blue light transmission portion for emitting the blue light emitted from the light emitting surface as blue light.

The blue light transmission portion preferably is formed of a transparent film or an opening.

The light source preferably includes a plurality of the LED chips and a support for supporting the LED chips, and the LED chips are preferably arranged in a row on a surface of the support which is opposed to the light incident surface.

The fluorescent member preferably includes a plurality of the blue light transmission portions each of which is formed for the light emitting surface of each of the LED chips.

The fluorescent member is preferably a sheet-like member shared by the plurality of the LED chips. The fluorescent member may preferably be provided for each group including the plurality of the LED chips.

When an area of the entire fluorescent member is expressed by Sa and a sum of areas of the blue light transmission portions is expressed by Sap, a relationship between Sa and Sap preferably satisfies $0.05 \leq Sap/Sa \leq 0.40$.

The fluorescent member is preferably arranged in contact with the light emitting surface and preferably arranged in contact with the light incident surface.

Preferably, the light source has a light emitting surface longer in length than an effective cross section of the light incident surface in a direction substantially orthogonal to the light exit surface on an edge side of the light incident surface in which the light incident surface is formed, and the light emitting surface is inclined at a predetermined angle relative to the direction substantially orthogonal to the light exit surface while the light emitting surface is opposed to the light incident surface of the light guide plate.

The light incident surface of the light guide plate is a flat surface substantially orthogonal to the light exit surface, and the effective cross section of the light incident surface preferably corresponds to the flat surface substantially orthogonal thereto. The light incident surface of the light guide plate is a flat surface inclined so as to be opposed in parallel to the light emitting surface of the light source in the direction substantially orthogonal to the light exit surface, and the effective cross section of the light incident surface preferably corresponds to a cross section in the direction substantially orthogonal to the light exit surface at a center of the light incident surface.

The inclined angle of the light emitting surface of the light source relative to the direction substantially orthogonal to the light exit surface is preferably equal to or larger than 15 degrees and equal to or smaller than 90 degrees.

The planar illumination device preferably further includes guide reflection plates arranged on a light exit surface side and on an inclined surface side of the light incident surface of the light guide plate, for guiding light emitted from the light source to the light incident surface. The guide reflection plates more preferably include a first guide reflection plate attached to an end portion of the light exit surface of the light guide plate and a second guide reflection plate which is attached to an end portion of the inclined surface of the light guide plate and has an extension portion extending from an edge of the inclined surface to an outside.

The light guide plate is preferably formed into a shape which has a light exit surface for emitting surface light, a side surface which is inclined at an angle larger than 90° relative to the light exit surface and formed at an edge of the light exit surface, an inclined surface which is a surface located on an opposite side of the light exit surface and inclined such that a distance from the light exit surface increases with an increase in distance from the side surface, and a light incident surface which is formed between the side surface and the inclined surface and receives incident light.

The applicants of the present invention intensively studied and found that high-brightness light may be more efficiently emitted from the light exit surface without an increase in thickness of the light guide plate in view of an arrangement relationship and the like between the light source and the light guide plate.

Specifically, in order to solve the problems, according to the present invention, there is provided A planar illumination device comprising: a transparent light guide plate which has: a light exit surface which emits planar light; a light incident surface which is formed at an edge of the light exit surface and on which light traveling along a direction parallel to the light exit surface enters from a direction substantially orthogonal to the light exit surface; and an inclined surface which is a surface located on an opposite side of the light exit surface and inclined such that a distance from the light exit surface increases with an increase in distance from the light incident surface; a light source which has a light emitting surface longer in length than an effective cross section of the light incident surface in a direction substantially orthogonal to the light incident surface on an edge side of the light exit surface of the light guide plate in which the light incident surface is formed, and is arranged such that the light emitting surface is inclined at a predetermined angle relative to the direction substantially orthogonal to the light incident surface while the light emitting surface is opposed to the light incident surface of the light guide plate; and guide reflection plates which are arranged on a light exit surface side and on an inclined surface side of the light incident surface of the light guide plate and which guide light emitted from the light source to the light incident surface, wherein the light emitted from the light emitting surface of the light source is allowed to enter the light incident surface of the light guide plate, converted into the planar light, and emitted as the planar light from the light exit surface.

Preferably, the light incident surface of the light guide plate is a flat surface substantially orthogonal to the light emitting surface of the light source, and the effective cross section of the light incident surface corresponds to the flat surface substantially orthogonal thereto.

Preferably, the light incident surface of the light guide plate is a flat surface inclined so as to be opposed in parallel to the light emitting surface of the light source in the direction substantially orthogonal to the light exit surface, and the effective cross section of the light incident surface corresponds to a cross section in the direction substantially orthogonal to the light exit surface at a contact point between the light incident surface and the light exit surface.

Preferably, the inclined angle of the light emitting surface of the light source relative to the direction substantially orthogonal to the light exit surface is equal to or larger than 15 degrees and equal to or smaller than 90 degrees.

Preferably, the light source is a planar or linear light source which includes a plurality of light emitting diodes or semiconductor lasers arranged in array along a longitudinal direction of the light incident surface of the light guide plate and an array board having a mounting surface which is inclined parallel to the light emitting surface, for mounting the light emitting diodes or the semiconductor lasers.

Preferably, the guide reflection plates include a first guide reflection plate attached to an end portion of the light exit surface of the light guide plate and a second guide reflection plate which is attached to an end portion of the inclined surface of the light guide plate and has an extension portion extending from an edge of the inclined surface to an outside.

Preferably, the light guide plate has a shape in which the light exit surface is rectangular, the light incident surface includes two light incident surfaces formed at two opposed end sides of the light exit surfaces, the inclined surface includes two inclined surfaces which are inclined such that distances from the light exit surface increase with shifts from the two opposed light incident surfaces to the center, a thickness at the light incident surfaces is minimum and a thickness at an intersection of the two inclined surfaces is maximum.

Preferably, the light guide plate has a shape in which the light exit surface is rectangular, the light incident light is formed of a light incident surface formed at an end side of the light exit surface, the inclined surface is formed of an inclined surface which are inclined such that a distance from the light exit surface increases with a shift from the light incident surface to another end surface opposed to the light incident surface, and a thickness is minimum at the light incident surface and maximum at the another end surface.

Preferably, the light guide plate has a shape in which the light exit surface is rectangular, the light incident light includes four light incident surfaces formed at four end sides of the light exit surface, the inclined surface includes four inclined surfaces which are inclined such that distances from the light exit surface increase with shifts from the four light incident surfaces to the center, and a thickness at the light incident surfaces is minimum and a thickness at an intersection of the four inclined surfaces is maximum.

Preferably, the light guide plate contains a large number of scattering particles, and when a scattering cross section of the scattering particles is expressed by $\Phi$, a density of the scattering particles is expressed by $N_p$, a correction coefficient is expressed by $K_C$, and a length between the light incident surface of the light guide plate in a light incident direction and a position in which a thickness in a direction perpendicular to the light exit surface is maximum, is expressed by $L_G$, it is to satisfy inequalities $1.1 \leq \Phi \cdot N_p \cdot L_G \cdot K_C \leq 8.2$ and $0.005 \leq K_C \leq 0.1$.

According to another aspect of the present invention, there is provided a planar illumination device comprising: a transparent light guide plate which has: a light exit surface for emitting surface light; a side surface which is inclined at an angle larger than 90° relative to the light exit surface and formed at an edge of the light exit surface; an inclined surface which is a surface located on an opposite side of the light exit surface and inclined such that a distance from the light exit surface increases with an increase in distance from the side surface; and a light incident surface which is formed between the side surface and the inclined surface and enters incident light; a light source which has a light emitting surface longer in length than a cross section of the light guide plate in a direction substantially orthogonal to the light exit surface at an edge of the light incident surface which is located on the inclined surface side, and is arranged such that the light emitting surface is inclined at a predetermined angle relative to the direction substantially orthogonal to the light exit surface while the light emitting surface is opposed to the light incident surface of the light guide plate; and a guide reflection plate which is arranged to cover a part of the light exit surface of the light guide plate which is located on the side surface side, the side surface and the inclined surface, and guides light incident on the light incident surface in a center direction of the light guide plate, wherein the light emitted from the light emitting surface of the light source is allowed to enter the light incident surface of the light guide plate, converted into planar light, and emitted as the planar light from the light exit surface.

Preferably, the light incident surface of the light guide plate is formed parallel to the light exit surface and the light source is arranged at an angle at which the light emitting surface is parallel to the light exit surface.

Preferably, the light guide plate contains a large number of scattering particles, and when a scattering cross section of the scattering particles is expressed by $\Phi$, a density of the scattering particles is expressed by $N_p$, a correction coefficient is expressed by $K_C$, and a length from a contact between the side surface and the light incident surface to a position in which a thickness in the direction perpendicular to the light exit surface is maximum, is expressed by $L_G$, it is to satisfy inequalities $1.1 \leq \Phi \cdot Np \cdot LG \cdot KC \leq 8.2$ and $0.005 \leq KC \leq 0.1$.

Effects of the Invention

According to the present invention, the light guide plate is formed into the shape in which the thickness in the direction perpendicular to the light exit surface increases with the increase in distance from the light incident surface. Therefore, light incident on the light incident surface may be sent to a more distant position, the thickness may be reduced, and the light exit surface may be increased in size.

The rear surface is formed into the curved shape in which the inclined angle relative to the light exit surface reduces with the shift from the first light incident surface or the second light incident surface to the center, and the inclined angle relative to the light exit surface is zero degrees at the center. Therefore, the light use efficiency may be improved.

The brightness distribution of the light emitted from the light exit surface may be set to be of bell-shaped.

Even in another aspect of the present invention, the light guide plate is formed into the shape in which the thickness increases with the increase in distance from the light incident surface. Therefore, the light incident on the light incident surface may be sent to a more distant position, the thickness may be reduced, and the light exit surface may be increased in size.

The light emitting surface of the light source is inclined. Therefore, even when a light source whose light emitting surface area is large is used for a light guide plate whose light incident surface thickness is small, light may be allowed to enter efficiently. That is, the light use efficiency may be improved. When the light emitting surface area is increased, the amount of light emitted from the light emitting surface may be increased.

In other words, according to the another aspect of the present invention, the light whose brightness or illuminance is high may efficiently be emitted from the light exit surface, and the device may be reduced in thickness.

BRIEF DESCRIPTION OF THE DRAWINGS

FIG. 4A is a perspective view illustrating a schematic structure of a light source of the planar illumination device illustrated in FIGS. 1 and 2, FIG. 4B is a cross sectional view of the light source illustrated in FIG. 4A, and FIG. 4C is a schematic enlarged perspective view illustrating an LED of the light source illustrated in FIG. 4A.

FIGS. 5A to 5C partially illustrate a fluorescent member and the light source of the planar illumination device illustrated in FIG. 2, in which FIG. 5A is a top view, FIG. 5B is a front view, and FIG. 5C is a side view.

FIG. 6 illustrates results obtained by measuring a relationship between $\Phi \cdot N_p \cdot L_G \cdot K_C$ and light use efficiency.

FIGS. 13A to 13C are front views illustrating respectively other examples of the fluorescent member.

FIG. 14 is a cross sectional view illustrating a schematic structure of a planar illumination device according to another embodiment of the present invention.

FIGS. 15A to 15C partially illustrate a fluorescent member and a light source of another example of the planar illumination device, in which FIG. 15A is a top view, FIG. 15B is a front view, and FIG. 15C is a side view.

FIGS. 16A to 16C are front views illustrating respectively other examples of the fluorescent member.

Figure 1:
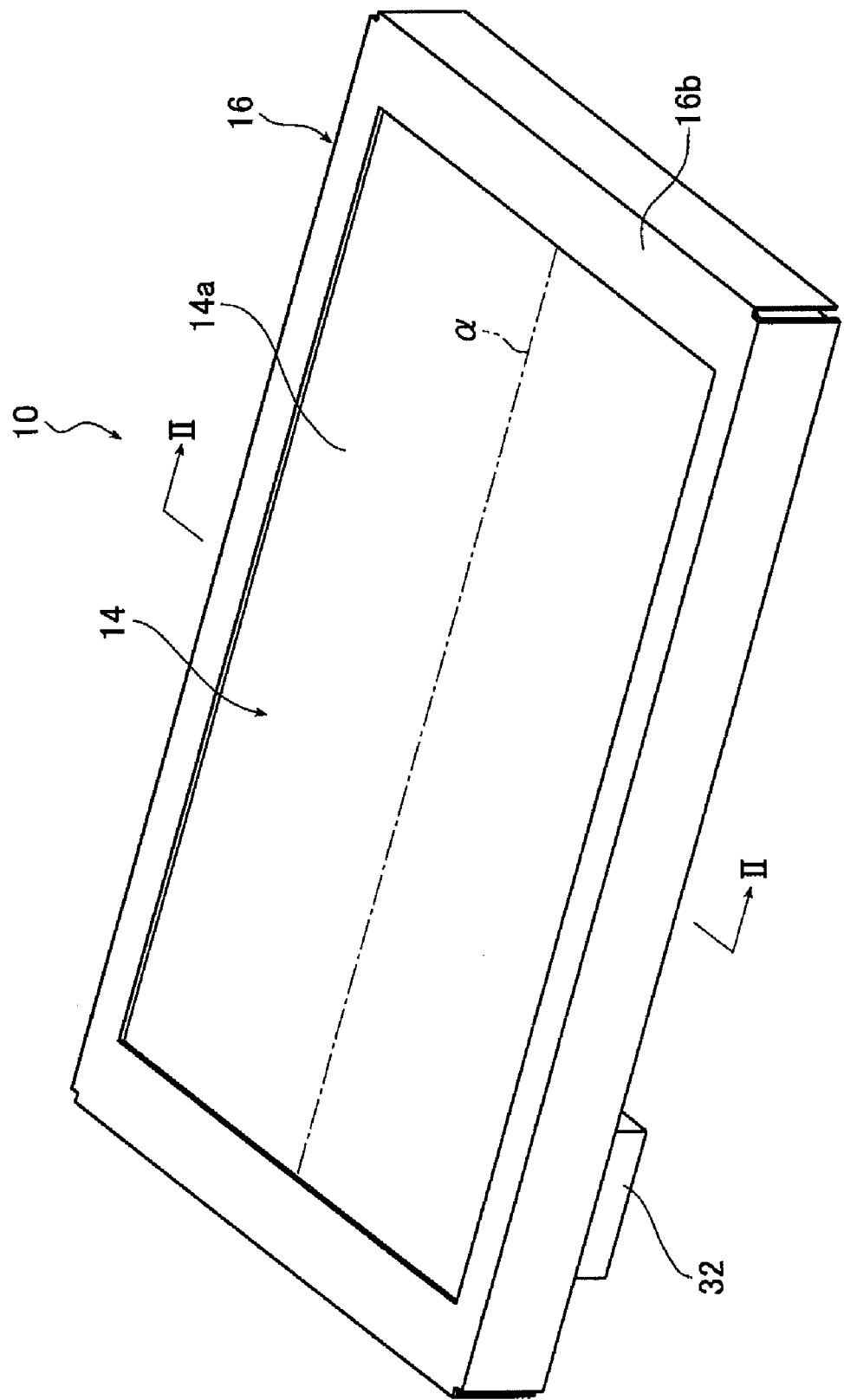
FIG. 1 is a schematic perspective view illustrating a planar illumination device according to an embodiment of the present invention.

DESCRIPTION OF SYMBOLS 10, 100, 110, 150, 310, 410, 510, 550 planar illumination device
12, 312 light source
12a, 312a light emitting surface
14, 314 illumination device main body
14a, 18a, 314a, 318a light exit surface
16 case
16a lower case
16b upper case
16c folding member
17, 60, 70, 76 fluorescent member
18, 152, 318, 552 light guide plate
18b rear surface
18d, 18d' first light incident surface
18e second light incident surface
22, 322 optical member 22a, 22b, 22c diffusion film
24, 324 reflection plate
28, 50, 74, 78 opening portion
32 power supply storing portion
34 upper guide reflection plate
36 lower guide reflection plate
40, 340 LED chip
41 light source support portion
42 array board
44 fin
48, 72, 77 phosphor applying portion

BEST MODE FOR CARRYING OUT THE INVENTION

Hereinafter, planar illumination devices according to embodiments of the present invention are described in detail with reference to the attached drawings.

Figure 2:
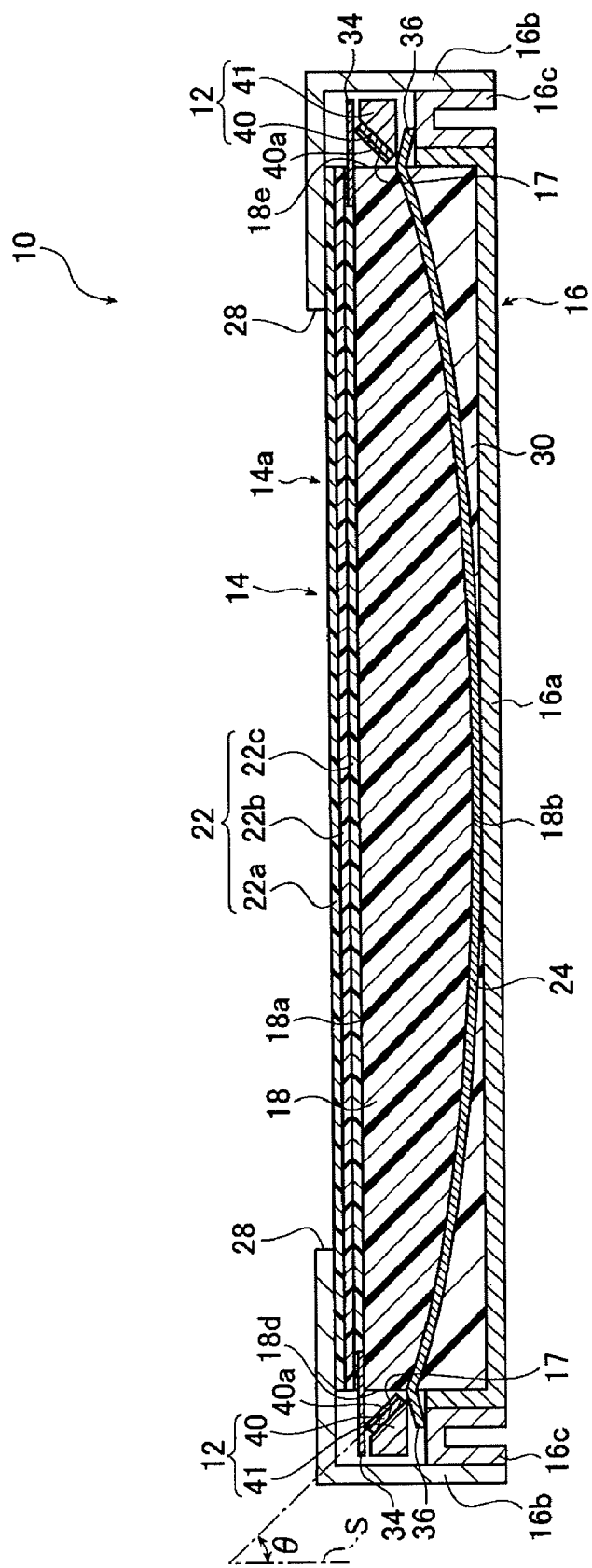
FIG. 2 is a II-II line cross sectional view illustrating the planar illumination device illustrated in FIG. 1.
Figure 3:
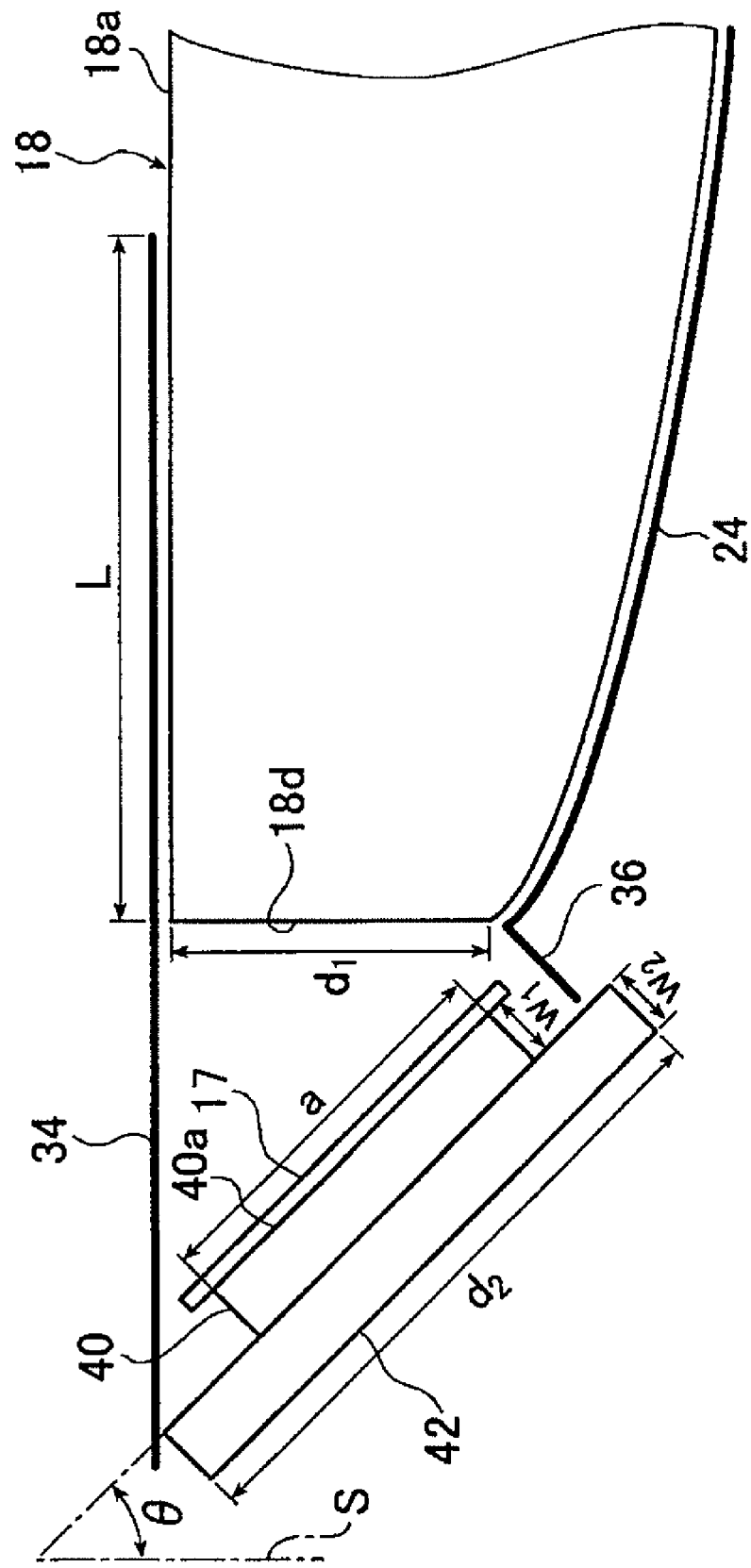
FIG. 3 is an enlarged cross sectional view illustrating an enlarged part of the planar illumination device illustrated in FIG. 2.

FIG. 1 is a perspective view illustrating a planar illumination device according to an embodiment of the present invention. FIG. 2 is a II-II line cross sectional view illustrating the planar illumination device illustrated in FIG. 1. FIG. 3 is an enlarged cross sectional view illustrating an enlarged part of the planar illumination device illustrated in FIG. 2.

In the respective drawings, a planar illumination device 10 includes light sources 12, an illumination device main body 14 for emitting uniform light from a rectangular-shaped light exit surface 14a, fluorescent members 17 each being arranged between each of the light sources 12 and the illumination device main body 14, and a case 16 which accommodates the light sources 12, the illumination device main body 14, and the fluorescent member 17. As described later, the case 16 includes a lower case 16a and an upper case 16b.

First, the light sources 12 are described.

FIG. 4A is a schematic perspective view illustrating a schematic structure of the light source 12 of the planar illumination device 10 illustrated in FIGS. 1 and 2. FIG. 4B is a cross sectional view illustrating the light source 12 illustrated in FIG. 4A. FIG. 4C is a schematic enlarged perspective view illustrating only one LED chip of the light source 12 illustrated in FIG. 4A.

As illustrated in FIG. 4A, the light source 12 includes a plurality of light emitting diode chips (hereinafter referred to as LED chips) 40 and a light source support portion 41.

Each of the LED chips 40 is a chip of a light emitting diode for emitting blue light, has a light emitting surface 40a with a predetermined area, and emits the blue light from the light emitting surface 40a. Examples of the LED chip 40 include a GaN-based light emitting diode and an InGaN-based light emitting diode. In the present invention, the blue light is light corresponding to emitted light whose peak wavelength is equal to or larger than 420 nm and equal to or smaller than 500 nm, and a light emitting diode for emitting light corresponding to emitted light whose peak wavelength is equal to or larger than 450 nm and equal to or smaller than 480 nm is preferably used as the light emitting diode for emitting the blue light.

As illustrated in FIG. 4B, the light source support portion 41 includes an array board 42 and a plurality of fins 44. The plurality of LED chips 40 are arranged on the array board 42 at predetermined intervals in a single row. Specifically, the plurality of LED chips 40 are arranged in array, along a longitudinal direction of a first light incident surface 18d or a second light incident surface 18e of a light guide plate 18 described later, in other words, in parallel to a line of intersection of a light exit surface 18a and the first light incident surface 18d or a line of intersection of the light exit surface 18a and the second light incident surface 18e.

The array board 42 is a plate-shaped member having a surface opposed to a thinnest side end surface of the light guide plate 18, and is arranged to be opposed to the first light incident surface 18d or the second light incident surface 18e which is a side end surface of the light guide plate 18. The array board 42 supports the LED chips 40 on a side surface corresponding to a surface opposed to a light incident surface 18b of the light guide plate 18.

In this embodiment, the array board 42 is made of metal with high thermal conductivity, such as copper or aluminum, and also serves as a heat sink for absorbing heat generated from the LED chips 40 and dissipating heat to the outside.

Each of the plurality of fins 44 is a plate-shaped member made of metal with high thermal conductivity, such as copper or aluminum, and connected to a surface located on an opposite side of the surface of the array board 42 on which the LED chips 40 are arranged, at a predetermined distance from the adjacent fins 44.

Provision of the plurality of fins 44 to the light source support portion 41 secures a large surface area and a high heat dissipation efficiency, thereby increasing the efficiency with which the LED chips 40 are cooled.

The heat sink is not limited to an air-cooled type, and a water-cooled type or a cooling member, which uses a coolant using heat of vaporization, such as a heat pipe, may also be used.

It should be noted that this embodiment uses the array board 42 of the light source support portion 41 as heat sink, but in a case where the LED chips do not need to be cooled, a plate-shaped member without a heat-releasing function may also be used as the array board instead of the heat sink.

As illustrated in FIG. 4C, the LED chip 40 according to this embodiment has a rectangular shape so that the sides perpendicular to the direction in which the LED chips 40 are arrayed are shorter than the sides lying in the direction in which the LED chips 40 are arrayed or, in other words, the sides lying in the direction of thickness of the light guide plate 18 described later (direction perpendicular to the light exit surface 18a) are the shorter sides. In other words, the LED chip 40 has a shape satisfying b>a where "a" represents the length of the sides perpendicular to the light exit surface 18a of the light guide plate 18 and "b" represents the length of the sides in the direction of the array. Further, let "q" be a distance by which the LED chips 40 are spaced apart from one another, then q>b holds. Thus, the relationship among the length "a" of the sides of the LED chips 40 perpendicular to the light exit surface 18a of the light guide plate 18, the length "b" of the sides in the direction of the array, and the distance "q" of the LED chips 40 by which the LED chips 40 are spaced apart from one another preferably satisfies the q>b>a.

The LED chips 40 each given a rectangular shape allows the thickness of the light source to be reduced while maintaining output of a great amount of light. A thinner light source enables a thinner design of the planar illumination device to be achieved.

It should be noted that the LED chips 40 each preferably have a rectangular shape with the shorter sides lying in the direction of thickness of the light guide plate 18 to achieve a thinner design of the LED array, that is, the light source but the present invention is not limited thereto, allowing use of LED chips having various shapes such as a square, a circle, a polygon, and an ellipse.

As illustrated in FIGS. 2 and 3, the LED chips 40 and the array board 42 are arranged to be inclined at a predetermined angle relative to a direction perpendicular to the light exit surface 18a of the light guide plate 18 described later. In other words, the LED chip 40 is arranged such that the light emitting surface 40a thereof is inclined at the predetermined angle relative to the direction perpendicular to the light exit surface 18a of the light guide plate 18 described later.

This point is described in detail later.

Next, the fluorescent member 17 is described.

Each of FIGS. 5A to 5C partially illustrates the fluorescent member and the light source of the planar illumination device illustrated in FIG. 2. FIG. 5A is a top view, FIG. 5B is a front view, and FIG. 5C is a side view.

As illustrated in FIGS. 5A to 5C, the fluorescent member 17 is a sheet-shaped member and arranged in contact with the light emitting surface 40a of the LED chip 40 of the light source 12. In other words, a portion of the fluorescent member 17 which is opposed to the light emitting surface 40a of the LED chip 40 of the light source 12 is in contact with the light exit surface 40a. A method of arranging the fluorescent member 17 is not particularly limited. For example, the fluorescent member 17 may be bonded to the light emitting surface 40a by a bonding material or fixed by a fixed member or the like while being in contact with the light emitting surface 40a.

The fluorescent member 17 is a sheet-shaped member having a size for covering the light emitting surfaces 40a of all the LED chips 40 arranged on the array board 42, and includes a phosphor applying portion 48 and opening portions 50. In other words, the fluorescent member 17 is fundamentally formed of the phosphor applying portion 48, and the rectangular opening portions 50 are formed at predetermined intervals. That is, a portion other than the opening portions 50 of the fluorescent member 17 is the phosphor applying portion 48 made of a fluorescent material.

The phosphor applying portion 48 is made of an yttrium aluminum garnet (YAG)-based fluorescent material. When the blue light emitted from the LED chip 40 passes through the phosphor applying portion 48, the YAG-based fluorescent material produces fluorescence.

Therefore, when the blue light emitted from the LED chip 40 passes through the phosphor applying portion 48, white light is produced from the blue light emitted from the LED chip 40 and light generated by the fluorescence of the YAG-based fluorescent material. That is, the light which is emitted from the LED chip 40 and passes through the phosphor applying portion 48 is converted from the blue light into white light. In other words, the phosphor applying portion 48 converts the blue light passing therethrough into the white light.

The opening portions 50 are rectangular openings. As described above, the plurality of opening portions are formed in matrix in the sheet-shaped fluorescent member 17 at regular intervals. The opening portion 50 emits the blue light emitted from the LED chip 40 as blue light. That is, the light which is emitted from the LED chip 40 and passes through the opening portion 50 is emitted as the blue light without any change.

As described above, the fluorescent member 17 has the two regions, one of which includes the phosphor applying portion 48 and converts the blue light into the white light, and the other of which includes the opening portions 50 and transmits the blue light as blue light.

The fluorescent member 17 including the phosphor applying portion 48 and the opening portions 50 may be produced as follows. For example, a fluorescent material is applied onto the entire surface of a transparent sheet to form the phosphor applying portion in the entire transparent sheet, and then portions which become the opening portions are cut out.

In another example, portions of a transparent sheet which become the opening portions may be cut out to form the opening portions, and then a fluorescent material may be applied onto the transparent sheet to produce the phosphor applying portion.

Next, the illumination device main body 14 is described in detail.

As illustrated in FIG. 2, the illumination device main body 14 fundamentally includes the light guide plate 18, an optical member 22, a reflection plate 24, upper guide reflection plates 34, and lower guide reflection plates 36.

First, the light guide plate 18 is described.

As illustrated in FIG. 2, the light guide plate 18 includes: the flat light exit surface 18a having a substantially rectangular shape; two light incident surfaces (first light incident surface 18d and second light incident surface 18e) formed substantially perpendicular to the light exit surface 18a at both ends of the light exit surface 18a; and the rear surface 18b which is located on an opposite side of the light exit surface 18a and formed symmetrical with respect to, as the center axis, a bisector α (see FIG. 1) which is parallel to the first light incident surface 18d and the second light incident surface 18e (parallel to the side of the light exit surface 18a which is in contact with the first or second light incident surface 18d or 18e) and divides the light exit surface 18a into two.

The rear surface 18b of the light guide plate 18 has a curved shape in which, in a cross section perpendicular to the bisector α, that is, in a cross section which is perpendicular to the light exit surface and perpendicular to the light incident surface, in other words, in a cross section perpendicular to a tangent to the light exit surface and the light incident surface, a distance from the light exit surface 18a increases with a shift from the first light incident surface 18d or the second light incident surface 18e to the bisector a (central portion), an inclined angle relative to the light exit surface 18a (inclined angle of tangent to rear surface at each position) reduces with a shift from the first light incident surface 18d or the second light incident surface 18e to the central portion, and the inclined angle is zero degrees at the central portion.

In other words, the light guide plate 18 has the shape in which the distance from the light exit surface 18a increases (becomes larger) with increases in distances from the first light incident surface 18d and the second light incident surface 18e, that is, a thickness of the light guide plate in a direction perpendicular to the light exit surface increases with a shift from each of the first light incident surface 18d and the second light incident surface 18e to the center of the light guide plate. In other words, the light guide plate 18 becomes thinnest at both ends, that is, at the first light incident surface 18d and the second light incident surface 18e, and has a maximum thickness at the central portion, that is, at the position of the bisector α.

The rear surface 18b is formed into a curved shape which is convex in a direction away from the light exit surface 18a, has a vertex at the central portion of the light guide plate, and has an inclination which becomes gentle with a shift from an end surface to the central portion, in other words, a curved shape in which an angle formed between the tangent to the rear surface and the light exit surface becomes smaller with the shift from the end surface to the central portion. The tangent to the rear surface in the central portion of the light guide plate is parallel to the light exit surface.

It should be noted that cross sectional shapes perpendicular to the bisector α of the light guide plate in any positions on the bisector α are equal to one another.

The light sources 12 described above are arranged to be opposed to the first light incident surface 18d and the second light incident surface 18e of the light guide plate 18. That is, in the planar illumination device 10, the two light sources 12 are arranged so as to sandwich the light guide plate 18. In other words, the light guide plate 18 is interposed between the two light sources 12 opposed to each other at a predetermined interval.

In the light guide plate 18 illustrated in FIG. 2, light beams incident on the first light incident surface 18d and the second light incident surface 18e pass through the inner portion of the light guide plate 18 while being scattered by scatterers (described in detail later) contained in the inner portion of the light guide plate 18, and then are directly emitted from the light exit surface 18a or reflected on the rear surface 18b to be emitted therefrom. At this time, there is a case where a part of light is leaked from the rear surface 18b. However, the leaked light is reflected on the reflection plate 24 covering the rear surface 18b of the light guide plate 18 and incident on the inner portion of the light guide plate 18 again. The reflection plate 24 is described later.

The light guide plate 18 is formed of a transparent resin into which scattering particles for scattering light are kneaded and dispersed. As a transparent resin material that may be used to form the light guide plate 18, there are optically transparent resins such as polyethylene terephthalate (PET), polypropylene (PP), polycarbonate (PC), polymethyl methacrylate (PMMA), benzyl methacrylate, an MS resin, and cycloolefin polymer (COP). As the scattering particles kneaded and dispersed into the light guide plate 18, for example, TOSPEARL, silicone, silica, zirconia, or a derivative polymer may be used. The light guide plate 18 containing such scattering particles is capable of emitting uniform illumination light with a reduced level of brightness unevenness from the light exit surface. The light guide plate 18 as described above may be manufactured using an extrusion molding method or an injection molding method.

Now, when it is assumed that: $\Phi$ is the scattering cross section of the scattering particles contained in the light guide plate 18; $L_G$ is the length of the light guide plate 18 in the direction in which light is incident (in a direction parallel to a travelling direction of the light incident on the light guide plate, in a direction parallel to the light exit surface and perpendicular to a tangent to the light exit surface and the light incident surface (first light incident surface and second light incident surface)) from the first light incident surface 18d or the second light incident surface 18e of the light guide plate 18 to a position where the thickness of the light guide plate 18 in the direction perpendicular to the light exit surface 18a is greatest, the length $L_G$ being, in this embodiment, a half length (length to a position of a bisector L) of the full length of the light guide plate 18 in the direction in which light is incident (in this embodiment, in a direction perpendicular to the first light incident surfaces 18d of the light guide plate 18, hereinafter, also referred to as "optical axis direction"); $N_p$ is the density of the scattering particles contained in the light guide plate 18 (number of particles in unit volume); and $K_C$ is a correction coefficient. Then a relationship may hold that the value $\Phi \cdot N_p \cdot L_G \cdot K_C$ is not less than 1.1 and not greater than 8.2, and that the correction coefficient $K_C$ is not less than 0.005 and not greater than 0.1. The light guide plate 18 contains scattering particles satisfying the above-mentioned relationship, and hence is capable of emitting uniform illumination light through the light exit surface 18a with a reduced level of brightness unevenness.

When parallel light beams are caused to enter an isotropic medium, a transmittance T is generally expressed according to the Lambert-Beer law by the following Expression (1):

$$T = I/I_o = \exp(-\rho \cdot x) \quad (1)$$

where x is a distance, $I_o$ is an intensity of incoming light, I is an intensity of outgoing light, and $\rho$ is an attenuation constant.

The above-mentioned attenuation constant $\rho$ is expressed using $\Phi$, the scattering cross section of the scattered particles and $N_p$, the number of particles in unit volume contained in the medium by Expression (2):

$$\rho = \Phi \cdot N_p \quad (2)$$

Accordingly, a light extraction efficiency $E_{out}$ is expressed by the following Expression (3) where $L_G$ is a length in the direction parallel to the light travelling direction in the light guide plate from the light incident surface to a position where the thickness is greatest, a half of the length of the light guide plate in the optical axis direction. The half length $L_G$ of the light guide plate in the optical axis direction is the length of the light guide plate 18 in the direction perpendicular to the light incident surface, extending from one of the light incident surfaces of the light guide plate 18 to the center of the light guide plate 18.

The light extraction efficiency is a ratio of light reaching the position distanced from the light incident surface of the light guide plate by the length $L_G$ in the optical axis direction with respect to the incoming light. In the case of the light guide plate 18 illustrated in FIG. 2, for example, the light extraction efficiency is a ratio of light reaching the center (position at the half of the length of the light guide plate in the optical axis direction of the light guide plate) with respect to the light that enters the light incident surface.

$$E_{out} \propto \exp(-\Phi \cdot N_p \cdot L_G) \quad (3)$$

Expression (3) applies to a space of limited dimensions. To correct the relationship with Expression (1), the correction coefficient $K_C$ is therein introduced. The correction coefficient $K_C$ is a dimensionless correction coefficient empirically obtained when light propagates through an optical medium of limited dimensions. The light extraction efficiency $E_{out}$ is then expressed by the following Expression (4).

$$E_{out} = \exp(-\Phi \cdot N_p \cdot L_G \cdot K_C) \quad (4)$$

According to Expression (4), when $\Phi \cdot N_p \cdot L_G \cdot K_C$ is 3.5, the light extraction efficiency $E_{out}$ is 3%; when $\Phi \cdot N_p \cdot L_G \cdot K_C$ is 4.7, the light extraction efficiency $E_{out}$ is 1%.

The results show that the light extraction efficiency $E_{out}$ decreases as $\Phi \cdot N_p \cdot L_G \cdot K_C$ increases. It is assumed that the light extraction efficiency $E_{out}$ thus decreases because light is scattered increasingly as the light travels in the optical axis direction of the light guide plate.

It follows, therefore, that, as the value $\Phi \cdot N_p \cdot L_G \cdot K_C$ becomes greater, the value becomes more preferable as a property of the light guide plate. More specifically, when $\Phi \cdot N_p \cdot L_G \cdot K_C$ is great, light exiting through the surface opposed to the light incident surface may be reduced whereas light emitted through the light exit surface may be increased. In other words, when $\Phi \cdot N_p \cdot L_G \cdot K_C$ is great, the ratio of the light emitted through the light exit surface to the light that enters the light incident surface may be increased (hereinafter, that ratio being also referred to as "light use efficiency"). Specifically, a light use efficiency as high as 50% or more is achieved when $\Phi \cdot N_p \cdot L_G \cdot K_C$ is 1.1 or greater.

While light emitted through the light exit surface 18a of the light guide plate 18 increasingly exhibits illuminance unevenness as $\Phi \cdot N_p \cdot L_G \cdot K_C$ increases, the illuminance unevenness may be held to under a given level (within tolerable range) by holding the value $\Phi \cdot N_p \cdot L_G \cdot K_C$ to 8.2 or less. Note that illuminance and brightness may be treated substantially equally.

Thus, it is assumed that brightness and illuminance possess similar tendencies in the present invention.

Thus, the value $\Phi \cdot N_p \cdot L_G \cdot K_C$ of the light guide plate 18 according to the present invention preferably satisfies a relationship that the value is not less than 1.1 and not greater than 8.2, and more preferably not less than 2.0 and not greater than 8.0. Still more preferably, the value $\Phi \cdot N_p \cdot L_G \cdot K_C$ is not less than 3.0 and, most preferably, not less than 4.7.

The correction coefficient $K_C$ is preferably not less than 0.005 and not greater than 0.1 (that is, $0.005 \leq K_C \leq 0.1$).

Hereinafter, the light guide plate 18 is described in more detail with reference to specific examples.

First, a computer simulation was conducted to obtain light use efficiencies for different light guide plates given different values of $\Phi \cdot N_p \cdot L_G \cdot K_C$ by varying the scattering cross section $\Phi$, the particle density $N_p$, the length $L_G$ which is a half of the length of the light guide plate in the optical axis direction, and the correction coefficient $K_C$. Further, illuminance unevenness was evaluated. Here, the illuminance unevenness [%] was defined as $[(I_{Max}-I_{Min})/I_{Ave}] \times 100$, where $I_{Max}$ was a maximum illuminance of light emitted through the light exit surface of the light guide plate, $I_{Min}$ was a minimum illuminance, and $I_{Ave}$ was an average illuminance.

The measurement results are illustrated in Table 1. In Table 1, "o" indicates a case where the light use efficiency is 50% or more and the illuminance unevenness is 150% or less whereas "×" indicates a case where the light use efficiency is less than 50% or the illuminance unevenness is more than 150%.

measured illuminance distribution of light emitted from the side ends of the light guide plate, $I_{Min}$ was a minimum illuminance, and $I_{Ave}$ was an average illuminance.

Figure 7:
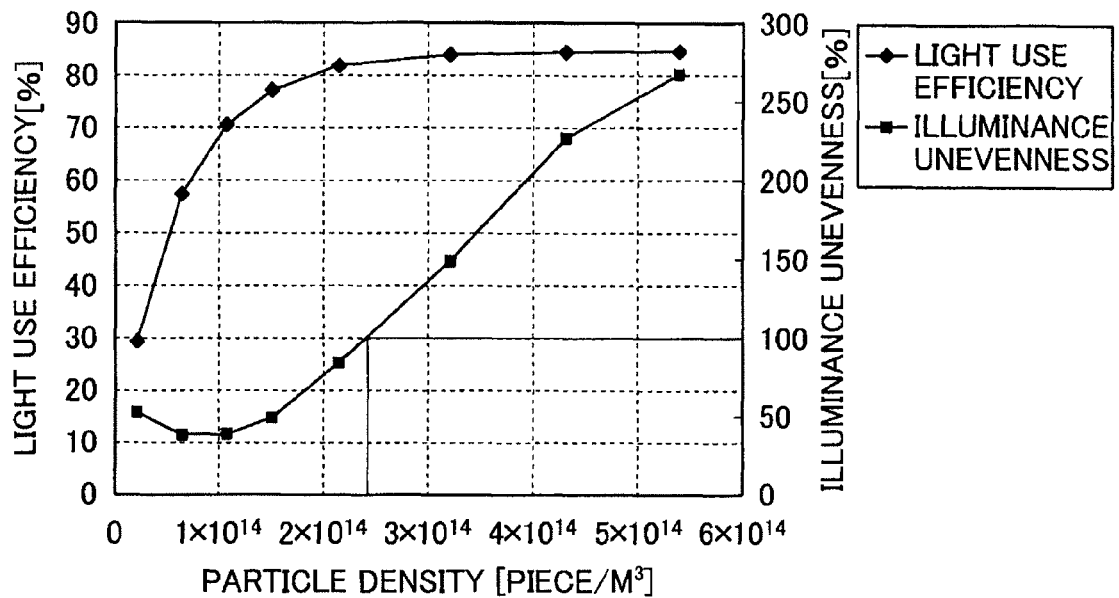
FIG. 7 illustrates relationships between light use efficiency and each of illuminance unevenness and a particle density.

FIG. 7 illustrates a relationship between the calculated illuminance unevenness and particle density. FIG. 7 indicates the illuminance unevenness [%] on the vertical axis plotted against the particle density [piece/m$^3$] on the horizontal axis. Also illustrated in FIG. 7 is a relationship between light use efficiency and particle density, in which the particle density is likewise indicated on the horizontal axis and the light use efficiency [%] is indicated on the vertical axis.

As illustrated in FIG. 7, increasing the particle density or, consequently, increasing $\Phi \cdot Np \cdot LG \cdot KC$, results in an enhanced light use efficiency but then illuminance unevenness also increases. The graphs also illustrate that reducing the particle density or, consequently, reducing $\Phi \cdot N_p \cdot L_G \cdot K_C$, results in lowered light use efficiency but then illuminance unevenness decreases.

$\Phi \cdot N_p \cdot L_G \cdot K_C$ of not less than 1.1 and not greater than 8.2 yields a light use efficiency of 50% or more and illuminance unevenness of 150% or less. Illuminance unevenness, when reduced to 150% or less, is inconspicuous.

Thus, it is understood that $\Phi \cdot N_p \cdot L_G \cdot K_C$ of not less than 1.1 and not greater than 8.2 yields light use efficiency above a certain level and a reduced illuminance unevenness.

Next, the optical member unit 22 is described.

The optical member unit 22 converts the illumination light emitted from the light exit surface 18a of the light guide plate

TABLE 1

| | $\Phi$ [m$^2$] | $N_p$ [piece/m$^3$] | $L_G$ [m] | $K_c$ | $\Phi N_p L_G K_c$ | Light use efficiency [%] | Illuminance unevenness [%] | Judgment |
|---|---|---|---|---|---|---|---|---|
| Example 1 | $2.0 \times 10^{-12}$ | $2.2 \times 10^{14}$ | 0.3 | 0.03 | 3.51 | 81.6 | 84 | o |
| Example 2 | $2.0 \times 10^{-12}$ | $4.3 \times 10^{14}$ | 0.3 | 0.02 | 6.21 | 84.7 | 149 | o |
| Example 3 | $2.0 \times 10^{-12}$ | $8.6 \times 10^{14}$ | 0.1 | 0.02 | 3.86 | 82.8 | 82 | o |
| Example 4 | $1.1 \times 10^{-10}$ | $1.5 \times 10^{13}$ | 0.3 | 0.008 | 3.91 | 83.0 | 105 | o |
| Example 5 | $1.1 \times 10^{-10}$ | $2.0 \times 10^{13}$ | 0.3 | 0.007 | 4.98 | 84.3 | 142 | o |
| Example 6 | $1.1 \times 10^{-10}$ | $3.5 \times 10^{13}$ | 0.1 | 0.007 | 2.86 | 79.2 | 47 | o |
| Comparative Example 1 | $2.0 \times 10^{-12}$ | $2.2 \times 10^{13}$ | 0.3 | 0.05 | 0.66 | 29.1 | 51 | x |
| Comparative Example 2 | $1.1 \times 10^{-12}$ | $2.5 \times 10^{12}$ | 0.3 | 0.01 | 0.99 | 43.4 | 59 | x |
| Comparative Example 3 | $4.8 \times 10^{-18}$ | $8.6 \times 10^{17}$ | 0.1 | 15.2 | 6.26 | 84.8 | 201 | x |
| Comparative Example 4 | $4.8 \times 10^{-18}$ | $1.7 \times 10^{18}$ | 0.1 | 13.9 | 11.5 | 84.9 | 225 | x |

FIG. 6 illustrates a result of measuring of a relationship between values of $\Phi \cdot N_p \cdot L_G \cdot K_C$ and light use efficiency (ratio of light emitted from light exit surface 18a with respect to light entered to light incident surface).

Table 1 and FIG. 6 illustrate that, by setting $\Phi \cdot Np \cdot LG \cdot KC$ to 1.1 or more, a high light use efficiency, specifically 50% or more, may be achieved whereas, by setting $\Phi \cdot Np \cdot LG \cdot KC$ to 8.2 or less, illuminance unevenness may be held to 150% or less.

It is also understood that, by setting Kc to 0.005 or more, a high light use efficiency may be achieved, and, by setting Kc to 0.1 or less, illuminance unevenness observed in light emitted from the light guide plate may be reduced to a low level.

Next, light guide plates varying in particle density Np of the fine particles kneaded or dispersed therein were fabricated to measure illuminance distributions of light emitted at different positions in the light exit surface of the individual light guide plates.

Illuminance unevenness was calculated from $[(I_{Max}-I_{Min})/I_{Ave}] \times 100$ [%], where $I_{Max}$ was a maximum illuminance in the 18 into light with less brightness unevenness to exit illumination light with less brightness unevenness from the light exit surface 14a of the illumination device main body 14, and includes, as illustrated in FIG. 2, three diffusion films (diffusion sheets) 22a, 22b, and 22c for diffusing the illumination light emitted from the light exit surface 18a of the light guide plate 18 to reduce brightness unevenness.

The three diffusion films 22a, 22b, and 22c are laminated on the light exit surface 18a of the light guide plate 18 in the order of the diffusion film 22a, the diffusion film 22b, and the diffusion film 22c from the light exit surface 18a side.

The diffusion films 22a, 22b, and 22c have the same sheet-shaped member, and hence the diffusion film 22a is typically described.

The diffusion film 22a is formed of a material in the form of film given a light diffusing property. The material in the form of film may be formed, for example, of an optically transparent resin such as polyethylene terephthalate (PET), polypropylene (PP), polycarbonate (PC), polymethyl methacrylate (PMMA), benzyl methacrylate, MS resin, or cycloolefin polymer (COP).

The method of forming the diffusion film 22a is not limited specifically. For example, a surface of the material in the form of film may be machined to form a fine asperity thereon or roughened by grinding thereby to provide a light diffusing property. The diffusion film may be alternatively formed by coating its surface with a material that diffuses light as exemplified by silica; pigments such as titanium oxide and zinc oxide; a resin; and beads of glass, zirconia, etc., together with a binder, or by kneading the above-mentioned pigments or beads into the above-mentioned transparent resin. Materials having a high reflectance and a low light-absorbing property such as metals as exemplified by Ag and Al may also be used to form the diffusion film 22a.

In the present invention, a diffusion film of a matte type or a coating type may be used as the diffusion film 22a.

In this embodiment, the optical member unit includes the three diffusion films 22a, 22b, and 22c. However, the present invention is not limited to this case. In addition to or instead of the diffusion films described above, examples of the optical member which may be used include a prism sheet in which a plurality of slender prisms are arranged parallel to each other on a surface of a transparent sheet and a light condensing property of light emitted from the light exit surface of the light guide plate 18 may be improved to increase brightness, and a transmittance adjustment member in which a large number of transmittance adjusters which are diffusion reflectors are arranged depending on the brightness unevenness.

The structure of the optical member and the number of respective members are not particularly limited. Various optical members capable of further reducing the brightness unevenness of the illumination light emitted from the light exit surface 18a of the light guide plate 18 may be used. For example, it is possible to use a structure in which a prism sheet is provided between two diffusion films and a structure in which a diffusion film, a prism sheet, and a transmittance adjustment member are laminated one by one. The arrangement order is not particularly limited.

In the prism sheet, a vertex of each of the prisms of the prism sheet may be opposed to the light exit surface 18a of the light guide plate 18 or reversed thereto. Another structure may include a first prism sheet and a second prism sheet which is identical thereto and provided thereon such that prisms of the second prism sheet intersect with prisms of the first prism sheet. Another prism sheet, which may be used, may have a structure in which a large number of triangular-pyramid-shaped (pyramid-shaped) prisms are arranged on a transparent sheet surface.

Next, the reflection plate 24 of the illumination device main body is described.

The reflection plate 24 has a shape corresponding to the rear surface of the light guide plate 18, that is, the rear surface 18b of the light guide plate 18, and is formed to cover the rear surface 18b. In other words, the reflection plate 24 is provided on the rear surface 18b side of the light guide plate 18 to have a shape along the rear surface 18b of the light guide plate 18.

The reflection plate 24 is made of a light reflection member and reflects light leaked from the rear surface 18b of the light guide plate 18 to cause the light to be incident on the light guide plate 18 again.

As described above, when the reflection plate 24 is arranged to be opposed to the rear surface 18b of the light guide plate 18 to reflect the light leaked from the rear surface 18b of the light guide plate 18 to thereby cause the light to be incident on the light guide plate 18, the light use efficiency may be improved.

The reflection plate 24 may be made of any material capable of reflecting the light leaked from the rear surface 18b of the light guide plate 18, and examples thereof which may be formed include a resin sheet in which PET or polypropylene (PP) is kneaded with a filler and then drawn into a void to increase reflectance, a sheet in which a mirror surface is formed on a transparent or white resin sheet surface by aluminum evaporation or the like, a foil made of a metal such as aluminum, a resin sheet supporting a metal foil, and a metal thin plate whose surface has sufficient reflectivity.

The upper guide reflection plates 34 each are provided between the light guide plate 18 and the diffusion film 22a, that is, on the light exit surface 18a side of the light guide plate 18 so as to cover the light sources 12 and the end portion of the light exit surface 18a of the light guide plate 18 (end portion of the first light incident surface 18d side and end portion of the second light incident surface 18e side). In other words, each of the upper guide reflection plates 34 is provided so as to cover a region including a part of the light exit surface 18a of the light guide plate 18 and a part of the array substrate 42 of the light source 12 in a direction parallel to the optical axis direction. That is, the two upper guide reflection plates 34 are provided at both end portions of the light guide plate 18.

The lower guide reflection plates 36 are provided on an opposite side to the light exit surface 18a of the light guide plate 18 side, that is, on the rear surface 18b side so as to cover a part of the light source 12. End portions of the lower guide reflection plates 36 which are located on the center side of the light guide plate are connected to the reflection plate 24.

The above-mentioned various materials used for the reflection plate 24 may be employed for the upper guide reflection plates 34 and the lower guide reflection plates 36.

When the upper guide reflection plates 34 are provided as described above, the light beams emitted from the light sources 12 may be prevented from leaking to the light exit surface 18 side without being incident on the light guide plate 18.

Therefore, the light beams emitted from the LED chips 40 of the light sources 12 may be allowed to efficiently enter the first light incident surface 18d and the second light incident surface 18e of the light guide plate 18 to improve the light use efficiency.

Similarly, also in the case of the lower guide reflection plates 36, the light beams emitted from the light sources 12 may be prevented from leaking to the rear surface 18b side of the light guide plate 18 without being incident on the light guide plate 18.

Therefore, the light beams emitted from the LED chips 40 of the light sources 12 may be allowed to efficiently enter the first light incident surface 18d and the second light incident surface 18e of the light guide plate 18 to improve the light use efficiency.

As long as the upper guide reflection plate 34 and the lower guide reflection plate 36 may reflect the light emitted from the light source 12 to the first light incident surface 18d side or the second light incident surface 18e side to cause the light emitted from the light source 12 to be incident on the first light incident surface 18d or the second light incident surface 18e and to guide the light incident on the light guide plate 18 to the center side of the light guide plate 18, shapes and widths thereof are not particularly limited.

Next, the case 16 is described.

The case 16 accommodates and supports the light sources 12 and the illumination device main body 14, and fundamentally includes the lower case 16a, the upper case 16b, and a folding member 16c.

The lower case 16a has an opened upper surface and is formed into a shape including a bottom surface portion and side surface portions which are provided on four sides of the bottom surface portion and perpendicular to the bottom surface portion. In other words, the lower case has a substantially rectangular solid box shape having one surface opened.

As illustrated in FIG. 2, the lower case 16*a* supports the illumination device main body 14 accommodated from thereabove on the bottom surface portion and the side surface portions, and covers surfaces other than the light exit surface 14*a* of the illumination device main body 14, that is, surfaces located on an opposite side of the light exit surface 14*a* of the illumination device main body 14, that is, the rear surface 18*b* and side surfaces thereof.

The upper case 16*b* has a substantially rectangular solid box shape in which a rectangular opening smaller than the rectangular light exit surface 14*a* of the illumination device main body 14 is formed as an opening portion 28 in an upper surface and a lower surface is opened.

As illustrated in FIG. 2, the upper case 16*b* is provided so as to coat the illumination device main body 14 and the lower case 16*a* accommodating the planar illumination device main body 14 at four side surfaces thereof, from an upper side (light exit surface side) of the illumination device main body 14 and the lower case 16*a*.

The folding member 16*c* has a concave (U-shaped) form in which cross sectional shapes thereof perpendicular to a predetermined direction are constantly equal to one another. In other words, the folding member is a rod-shaped member in which a cross sectional shape thereof perpendicular to an extending direction is a U-shape.

As illustrated in FIG. 2, the folding member 16*c* is fit by insertion between a side surface of the lower case 22 and a side surface of the upper case 24. An outside surface of one of parallel portions of the U-shape is connected to a side surface portion 22*b* of the lower case 22 and an outside surface of the other of the parallel portions is connected to a side surface of the upper case 24.

Various known methods such as a method using bolts and nuts and a method using an adhesive may be used as a method of connecting the lower case 16*a* and the folding member 16*c* and a method of connecting the upper case 16*b* and the folding member 16*c*.

When the folding member 16*c* is provided as described above, the stiffness of the case 16 may be increased to prevent the light guide plate from warping. Therefore, for example, light having no or less brightness unevenness may efficiently be emitted. Further, even when a light guide plate which is likely to warp is used, warping may be more reliably corrected or the light guide plate may be more reliably prevented from warping, and hence light having no brightness unevenness or light whose brightness unevenness is reduced may be emitted from the light exit surface.

Various materials such as a resin and a metal may be used for the upper case, the lower case, and the folding member of the case. It is preferable to use materials which are light in weight and have a high strength.

In this embodiment, the folding member has been described as a separate member. However, the folding member may be integrally formed with the upper case or the lower case. A structure may be used in which the folding member is not provided.

The planar illumination device 10 according to this embodiment further includes a light guide plate support portion 30 provided between the lower case 16*a* and the reflection plate 24. The light guide plate support portion 30 is made of a resin such as polycarbonate and is brought into contact with the lower case 16*a* and the reflection plate 24.

When the light guide plate support portion 30 is provided, the light guide plate 18 may be prevented from being displaced in the case 16, and the reflection plate 24 may be brought into close contact with the rear surface 18*b* of the light guide plate 18.

A power supply storing portion 32 (see FIG. 1) for storing a power supply (not shown) of the light sources 12 is attached to a rear side of the lower case 16*a*.

The planar illumination device 10 has the fundamental structure as described above.

The planar illumination device 10 emits blue light from the light emitting surface 40*a* of the LED chip 40. The blue light emitted from the light emitting surface 40*a* of the LED chip 40 passes through the fluorescent member 17 to be converted into white light, and then is incident on the first light incident surface 18*d* or the second light incident surface 18*e* of the light guide plate 18.

As described above, the light incident on the first light incident surface 18*d* or the second light incident surface 18*e* travels through the inner portion of the light guide plate 18 while being scattered by scatterers, and then is directly emitted from the light exit surface 18*a* or reflected on the rear surface 18*b* to be emitted therefrom. A part of the light which is leaked from the rear surface 1*b* is reflected on the reflection plate 24 to be incident on the inner portion of the light guide plate 18 again, and emitted from the light exit surface 18*a*.

Therefore, the light emitted from the light exit surface 18*a* passes (travels) through the optical member 22 such as the diffusion film 22*a*, and is emitted from the light exit surface 14*a*.

As described above, the light guide plate 18 of the planar illumination device 10 is formed into the shape in which the thickness thereof in the direction perpendicular to the light exit surface 18*a* becomes thicker with the increases in distances from the first light incident surface 18*d* or the second light incident surface 18*e*. Therefore, the light incident on the light incident surface may be sent to a position farther away from the light incident surface, and hence the light exit surface may be expanded. The light incident on the light incident surface may be suitably sent to a distant position, and hence the light guide plate may be formed into a shape in which the thickness is thin and the light exit surface is large. Thus, the planar illumination device may be reduced in thickness, increased in size, and reduced in weight.

The shape of the rear surface is set to the curved shape in which the inclined angle becomes smaller as the cross section in the direction perpendicular to the bisector $\alpha$ is shifted from the end portion to the central portion (bisector). Therefore, the light use efficiency may be improved. In addition, light may be prevented from being excessively emitted at the end portion of the light exit surface, that is, at a portion of the light exit surface which is close to the first light incident surface or close to the second light incident surface, and hence the occurrence of brightness unevenness may be prevented.

As in this embodiment, when the shape of the rear surface is set to the curved shape in which the inclined angle becomes smaller as the cross section in the direction perpendicular to the bisector $\alpha$ is shifted from the end portion to the central portion (bisector) and when the light guide plate is formed into the symmetrical shape, the brightness distribution of the light emitted from the light exit surface becomes a bell-shape brightness distribution, that is, a brightness distribution in which brightness increases with a shift to the central portion, and hence the brightness of the central portion of the light exit surface may be maximized.

The brightness distribution of the light emitted from the light exit surface is of bell-shaped, and hence it may be visually recognized that a brightness difference between the central portion and the peripheral portion is small and thus uniform light is emitted from the light exit surface. Therefore, light having a brightness distribution, which may be suitably used for a liquid crystal television set, may be emitted from the planar illumination device.

In the present invention, the bell-shape brightness distribution is a brightness distribution (illuminance distribution) in which, when average brightness (average illuminance) of light emitted from the light exit surface close to a light incident portion (other than portion in which brightness of an extreme vicinity of light incident portion pole rapidly increases or rapidly reduces) is assumed to be 1.0, average brightness (average illuminance) of light emitted from the light exit surface at the central portion is equal to or larger than 1.05 and equal to or smaller than 1.50.

The shape of the rear surface of the light guide plate is preferably a shape in which a cross section on a plane perpendicular to the bisector α is expressed by a part of a curved line satisfying a higher-order polynomial expression, more specifically, the following Expression (5). In Expression (5), $a_0$ and $a_i$ denote arbitrary real numbers and n denotes an arbitrary natural number (positive integer).

[Equation 2]

$$f(x) = a_0 + \sum_{i=1}^{n} a_i x^i \qquad \text{Expression (5)}$$

More specifically, the rear surface of the light guide plate preferably has a shape in which the cross section on the plane perpendicular to the bisector α is expressed by a part of a curved line satisfying the following Expression (6), that is, a shape in which the cross section is expressed by a part of an ellipsoid or a higher-order ellipsoid. In Expression (6), $a_n$ and $b_n$ denote arbitrary real numbers and n denotes an arbitrary natural number.

[Equation 3]

$$\frac{x^{2n}}{a_n^{2n}} + \frac{y^{2n}}{b_n^{2n}} = 1 \qquad \text{Expression (6)}$$

The rear surface of the light guide plate also preferably has a shape in which the cross section on the plane perpendicular to the bisector α is expressed by a part of a curved line satisfying the following Expression (7), that is, a shape in which the cross section is expressed by a part of a hyperbola or a higher-order hyperbola. In Expression (7), $a_n$ and $b_n$ denote arbitrary real numbers and n denotes an arbitrary natural number.

[Equation 4]

$$\frac{x^{2n}}{a_n^{2n}} - \frac{y^{2n}}{b_n^{2n}} = 1 \qquad \text{Expression (7)}$$

The rear surface of the light guide plate also preferably has a shape in which the cross section on the plane perpendicular to the bisector α is expressed by a part of a curved line satisfying the following Expression (8), that is, a shape in which the cross section is expressed by a part of a quadratic function or a $2^n$-order function. In Expression (8), $a_n$ denotes an arbitrary real number and n denotes an arbitrary natural number.

[Equation 5]

$$y = a_n x^{2n} \qquad \text{Expression (8)}$$

The rear surface of the light guide plate also preferably has a shape in which the cross section on the plane perpendicular to the bisector α is expressed by a part of a curved line satisfying the following Expression (9), that is, a shape in which the cross section is expressed by a curved line obtained by combining two or more higher-order elliptic functions. In Expression (9), $a_n$ and $b_n$ denote arbitrary real numbers, n denotes an arbitrary natural number (n≧2), C denotes an arbitrary constant, and $S_i$ denotes a real number satisfying $-1 \leq S_i \leq 1$.

[Equation 6]

$$\sum_{i=1}^{n} S_i \left( \frac{x^{2i}}{a_i^{2i}} + \frac{y^{2i}}{b_i^{2i}} \right) = C \qquad \text{Expression (9)}$$

The rear surface of the light guide plate also preferably has a shape in which the cross section on the plane perpendicular to the bisector α is expressed by a part of a curved line satisfying the following Expression (10), that is, a shape in which the cross section is expressed by a curved line obtained by combining two or more higher-order hyperbola functions. In Expression (10), $a_n$ and $b_n$ denote arbitrary real numbers, n denotes an arbitrary natural number (n≧2), C denotes an arbitrary constant, and $S_j$ denotes a real number satisfying $-1 \leq S_i \leq 1$.

[Equation 7]

$$\sum_{i=1}^{n} S_i \left( \frac{x^{2i}}{a_i^{2i}} - \frac{y^{2i}}{b_i^{2i}} \right) = C \qquad \text{Expression (10)}$$

The rear surface of the light guide plate also preferably has a shape in which the cross section on the plane perpendicular to the bisector α is expressed by a part of a curved line satisfying the following Expression (11), in other words, a shape in which the cross section is expressed by a curved line obtained by combining two or more $2^i$-order functions, that is, two or more even functions. In Expression (11), $a_n$ denotes an arbitrary real number, n denotes an arbitrary natural number (n≧2), and $S_j$ denotes a real number satisfying $-1 \leq S_i \leq 1$.

[Equation 8]

$$y = \sum_{i=1}^{n} S_i a_i x^{2i} \qquad \text{Expression (11)}$$

The rear surface of the light guide plate also preferably has a shape in which the cross section on the plane perpendicular to the bisector α is expressed by a part of a curved line satisfying the following Expression (12), that is, a shape in which the cross section is expressed by a part of a curved line obtained by selectively combining an ellipsoid, a higher-order ellipsoid, a hyperbola, a higher-order hyperbola, and a $2^i$-order function. It is assumed that, in Expression (12), $a_i$, $a_j$, $a_k$, $b_i$, $b_j$, and $b_k$ denote arbitrary real numbers, i, j, and k denote arbitrary natural numbers, $S_i$, $S_j$, and $S_k$ denote real numbers satisfying $-1 \leq S_i \leq 1$, $-1 \leq S_j \leq 1$, and $-1 \leq S_k \leq 1$, respectively, and $n_1$, $n_2$, and $n_3$ denote arbitrary natural numbers (positive integers).

[Equation 9]

$$\sum_{i=1}^{n_1} S_i \left( \frac{x^{2i}}{a_i^{2i}} + \frac{y^{2i}}{b_i^{2i}} \right) + \sum_{j=1}^{n_2} S_j \left( \frac{x^{2j}}{a_j^{2j}} - \frac{y^{2j}}{b_j^{2j}} \right) + y^2 - \sum_{k=1}^{n_3} S_k (a_k (x^{2k})^2) = C$$

Expression (12)

As described above, when the cross section of the rear surface of the light guide plate on the plane perpendicular to the bisector α is formed into the shape expressed by the part of the curved line satisfying any one of Expressions (6) to (12), the light use efficiency may be improved and the brightness distribution of the emitted light may be easily set to be of bell-shaped.

In particular, when the rear surface of the light guide plate has the shape in which the cross section on the plane perpendicular to the bisector α is expressed by the part of the curved line satisfying the following Expression (9), that is, the shape in which the cross section is expressed by the part of the curved line obtained by combining at least one elliptic function, an increase in brightness at the vicinity of the incident light portion may be suppressed in addition to the effect described above. As described above, the increase in brightness at the vicinity of the incident light portion may be suppressed, whereby the light emitted from the light source may be more efficiently used.

When a shape of a single symmetrical function or a shape in which a plurality of symmetrical functions are combined is employed, the rear surface of the light guide plate may be easily designed.

A function representing a curved line of the cross section of the rear surface on the plane perpendicular to the bisector a of the light guide plate is preferably a function whose derivative has no discontinuity. In other words, the curved line of the rear surface of the light guide plate preferably has a smoothly curved shape with no discontinuity.

As described above, when the rear surface of the light guide plate has the curved shape expressed by the function whose derivative has no discontinuity, light reflected on the rear surface may be prevented from concentrating on a particular position or light may be prevented from not being sent to only a particular position. Therefore, light emitted from the light exit surface may be prevented from generating a bright line or a dark line to cause brightness unevenness.

The rear surface is preferably connected to the light incident surface (first light incident surface or second light incident surface) without discontinuity. In other words, the inclined angle of the rear surface at a connection portion with the light incident surface is preferably equal to an angle of the light incident surface.

Therefore, incident light may be prevented from diffusely reflecting at the connection portion. When the inclined angle of the light incident surface side of the rear surface is made larger, an increase in brightness at the vicinity of the light incident surface may be suppressed to further increase the brightness of light in the central portion of the light guide plate. In addition, the light use efficiency, that is, a ratio of light emitted from the light exit surface with respect to light emitted from the light source may be increased.

Hereinafter, the planar illumination device is described in more detail with reference to specific examples.

Figure 8:
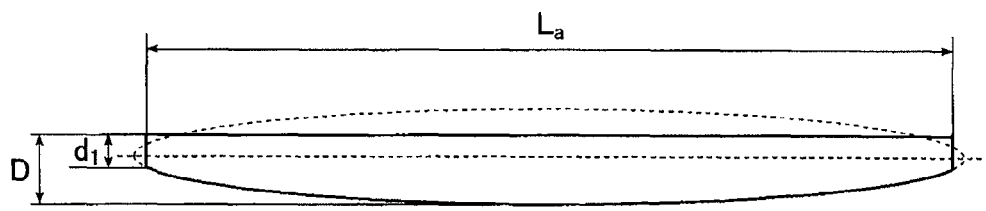
FIG. 8 is a cross sectional view illustrating an example of a shape of a light guide plate.

FIG. 8 is a cross sectional view illustrating an example of the light guide plate.

In this example, as illustrated in FIG. 8, the light guide plate was formed into a shape in which a length in an optical axis direction, that is, a length $L_a$ between the first light incident surface 18*d* and the second light incident surface 18*e* was set to 480 mm, a length of each of the first light incident surface and the second light incident surface in a direction perpendicular to the light exit surface, that is, a thickness d1 of a thinnest portion was set to 2 mm, and a length between the light exit surface and the rear surface on the bisector α, that is, a thickness D of a thickest portion was set to 4 mm. The rear surface of the light guide plate had a shape expressed by a part of an ellipsoid.

More specifically, the rear surface of the light guide plate had a curved shape in which, in the cross section perpendicular to the bisector α, a point which passed through the bisector α of the light guide plate, was located on a line perpendicular to the light exit surface, and was shifted from the light exit surface 18*a* to the rear surface 18*b* side by 1.8 mm was set as an origin, a direction parallel to the light exit surface was set as an X-axis, a direction perpendicular to the light exit surface was set as a Y-axis, a y-coordinate of an ellipsoid expressed by $(x^2/241^2)+(y^2/2.2^2)=1$ was negative ($0<y$), and a x-coordinate thereof was 240 to −240 (that is, $-240 \leq x \leq 240$).

As illustrated in FIG. 2, the three diffusion sheets were used for the optical member.

A brightness distribution of light emitted from the light exit surface of the planar illumination device having the structure as described above was measured.

For comparison, a brightness distribution of light emitted from the light exit surface of a planar illumination device using the following light guide plate was measured. In the light guide plate, a shape of the rear surface in the cross section perpendicular to the bisector was a shape inclined from the light incident surface to the center at a constant angle, that is, a shape in which the cross section perpendicular to the bisector of the rear surface was formed by two straight lines inclined at a predetermined angle relative to the light exit surface.

In the light guide plate used in the measurement example for comparison, the length d1 of each of the first light incident surface and the second light incident surface in the direction perpendicular to the light exit surface was set to 2 mm, the length D between the light exit surface and the rear surface on the bisector α was set to 4 mm, the central portion of the rear surface, that is, a connection portion between the two straight lines had a curved shape of R=15,000 [mm], and the two straight lines of the rear surface were smoothly connected to each other.

Figure 9:
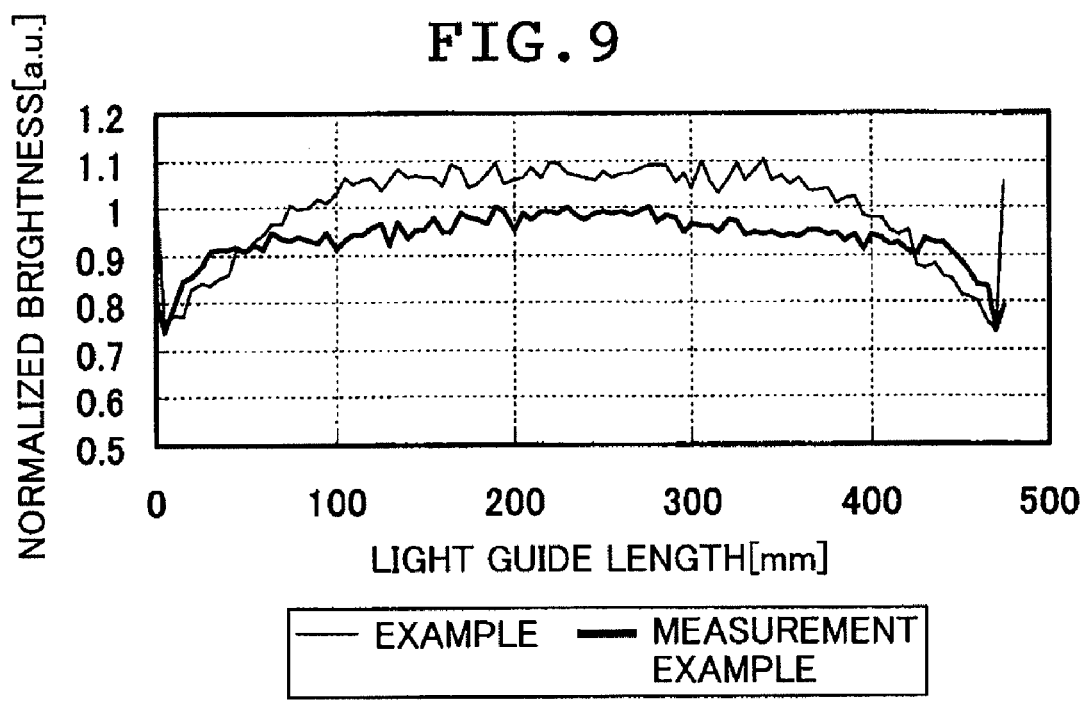
FIG. 9 is a graph illustrating brightness distributions of light emitted from a light exit surface of the planar illumination device.

FIG. 9 illustrates a result obtained by measurement. In the graph of FIG. 9, the ordinate indicates normalized brightness [a.u.] and the abscissa indicates a distance (light guide length) [mm] from one of the light incident surfaces of the light guide plate. The normalized brightness is brightness relative to an arbitrary reference value.

As is apparent from FIG. 9, when the rear surface of the light guide plate is the part of the ellipsoid and the entire rear surface has the curved shape, the brightness distribution of the light emitted from the light exit surface may be set to be of bell-shaped.

It is also apparent that, when the entire rear surface has the curved shape, the entire brightness and the brightness in the central portion of the light exit surface may be increased to improve the light use efficiency.

Next, an illuminance distribution and average brightness of light emitted from the light exit surface were measured in each of a planar illumination device using the light guide plate in which the shape of the rear surface may be expressed by the curved line satisfying Expression (6), that is, the part of ellipsoid (Example 1) and planar illumination devices using the light guide plates in which the shape of the rear surface may be expressed by the curved lines satisfying Expression (9), that is, a part of the curved lines obtained by combining the plurality of higher-order elliptic functions (Examples 2 and 3).

In any of Examples 1 to 3, the light guide plate was formed into a shape in which the length in the optical axis direction, that is, a length $L_a$ between the first light incident surface 18*d* and the second light incident surface 18*e* was set to 480 mm, the length of each of the first light incident surface and the second light incident surface in the direction perpendicular to the light exit surface, that is, the thickness d1 of the thinnest portion was set to 2 mm, and the length between the light exit surface and the rear surface on the bisector α, that is, the thickness D of the thickest portion was set to 4 mm. The light guide plate was formed by kneading and dispersing scattering particles having a particle diameter of 7 μm in the inner portion thereof at 0.05%.

In Example 1, the rear surface of the light guide plate had a curved shape in which, in the cross section perpendicular to the bisector α, a point which passed through the bisector α of the light guide plate, was located on a line perpendicular to the light exit surface, and was shifted from the light exit surface 18*a* to the rear surface 18*b* side by 2 mm was set as an origin, the direction parallel to the light exit surface was set as the X-axis, the direction perpendicular to the light exit surface was set as the Y-axis, a y-coordinate of an ellipsoid expressed by $(x2/2402)+(y2/22)=1$ was negative (0<y), and a x-coordinate thereof was "$-240 \leq x \leq 240$".

Next, in Example 2, the rear surface of the light guide plate had a curved shape in which, in the cross section perpendicular to the bisector α, the point which passed through the bisector α of the light guide plate, was located on the line perpendicular to the light exit surface, and was shifted from the light exit surface 18*a* to the rear surface 18*b* side by 2 mm was set as the origin, the direction parallel to the light exit surface was set as the X-axis, the direction perpendicular to the light exit surface was set as the Y-axis, a y-coordinate of an ellipsoid expressed by $0.8 \times \{x^2/240^2\}+(y^2/2^2)\}+0.2 \times \{x^4/240^4\}+(y^4/2^4)\}=1$ was negative (0<y), and a x-coordinate thereof was "$-240 \leq x \leq 240$".

Further, in Example 3, the rear surface of the light guide plate had a curved shape in which, when the shape of the rear surface of the light guide plate had the cross section perpendicular to the bisector α, the point which passed through the bisector α of the light guide plate, was located on the line perpendicular to the light exit surface, and was shifted from the light exit surface 18*a* to the rear surface 18*b* side by 2 mm was set as the origin, the direction parallel to the light exit surface was set as the X-axis, the direction perpendicular to the light exit surface was set as the Y-axis, a y-coordinate of an ellipsoid expressed by $0.9 \times \{x^2/240^2\}+(y^2/2^2)\}+0.1 \times \{x^4/240^4\}+(y^4/2^4)\}=1$ was negative (0<y), and a x-coordinate thereof was "$-240 \leq x \leq 240$".

For comparison, a brightness distribution and average brightness of light emitted from the light exit surface of a planar illumination device using the following light guide plate were measured. In the light guide plate, the shape of the rear surface in the cross section perpendicular to the bisector was the shape inclined from the light incident surface to the center at a constant angle, that is, the shape in which the cross section perpendicular to the bisector of the rear surface was formed by two straight lines inclined at a predetermined angle relative to the light exit surface.

In the light guide plate used in Measurement Example 1, the length d1 of each of the first light incident surface and the second light incident surface in the direction perpendicular to the light exit surface was set to 2 mm, the length D between the light exit surface and the rear surface on the bisector α was set to 4 mm, the central portion of the rear surface, that is, a connection portion between the two straight lines had a curved shape of R=25,000 [mm], and the two straight lines of the rear surface were smoothly connected to each other. The light guide plate was formed by kneading and dispersing scattering particles having a particle diameter of 7 μm in the inner portion thereof at 0.05%.

In Measurement Example 2, an illuminance distribution of light emitted from the light exit surface of a planar illumination device using a light guide plate having the same structure as in Measurement Example 1 except for that the scattering particles with the particle diameter of 7 μm had been kneaded and dispersed in the inner portion at 0.08% was measured.

Figure 10:
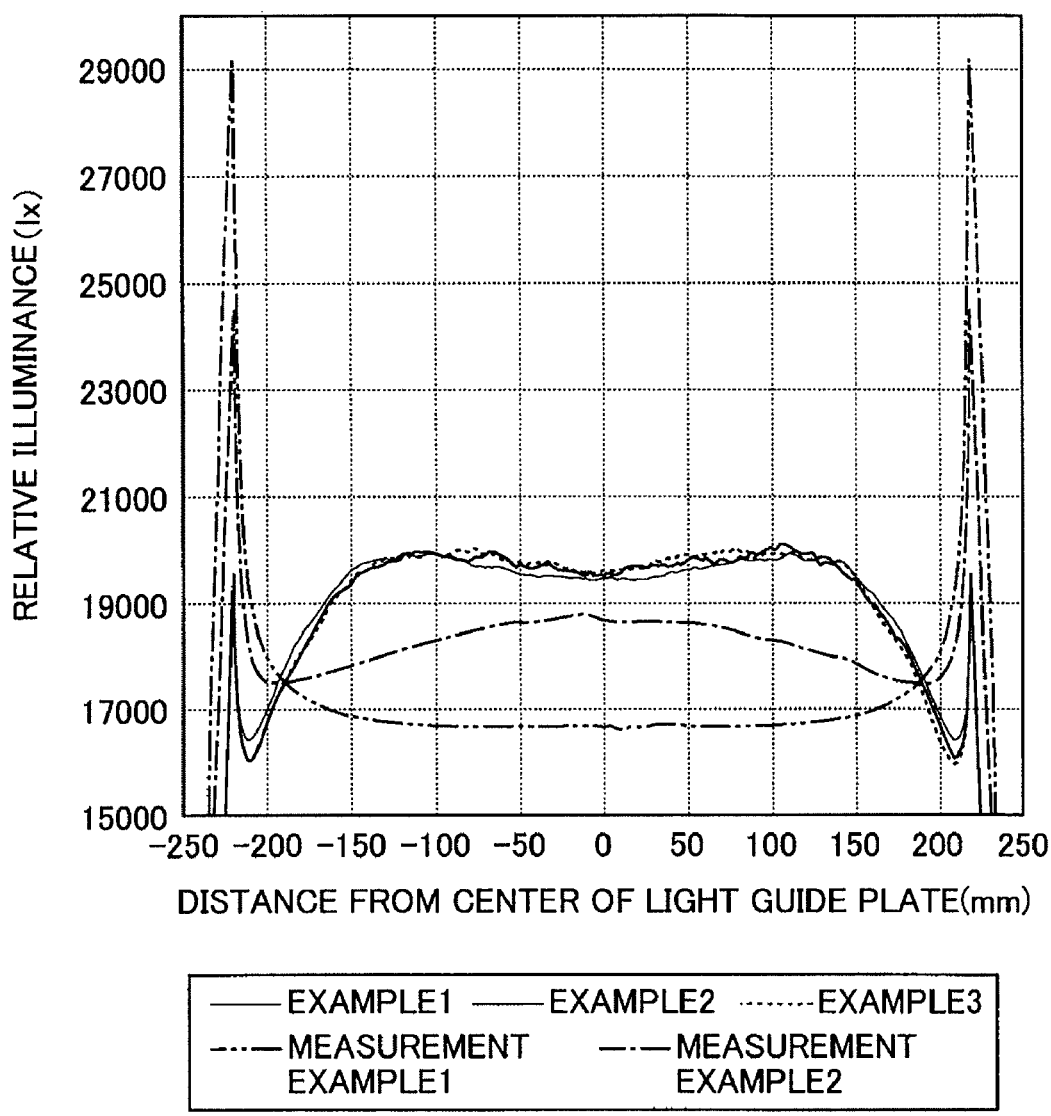
FIG. 10 is a graph illustrating brightness distributions of light emitted from the light exit surface of the planar illumination device.

A result obtained by measurement is illustrated in FIG. 10 and Table 2. In the graph of FIG. 9, the ordinate indicates relative illuminance [1×] and the abscissa indicates a position [mm] from the center (position of thickest portion of light guide plate) of the light guide plate.

TABLE 2

|  | Example 1 | Example 2 | Example 3 | Measurement Example 1 |
|---|---|---|---|---|
| Average brightness (lx) | 19,320 | 19,345 | 19,360 | 18,290 |
| Light use efficiency | 1.056 | 1.058 | 1.059 | 1.000 |

As illustrated in FIG. 10, as is also apparent from Examples 1 to 3, when the entire rear surface of the light guide plate has the curved shape, the brightness distribution of the light emitted from the light exit surface may be set to be of bell-shaped.

As is apparent from Examples 2 and 3, when the shape of the rear surface of the light guide plate is the shape expressed by the part of the curved line obtained by combining the higher-order elliptic functions, that is, the curved line satisfying Expression (9), it is possible to suppress the increase in brightness of light emitted from the light exit surface close to the light incident portion.

As is apparent from Table 2, in each of Examples 1 to 3 in which the entire rear surface of the light guide plate has the curved shape, the light use efficiency may be increased higher than in Measurement Example 1 by 5% or more. It is also apparent that the average brightness may be increased.

Therefore, an effect of the present invention is apparent.

Next, in the planar illumination device 10, the opening portions 50 are provided in a part of the fluorescent member 17 including the phosphor applying portion 48 for converting the blue light into the white light, to emit a part of the blue light emitted from the light emitting surface 40*a* of the LED chip 40 as blue light, and hence light whose color temperature is high may be emitted from the light exit surface of the light guide plate or the planar illumination device. In other words, the opening portions are provided in the part of the fluorescent member located between the light incident surface (first light incident surface or second light incident surface) of the light guide plate and the light emitting surface of the LED. A part of light emitted from the LED is caused to pass through the opening portions as blue light without any change, and the other part of the light which passing through the phosphor applying portion is converted into white light. Therefore, the light whose color temperature is high may be emitted from the light exit surface. The blue light and the white light which pass through the fluorescent member are mixed thereafter by passing through the light guide plate.

When a ratio of the opening portions 50 formed in the fluorescent member 17 is changed, a ratio between the white light and the blue light which pass through the fluorescent member 17 may be simply adjusted, and hence the color temperature may be simply adjusted. Therefore, light having a desired color temperature may be emitted from the light exit surface of the light guide plate or the planar illumination device by simple adjustment. The color temperature may be simply adjusted compared with the case where the color temperature is controlled based on the thickness of the fluorescent material of the fluorescent member.

In the fluorescent member 17, when an area of the entire fluorescent member 17 is expressed by Sa and when a sum of areas of the opening portions 50, that is, a sum of blue light transmission portion areas is expressed by Sap, a relationship between Sa and Sap preferably satisfies $0.05 \leq Sap/Sa \leq 0.40$.

When Sap/Sa is set to a value equal to or larger than 0.05, the color temperature may be made equal to or larger than 7,000 K. When Sap/Sa is set to a value equal to or smaller than 0.40, the color temperature may be made equal to or smaller than 35,000 K.

Hereinafter, the present invention is described in more detail with reference to a specific example.

In this specific example, a brightness distribution and a color temperature of light emitted from the light exit surface 14a of the planar illumination device 10 were measured at various values of the ratio of the sum Sap of blue light transmission portion areas to the area Sa of the entire fluorescent member 17.

Figure 11:
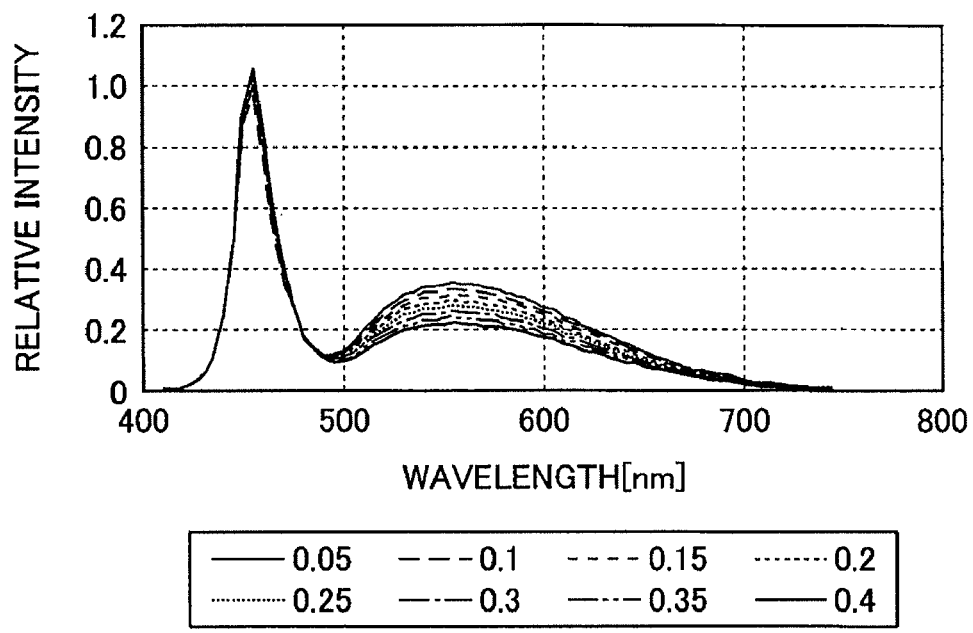
FIG. 11 is a graph illustrating results obtained by measuring wavelength distributions of light emitted from the light exit surface of the planar illumination device at various values of Sap/Sa.

FIG. 11 is a graph illustrating results obtained by measuring wavelength distributions (spectrums) of light emitted from the light exit surface of the planar illumination device in a case where the ratio of the sum Sap of blue light transmission portion areas to the area Sa of the entire fluorescent member 17, that is, Sap/Sa is set to 0.05, 0.1, 0.15, 0.2, 0.25, 0.3, 0.35, and 0.4. In the graph of FIG. 11, the ordinate indicates a relative intensity and the ordinate indicates a wavelength [nm].

Figure 12:
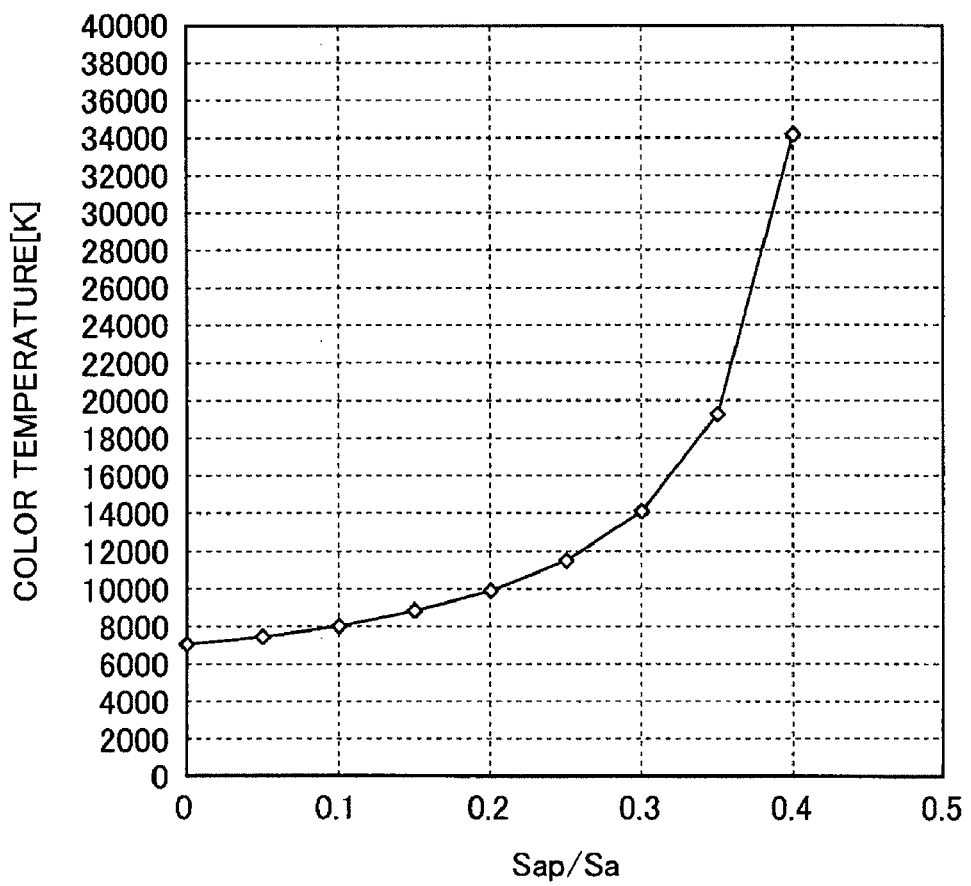
FIG. 12 is a graph illustrating a relationship between a ratio of a sum Sap of blue light transmission portion areas to an area Sa of the entire fluorescent member and a color temperature of light emitted from the light exit surface.

FIG. 12 is a graph illustrating a relationship between the ratio (Sap/Sa) of the sum Sap of the blue light transmission portion areas to the area Sa of the entire fluorescent member 17 and the color temperature of the light emitted from the light exit surface. In the graph of FIG. 12, the ordinate indicates a color temperature [K] and the abscissa indicates the ratio (Sap/Sa) of the sum Sap of the blue light transmission portion areas to the area Sa of the entire fluorescent member 17.

As is apparent from FIG. 12, when the opening portions are provided, the color temperature of the light emitted from the light exit surface may be increased.

As is apparent from FIG. 12, when Sap/Sa is changed, the color temperature may be adjusted to various values. Specifically, according to this embodiment, when the ratio of the opening portions to the entire fluorescent member is adjusted in $0.05 \leq Sap/Sa \leq 0.40$, the color temperature may be adjusted to an arbitrary color temperature which is equal to or larger than approximately 7,000 K and equal to or smaller than approximately 34,000 K. In other words, it is apparent that, only when the size of the opening portions is adjusted, the color temperature may be adjusted.

As is apparent from FIG. 11, when the ratio of the opening portions to the entire fluorescent member is adjusted, a color tint of light emitted from the light exit surface may also be adjusted.

Thus, an effect of the present invention is apparent.

In this embodiment, the opening portions 50 of the fluorescent member 17 are formed into the rectangular shape. However, the present invention is not limited to this shape and thus various shapes may be employed.

FIGS. 13A to 13C are front views illustrating other examples of the fluorescent member.

For example, as illustrated in FIG. 13A, openings 62a of a fluorescent member 60a may be formed into a circular shape, and a portion other than the openings 62a of a fluorescent member 60a may be a phosphor applying portion 64a. The shape of the openings is not limited to the circular shape and thus may be set to various shapes such as an elliptic shape, a polygonal shape, and a star shape.

As illustrated in FIG. 13B, openings 62b of a fluorescent member 60b may be formed into a rod shape parallel to a side of the light emitting surface, the openings 62b may be arranged at regular intervals, and a portion other than the openings 62b of a fluorescent member 60b may be a phosphor applying portion 64b.

As illustrated in FIG. 13C, openings 62c of a fluorescent member 60c may be formed into an X-shape, and a portion other than the openings 62c of a fluorescent member 60c may be a phosphor applying portion 64c.

As described above, the shape of the opening portions is not particularly limited. However, the plurality of opening portions are preferably provided for the light emitting surface of an LED chip. When the plurality of opening portions are provided for the light emitting surface of the LED chip, the blue light and the white light which are emitted from the LED chip and produced by passing through the fluorescent member may be easily mixed. Therefore, the light, which has no color unevenness or reduced color unevenness and a high color temperature, may be emitted from the light exit surface.

An area of the opening portions is preferably set to a value equal to or larger than $0.1$ mm$^2$ and equal to or smaller than $0.5$ mm$^2$. When the area of the opening portions is set to the value equal to or larger than $0.1$ mm$^2$, the opening portions may reliably be formed in the fluorescent member to emit the blue light from the opening portions. When the area is set to the value equal to or smaller than $0.5$ mm$^2$, the light beams passing through the fluorescent member may efficiently and reliably be mixed. Therefore, the light, which has no color unevenness or reduced color unevenness and a high color temperature, may be emitted from the light exit surface.

In this embodiment, the opening portions are formed in the part of the fluorescent member and the opening portions are used as the blue light transmission portions for transmitting the blue light without any change. However, the present invention is not limited to this. A fluorescent material may be selectively applied to a transparent sheet to form a phosphor applying portion in which the fluorescent material is applied onto the transparent sheet and transparent portions in which the fluorescent material is not applied thereon, and hence the transparent portions may be used as the blue light transmission portions for transmitting the blue light without any change.

In the embodiment described above, the fluorescent member is arranged in contact with the light emitting surface 40a of the LED chip 40 of the light source 12. However, the present invention is not limited to this. The fluorescent member may be arranged at any position between the light emitting surface of the LED and the light incident surface (first light incident surface or second light incident surface) of the light guide plate.

FIG. 14 is an enlarged cross sectional view illustrating another example of the planar illumination device according to the present invention.

The planar illumination device according to this embodiment has the symmetrical shape with respect to the bisector described above. Therefore, though one of the end portions of the light guide plate, that is, only the end portion located on the first light incident surface 18d side is illustrated and the description of the end portion located on the second light incident surface 18e side is omitted, the same structure is provided also on the second light incident surface 18e side. Other examples of the planar illumination device as described later are also the same.

As illustrated in FIG. 14, a fluorescent member 17a may be provided in contact with the first light incident surface 18d of the light guide plate 18. The fluorescent member 17a is preferably a sheet which is larger in area than the first light incident surface 18d or equal in area thereto. When the fluorescent member 17a is made equal in area to the first light incident surface 18d or the area of the fluorescent member 17a is made larger, the light emitted from the LED chip 40 may be prevented from being incident on the first light incident surface 18d of the light guide plate 18 without passing through the fluorescent member 17.

When the fluorescent member 17a is to be provided on the first light incident surface 18d of the light guide plate 18 as described above, the transparent sheet may not be used and the fluorescent material may be directly applied to the first light incident surface 18d of the light guide plate 18 to form the fluorescent applying portion and the opening portions, thereby providing the fluorescent member 17a.

In any example in the embodiment described above, the fluorescent member is bonded to the light guide plate or the light source. A separate sheet member may be used as the fluorescent member and provided between the light exit surface and the light emitting surface.

In the embodiment described above, the fluorescent member is formed into the single sheet shape. However, the present invention is not limited to this. The separate fluorescent member may be provided for each of the light emitting surfaces of the LED chips.

FIGS. 15A to 15C partially illustrate a fluorescent member and a light source in another example of the planar illumination device. FIG. 15A is a top view, FIG. 15B is a front view, and FIG. 15C is a side view.

Fluorescent members 70 illustrated in FIGS. 15A to 15C are provided for the respective LED chips 40. Each of the fluorescent members 70 is provided in contact with the light emitting surface 40a of the LED chip 40. In this embodiment, the fluorescent member 70 is bonded to the light emitting surface 40a.

The fluorescent member 70 includes a phosphor applying portion 72 and opening portions 74 and is provided to cover the entire light emitting surface 40a of the LED chip 40. The fluorescent member 70 includes the phosphor applying portion 72 formed by applying a fluorescent material and the opening portions 74 formed as circular openings which are arranged at predetermined intervals and have a predetermined diameter. In other words, the fluorescent member 70 includes the phosphor applying portion 72 which is a region for converting the blue light emitted from the LED chip 40 into the white light, and the opening portions which are regions for exiting the blue light as blue light, that is, the blue light transmission portions.

As described above, even in the case where the fluorescent member 70 is provided for each of the LED chips 40, when the fluorescent member 70 is provided on the entire light emitting surface 40a of each of the LED chips 40, the light emitted from the light emitting surface 40a passes (travels) through the phosphor applying portion 72 or the opening portions 74 of the fluorescent member 70.

Therefore, as in the case described above, the part of the light emitted from the LED chip 40 may be allowed to enter as the blue light and the light whose color temperature is high may be emitted from the light exit surface by the simple structure.

Even when the fluorescent member is provided for each of the light emitting surfaces of the LED chips, the shape of the opening portions is not particularly limited. As illustrated in FIG. 15A, the opening portions 74 may be formed into a circular shape. As illustrated in FIG. 16A, opening portions 78a of each of fluorescent members 76a may be formed into a rectangular shape.

The plurality of transparent portions are preferably provided for the light emitting surface 40a of each of the LED chips 40 so that the fluorescent member may efficiently mix the colors of the emitted light beams and emit the light having no color unevenness from the light exit surface. As illustrated in FIG. 16B, a structure may be employed in which an opening portion 78b is provided for each of the light emitting surfaces 40a. In other words, a structure may be employed in which the single opening portion 78b is provided for each of the fluorescent members 76b. Even in this case, the shape of the transparent portions is not particularly limited. In FIG. 16B, the opening portion 78b is formed in a rectangular shape. As illustrated in FIG. 16C, opening portion 78c of fluorescent member 76c may be formed into a circular shape. However, the present invention is not limited to this. Thus, various shapes such as an elliptic shape, a star shape, a polygonal shape, and an X-shape may be used.

When the fluorescent member 70 is provided in contact with the light emitting surface of the LED chip as in this embodiment, the fluorescent material may be directly applied to the light emitting surface to form the phosphor applying portion and the opening portions.

Therefore, the position of the fluorescent member 70 may be prevented from being displaced. In addition, the fluorescent member may be formed without using the transparent sheet, and hence the number of members may be reduced to further simplify a device structure.

Next, as illustrated in FIGS. 2 and 3, the LED chips 40 and the array board 42 in the light source 12 of the planar illumination device 10 according to this embodiment are inclined at a predetermined angle θ relative to a plane S which is perpendicular to the light exit surface 18a of the light guide plate 18 and parallel to a side in a long side direction, of the first light incident surface 18d or the second light incident surface 18e (hereinafter also referred to as "reference plane S"). Specifically, the light emitting surface 40a of the LED chip 40 is inclined at the angle θ relative to the reference plane S. In other words, the light emitting surface 40a is provided at a position obtained by rotation from the reference plane S to the light exit surface 18a by the angle θ.

As described above, the light source 12 is inclined, and hence the light emitted from the light source whose light emitting surface is large may be allowed to efficiently enter the light guide plate. The light source whose light emitting surface is large is used, and hence the amount of light emitted from the light source may be increased. In other words, the light emitted from the light source whose light emitting surface is large is efficiently allowed to enter the light guide plate, and hence high-brightness light may be emitted from the light exit surface of the light guide plate.

Even in the case where the light emitting surface is inclined at the predetermined angle, when the upper guide reflection plate and the lower guide reflection plate are provided to reflect the light emitted from the light source, the light emitted from the light source may be prevented from being emitted without being incident on the light guide plate, and hence the light emitted from the light source may be allowed to efficiently enter the first light incident surface or the second light incident surface of the light guide plate.

In the LED chip 40 of the light source 12, a length of the light emitting surface 40a in an inclined direction, that is, a length "a" of the light emitting surface 40a of the LED chip 40 in a direction orthogonal to an arrangement direction of the LED chips 40 in this embodiment (see FIG. 4) is preferably longer than a cross sectional length of the first light incident surface in a direction orthogonal to the light exit surface 18a on the first light incident surface 18d located on an edge side of the light exit surface 18a, in this embodiment, the length d1 of each of the first light incident surface 18d or the second light incident surface 18e of the light guide plate 18 in the direction perpendicular to the light exit surface 18a of the light guide plate 18 (hereinafter referred to as "effective cross sectional length d1 of light incident surface"), that is, a length of the light guide plate in a thickness direction on each of the first light incident surface 18d and the second light incident surface 18e.

When the length "a" of the light emitting surface 40a is set to a value larger than the effective cross sectional length d1 of the light incident surface, a larger amount of light may be emitted from the light emitting surface.

In the case where the light emitting surface 40a is inclined at the predetermined angle θ relative to the reference plane S, even when the length "a" of the light emitting surface 40a is set to the value larger than the effective cross sectional length d1 of the light incident surface, the light may be allowed to efficiently enter the light guide plate, and the light whose brightness is high may efficiently be emitted from the light exit surface of the light guide plate as described above.

The inclined angle θ of the light emitting surface 40a relative to the reference plane S is preferably equal to or larger than 15° and equal to or smaller than 90°, that is, satisfies $15° \leq θ \leq 90°$, more preferably equal to or larger than 15° and equal to or smaller than 75°, that is, satisfies $15° \leq θ \leq 75°$. The inclined angle θ is an angle obtained by inclining the light emitting surface 40a to the light exit surface 18a side relative to the reference plane S. When θ=90°, the light emitting surface 40a is parallel to the light exit surface 18a, and hence light is emitted from the light emitting surface 40a in the same direction as that of the light emitted from the light exit surface 18a of the light guide plate 18.

The inclined angle θ of the light emitting surface 40a is set to satisfy $15° \leq θ \leq 90°$, and hence the light use efficiency may further be increased and the light emitted from the light exit surface may be made uniform. When the angle is set to satisfy $15° \leq θ \leq 75°$, the light use efficiency may further be increased and the light may be made more uniform.

As in this embodiment, the light source 12 is preferably provided such that the light emitting surface 40 faces the light exit surface side. However, the present invention is not limited to this. The light emitting surface 40a of the light source 12 may be provided to face the rear surface 18b.

Hereinafter, the planar illumination device 10 is described in more detail with reference to a specific example. The planar illumination device according to this example has the symmetrical shape with respect to the bisector α described above. Therefore, the first light incident surface side is typically described.

In the planar illumination device according to this example, the length "a" of the light emitting surface 40a of the LED chip 40 in the direction orthogonal to the arrangement direction of the LED chips 40 was set to 2.5 mm, a thickness w1 of the LED chip 40 was set to 0.5 mm, a length d2 of the array board 42 in the direction orthogonal to the arrangement direction of the LED chips 40 was set to 3.0 mm, a thickness w2 of the array board 42 was set to 0.5 mm, the effective cross sectional length d1 of the first light incident surface 18d of the light guide plate 18 was set to 2.0 mm, and an overlap length of the upper guide reflection plate 34 over the light exit surface 18a of the light guide plate 18, that is, the length L between the end portion of the light incident surface 18d and the end portion of the upper guide reflection plate 34 which is located on the center side of the light guide plate 18, was set to 5 mm. A reflection film whose thickness is 0.1 mm and reflectance is 98% was used for the reflection plate 24 and the lower guide reflection plate 36. A reflection film whose thickness is 0.1 mm and reflectance is 90% was used for the upper guide reflection plate 34. The reflection plate 24 and the lower guide reflection plate 36 are formed using a single reflection film. The reflection plate 24 and the lower guide reflection plate 36 are folded at a connection portion, that is, at a position corresponding to the first light incident surface 18d located at the end portion of the light guide plate 18.

The light use efficiency of the light source of the planar illumination device, that is, a ratio of light emitted from the light exit surface to light emitted from the light source was measured in a case where the inclined angle θ of the light emitting surface 40a of the LED chip 40 in the light source 12 of the planar illumination device having the shape as described above is set to 15°, 30°, 45°, 60°, and 75°.

Figure 17A:
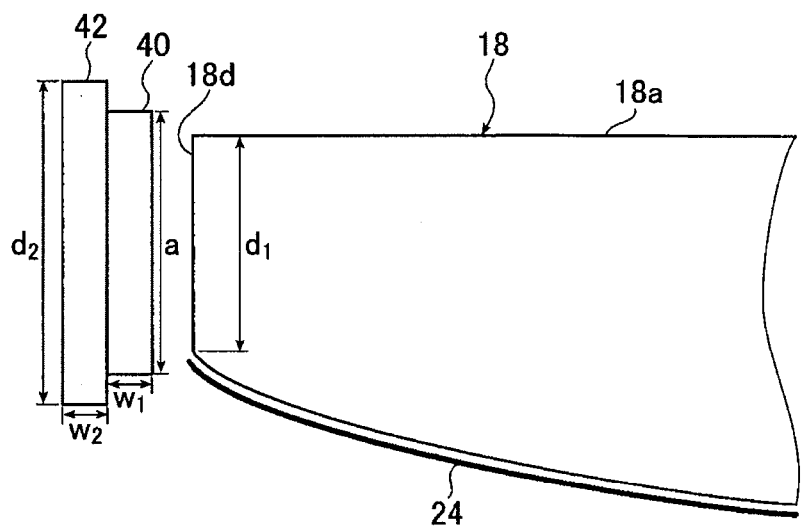
FIGS. 17A and 17B are enlarged cross sectional views illustrating respectively examples of the schematic structure of the planar illumination device according to the present invention.
Figure 17B:
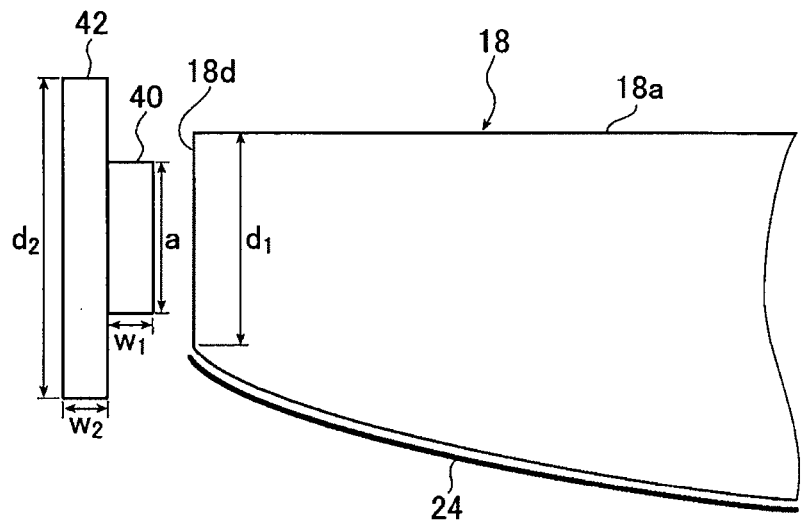

As illustrated in FIG. 17A, the light use efficiency of the light source of the planar illumination device in which θ=0, in other words, the light emitting surface 40a is provided at a position, that is, an angle to be parallel to the reference plane S, was measured. As illustrated in FIG. 17B, the light use efficiency of the light source of the planar illumination device in which the length "a" of the light emitting surface 40a of the LED chip 40 in the direction orthogonal to the arrangement direction of the LED chips 40 is set to 1.45 mm and θ=0° was measured. In FIG. 17, in order to clearly indicate the size lines, the fluorescent member 17 is omitted. However, as in the case of FIG. 3, the fluorescent member 17 is provided in contact with the light emitting surface 40a of the LED chip 40.

Results obtained by measurement are illustrated in Table 3 described below and FIG. 18.

TABLE 3

| a | 2.5 | 2.5 | 2.5 | 2.5 | 2.5 | 2.5 | 1.45 |
|---|-----|-----|-----|-----|-----|-----|------|
| Θ | 15 | 30 | 45 | 60 | 75 | 0 | 0 |
| Light use efficiency | 57% | 54% | 51% | 49% | 48% | 45% | 51% |

Figure 18:
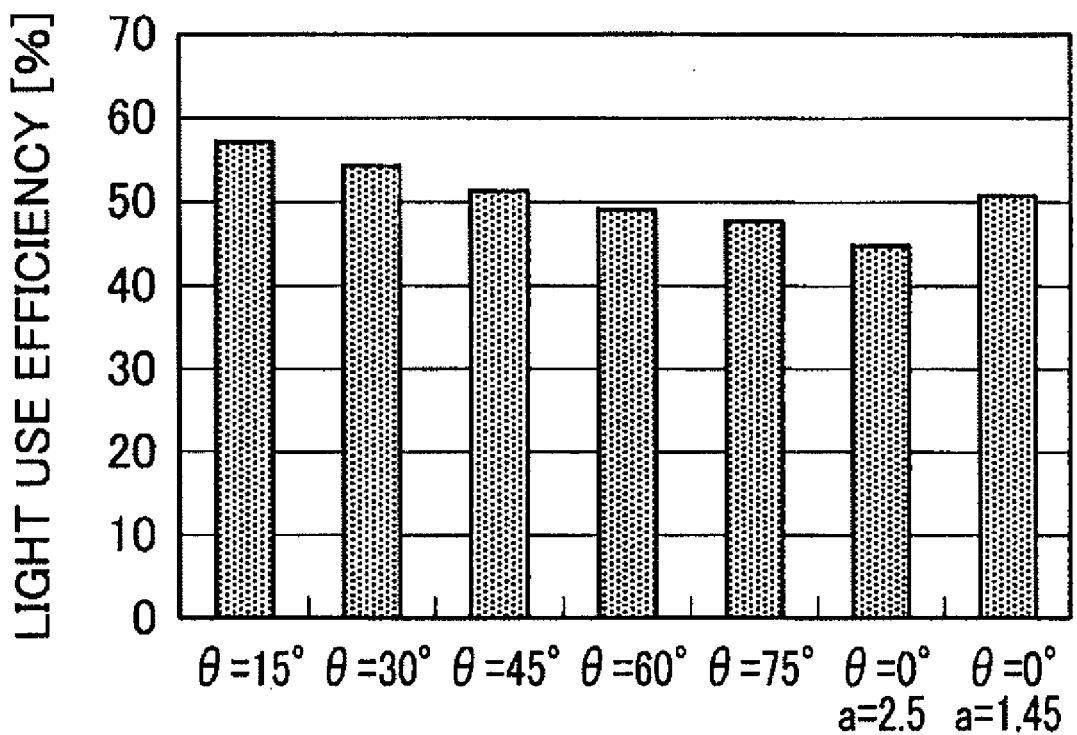
FIG. 18 is a graph illustrating results obtained by measuring light use efficiency of the planar illumination device at various values of an inclined angle θ of a light emitting surface.

As is apparent from Table 3 and FIG. 18, when the light emitting surface of the light source is inclined at the predetermined angle, the light use efficiency may be increased more than in the case where the light emitting surface 40a is provided at the position, that is, the angle to be parallel to the reference plane S. In other words, a larger amount of light may be allowed to enter the light guide plate to further increase brightness or illuminance of light emitted from the light source.

In this example, it is apparent that, when the inclined angle θ of the light emitting surface 40a is set to satisfy 15°≦θ≦45°, the light use efficiency may be increased more than in the case where the LED chip 40 is provided in which the length "a" of the light emitting surface 40a of the LED chip 40 in the direction orthogonal to the arrangement direction of the LED chips 40 is shorter than the effective cross sectional length of the light incident surface.

In other words, when the inclined angle θ of the light emitting surface is adjusted, the light emitted from the light source may be allowed to more efficiently enter the light guide plate to emit the light whose brightness and illuminance are higher from the light exit surface.

Next, a planar illumination device according to another embodiment is described.

Figure 19:
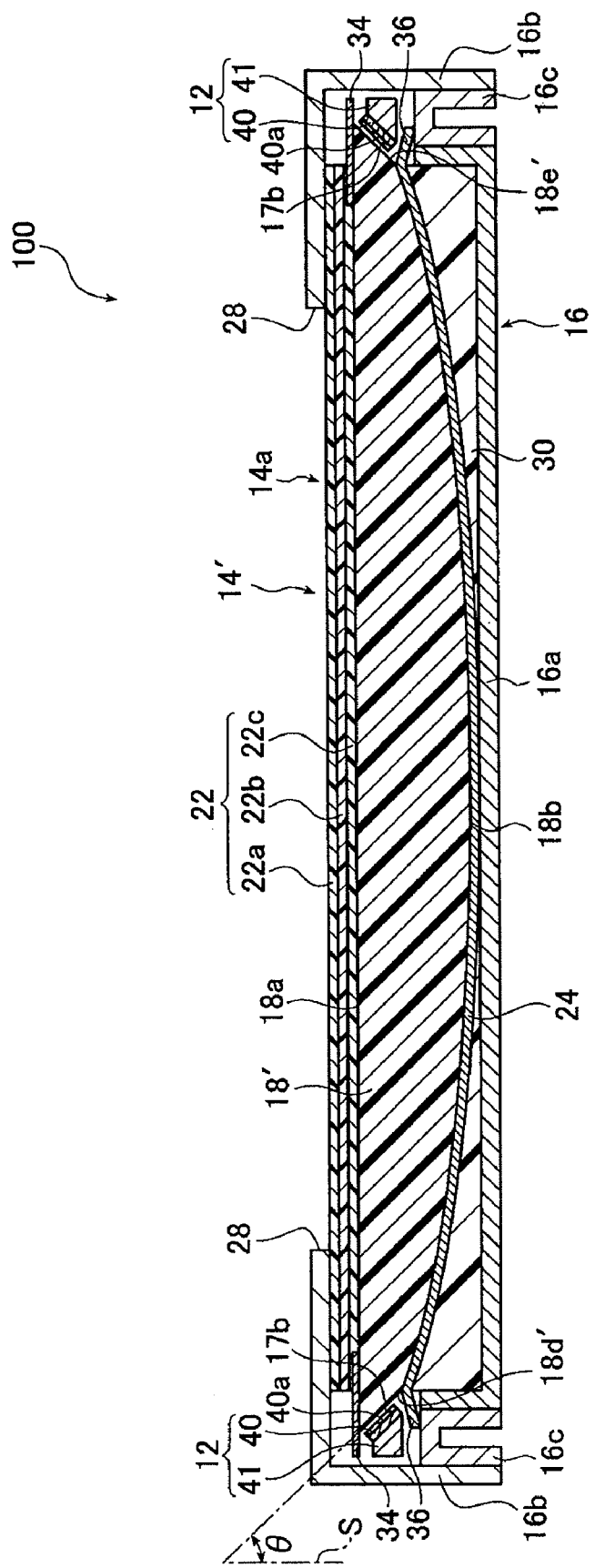
FIG. 19 is a cross sectional view illustrating a schematic structure of a planar illumination device according to another embodiment of the present invention.
Figure 20:
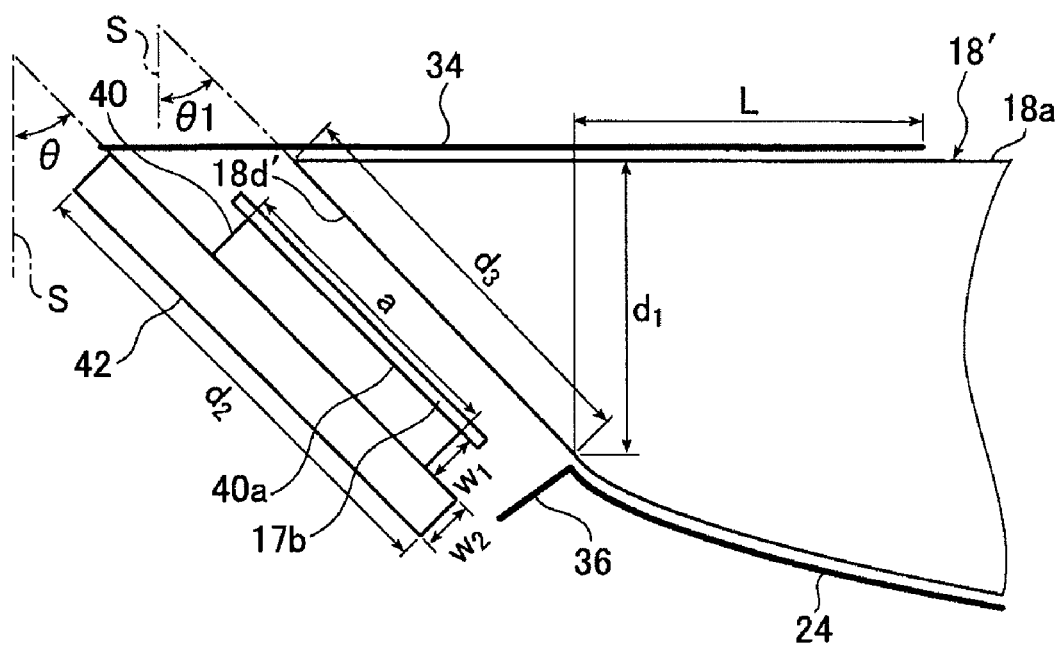
FIG. 20 is an enlarged cross sectional view illustrating an enlarged part of the planar illumination device illustrated in FIG. 19.

FIG. 19 is a schematic cross sectional view illustrating the planar illumination device according to the another embodiment of the present invention. FIG. 20 is an enlarged cross sectional view illustrating an enlarged part of the planar illumination device illustrated in FIG. 19.

A planar illumination device 100 illustrated in FIGS. 19 and 20 has the same structure as the planar illumination device 10 illustrated in FIGS. 1 to 3 except for a shape of a first light incident surface 18d' and a shape of a second light incident surface 18e' in a light guide plate 18'. Therefore, the same constituent elements in both devices are expressed by the same reference symbols and the detailed description thereof is omitted. Hereinafter, portions specific to the planar illumination device 100 are intensively described.

The planar illumination device 100 includes the light sources 12, an illumination device main body 14' for emitting uniform light from the rectangular-shaped light exit surface 14a, a fluorescent member 17b provided between each of the light sources 12 and the illumination device main body 14, and the case 16 which accommodates the light sources 12, the illumination device main body 14', and the fluorescent members 17b. The illumination device main body 14' includes a light guide plate 18', the optical member 22, the reflection plate 24, the upper guide reflection plates 34, and the lower guide reflection plates 36. Note that the light sources 12, the case 16, the optical member 22, the reflection plate 24, the upper guide reflection plates 34, and the lower guide reflection plates 36 are identical to those in the planar illumination device 10 described above, and hence the detailed description thereof is omitted.

As illustrated in FIGS. 19 and 20, the light guide plate 18' includes: the flat light exit surface 18a having the substantially rectangular shape; two light incident surfaces (first light incident surface 18d' and second light incident surface 18e') inclined at a predetermined angle θ1 relative to the reference plane S perpendicular to the light exit surface 18a at both ends of the light exit surface 18a; and the rear surface 18b which is located on the opposite side of the light exit surface 18a and symmetrical with respect to, as the center axis, the bisector α (see FIG. 1) which is parallel to the first light incident surface 18d' and the second light incident surface 18e' (parallel to the side of the light exit surface 18a which is in contact with the first or second light incident surface 18d' or 18e') and divides the light exit surface 18a into two. The rear surface 18b has a curved shape in which, in the cross section perpendicular to the bisector α, the distance from the light exit surface 18a increases with a shift from the first light incident surface 18d or the second light incident surface 18e to the bisector α, the inclined angle relative to the light exit surface reduces with a shift from the first light incident surface 18d or the second light incident surface 18e to the center, and the inclined angle is zero degree at the center. In other words, the rear surface 18b is formed into a curved shape which is convex in the direction away from the light exit surface 18a, has the vertex at the central portion of the light guide plate, and has the inclination which becomes gentle with a shift from an end surface to the central portion, in other words, a curved shape in which the angle formed between the tangent to the rear surface and the light exit surface becomes smaller with the shift from the end surface to the central portion. The tangent to the rear surface in the central portion of the light guide plate is parallel to the light exit surface.

The light sources 12 are opposed to the first light incident surface 18d' and the second light incident surface 18e' of the light guide plate 18'. That is, in the planar illumination device 10, the two light sources 12 are provided so as to sandwich the light guide plate 18'. In other words, the light guide plate 18' is interposed between the two light sources 12 opposed to each other at a predetermined interval.

The planar illumination device 100 has a symmetrical shape with respect to the bisector α as the center axis as in the case of the planar illumination device 10. Therefore, the first light incident surface side is typically described.

As illustrated in FIG. 20, in the planar illumination device 100 according to this embodiment, the inclined angle θ1 of the first light incident surface 18d' relative to the reference plane S is equal to the inclined angle θ relative to the reference plane S of the light emitting surface 40a of the LED chip 40 of the light source 12 which is opposed to the first light incident surface 18d'. That is, the first light incident surface 18d' is provided parallel to the light emitting surface 40a.

Even in the case where the first light incident surface 18d' of the light guide plate 18 is inclined at the predetermined angle relative to the reference plane S as described in this embodiment, when the fluorescent member 17b is provided on the light emitting surface 40a of the LED chip 40 of the light source 12, the color temperature of the light emitted from the light exit surface 14 may be increased. When the shape of the blue light transmission portions, that is, the opening portions or the transparent portions is adjusted, the color temperature of the light emitted from the light exit surface 14a may be controlled to a desirable color temperature. Even in this embodiment, the fluorescent member 17b may be provided at any position between the light emitting surface of the LED and the light exit surface of the light guide plate, for example, in contact (close contact) with the light incident surface.

When the first light incident surface 18d' of the light guide plate 18 is inclined at the predetermined angle θ1 relative to the reference plane S, a surface area of the first light incident surface 18' may be made larger than a surface area of an effective cross section of the first light incident surface 18'. Therefore, the light emitted from the light emitting surface 40a of the light source 12 may be allowed to efficiently enter the light guide plate 18'.

When the first light incident surface 18d' is inclined as described in this embodiment, a cross section in a direction substantially perpendicular to the light exit surface 18a at the edge of the first light incident surface 18d' located on the light exit surface 18a side, that is, at a contact (tangent, that is, connection position) between the first light incident surface 18d' and the light exit surface 18a, is an effective cross section of the light incident surface.

As described in this embodiment, when the first light incident surface 18d' of the light guide plate 18 is provided parallel to the light emitting surface 40a of the light source 12, that is, when the inclined angle of the first light incident surface relative to the reference plane S is made equal to the inclined angle of the light emitting surfaces of the light sources opposed to each other, the light emitted from the light emitting surface 40a may be allowed to efficiently enter the first light incident surface 18d' of the light guide plate 18.

As described in this embodiment, the inclined angle θ1 of the first light incident surface 18d' is preferably to set to an angle equal to the inclined angle θ of the light emitting surface 40a of the light source. However, the present invention is not limited to this. The inclined angle θ1 may be different from the inclined angle θ. In other words, the light emitting surface 40a may be inclined at the predetermined angle relative to the first light incident surface 18d'.

Hereinafter, the planar illumination device 100 is described in more detail with reference to a specific example.

In the planar illumination device 100 according to this example, the length "a" of the light emitting surface 40a of the LED chip 40 in the direction orthogonal to the arrangement direction of the LED chips 40 was set to 2.5 mm, the thickness w1 of the LED chip 40 was set to 0.5 mm, the length d2 of the array board 42 in the direction orthogonal to the arrangement direction of the LED chips 40 was set to 3.0 mm, the thickness w2 of the array board 42 was set to 0.5 mm, the effective cross sectional length d1 of the first light incident surface 18d' of the light guide plate 18' was set to 2.0 mm, a length of the first light incident surface 18d', that is, a length d3 of the first light incident surface 18d' joining the light exit surface 18a with the rear surface 18b was set to (2.0/cos θ1), and an overlap length of the upper guide reflection plate 34 over the light exit surface 18a of the light guide plate 18', that is, the length L between the end portion of the light incident surface 18d' and the end portion of the upper guide reflection plate 34 which is located on the center side of the light guide plate 18' was set to 5 mm. A reflection film whose thickness is 0.1 mm and reflectance is 98% was used for the reflection plate 24 and the lower guide reflection plate 36. A reflection film whose thickness is 0.1 mm and reflectance is 90% was used for the upper guide reflection plate 34. The reflection plate 24 and the lower guide reflection plate 36 are formed using a single reflection film. The reflection plate 24 and the lower guide reflection plate 36 are folded at a connection portion, that is, at a position corresponding to the first light incident surface 18d' of the light guide plate 18'.

The light emitting surface 40a of the light source 12 and the first light incident surface 18d' of the light guide plate 18 were made parallel to each other, that is, the inclined angle θ of the light emitting surface 40a and the inclined angle θ1 of the first light incident surface 18d' were set to be equal to each other.

The light use efficiency of the light source of the planar illumination device was measured in a case where the inclined angle θ of the light emitting surface 40a and the first light incident surface θ1 in the planar illumination device having the shape as described above are set to satisfy θ=θ1 and θ is set to 15°, 30°, 45°, 60°, and 75°.

As in the example described above, as illustrated in FIG. 17A, the light use efficiency of the light source of the planar illumination device in which θ=0°, in other words, the light emitting surface 40a is provided at a position or an angle to be parallel to the reference plane S, was measured. As illustrated in FIG. 17B, the light use efficiency of the light source of the planar illumination device in which the length "a" of the light emitting surface 40a of the LED chip 40 in the direction orthogonal to the arrangement direction of the LED chips 40 is set to 1.45 mm and θ=0° was also measured.

Results obtained by measurement are illustrated in Table 4 described below and FIG. 21.

TABLE 4

| a | 2.5 | 2.5 | 2.5 | 2.5 | 2.5 | 2.5 | 1.45 |
|---|---|---|---|---|---|---|---|
| Θ | 15 | 30 | 45 | 60 | 75 | 0 | 0 |
| Θ1 | 15 | 30 | 45 | 60 | 75 | 0 | 0 |
| Light use efficiency | 60% | 60% | 59% | 55% | 44% | 45% | 51% |

Figure 21:
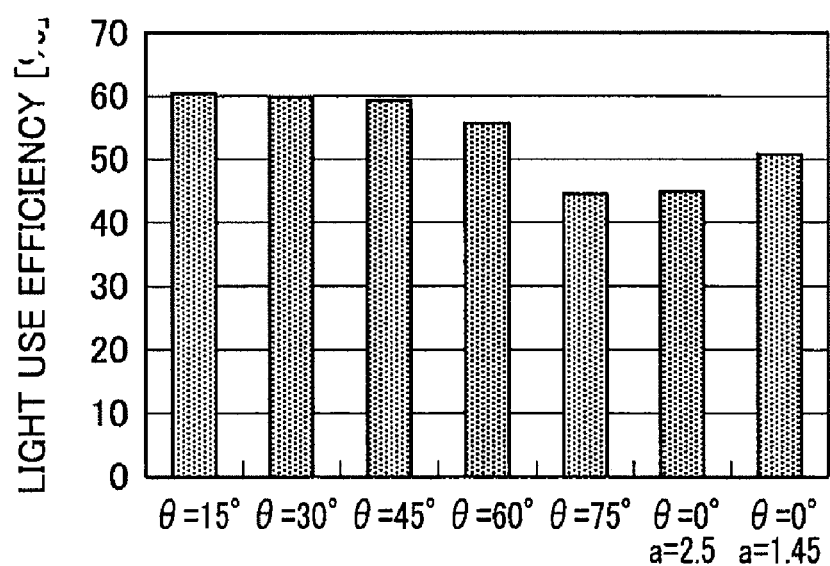
FIG. 21 is a graph illustrating results obtained by measuring light use efficiency of the planar illumination device at various values of the inclined angle θ of the light emitting surface.

As is apparent from Table 4 and FIG. 21, when the light emitting surface of the light source and the light incident surface of the light guide plate are inclined at the predetermined angle, the substantially same light use efficiency as in the case where the light emitting surface 40a is provided at the position, that is, the angle to be parallel to the reference plane S, may be obtained, or the light use efficiency may be increased more than in the case where the light emitting surface 40a is provided at the position to be parallel to the reference plane S. In this embodiment, the same light source is used. However, when the light emitting surface is inclined, the size of the light source may further be increased. In other words, a larger amount of light may be allowed to enter the light guide plate to further increase brightness or illuminance of light emitted from the light source.

In this example, it is apparent that, when the inclined angle θ of the light emitting surface 40a and the inclined angle θ1 in the light guide plate are set to satisfy θ=θ1 and 15°≦θ≦60°, the light use efficiency may be increased more than in the case where the LED chip 40 is provided in which the length "a" of the light emitting surface 40a of the LED chip 40 in the direction orthogonal to the arrangement direction of the LED chips 40 is shorter than the effective cross sectional length of the light incident surface.

In other words, when the inclined angle θ of the light emitting surface and the inclined angle θ1 in the light guide plate are adjusted, the light emitted from the light source may be allowed to more efficiently enter the light guide plate to emit the light whose brightness and illuminance are higher from the light exit surface.

Next, another specific example is described.

In this example, brightness (cd/m²), illuminance (1x), light use efficiency [%], and average brightness (cd/m²) at each position of light emitted from the light exit surface of each of two planar illumination devices were measured at θ=45°. The two planar illumination devices have substantially the same structure as the specific example of the planar illumination device 10 in which the length L between the end portion of the light incident surface 18d and the end portion of the upper guide reflection plate 34 which is located on the center side of the light guide plate 18 was set to 5 mm.

Light use efficiency [%] of the light source and average brightness (cd/m²) of light emitted from the light exit surface in each of two planar illumination devices were measured at θ=θ1=45°. The two planar illumination devices have substantially the same structure as the specific example of the planar illumination device 100 except for the point that the length L between the end portion of the light incident surface 18d' and the end portion of the upper guide reflection plate 34 which is located on the center side of the light guide plate 18 was set to 5 mm and 10 mm. Light use efficiency [%] of the light source and average brightness (cd/m²) of light emitted from the light exit surface in a planar illumination device in which no reflection plate is provided and the light incident surface of the light guide plate and the light emitting surface of the light source are provided parallel to the reference plane were also measured.

Table 5 illustrates measured light use efficiency [%] and measured average brightness (cd/m²).

TABLE 5

| θ | 45 | 45 | 45 | 0 |
|---|---|---|---|---|
| θ1 | 0 | 45 | 45 | 0 |
| L | 5 | 5 | 10 | 0 |
| Light use efficiency | 50.70% | 57.70% | 52.00% | 48.70% |
| Average brightness | 2160 | 2418 | 2332 | 2073 |

As is apparent from Table 5, when the light incident surface is inclined and the upper guide reflection member is provided, the average brightness and the light use efficiency may further be increased.

It is apparent that, when the length L of the upper guide reflection plate is set to 5 mm, the average brightness may be increased.

Therefore, an effect of the present invention is apparent.

Next, a planar illumination device according to still another embodiment of the present invention is described.

Figure 22A:
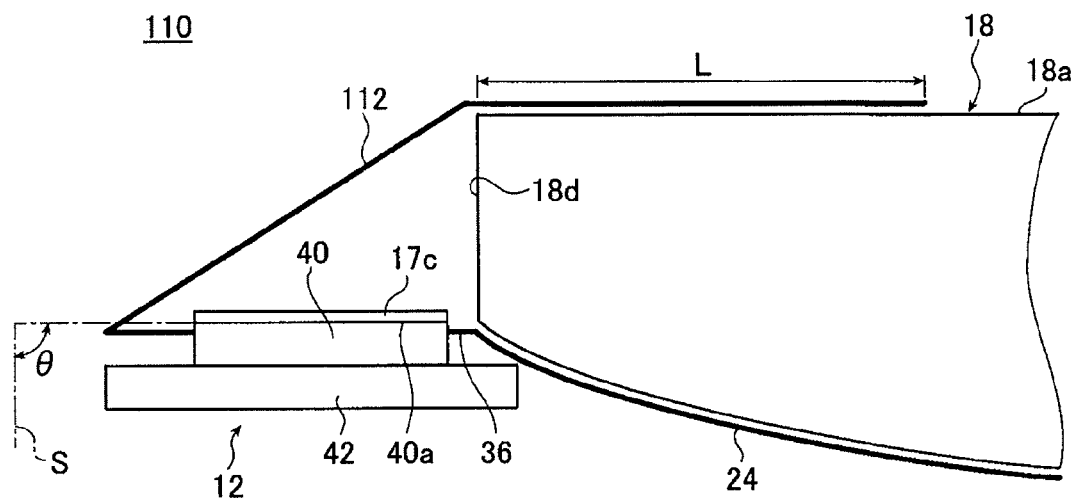
FIGS. 22A and 22B are enlarged cross sectional views illustrating respectively other examples of the schematic structure of the planar illumination device according to the present invention.
Figure 22B:
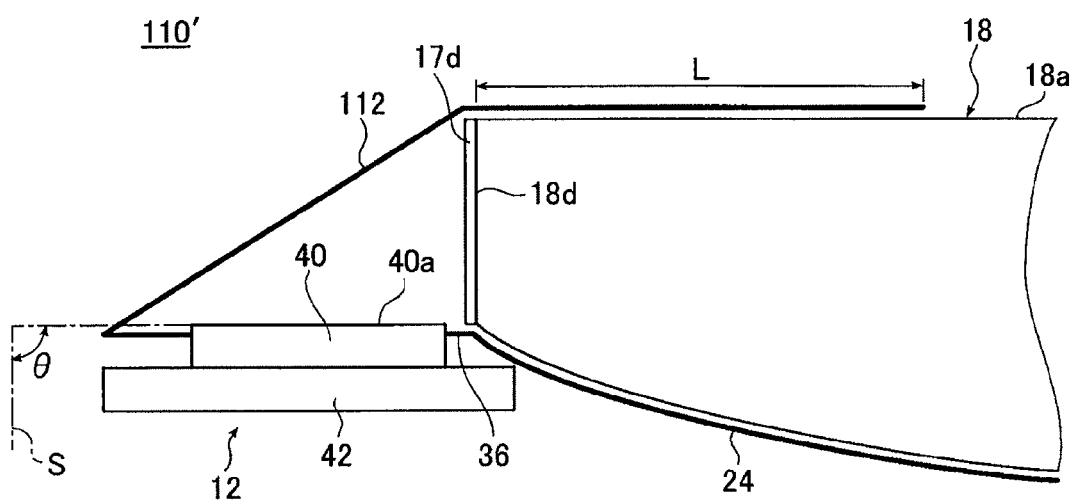
Figure 23:
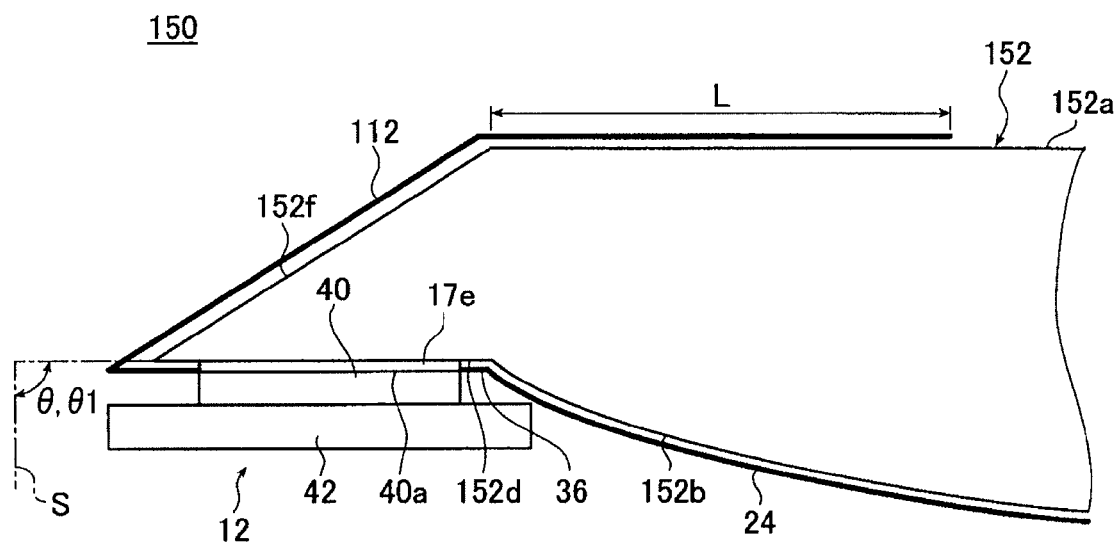
FIG. 23 is an enlarged cross sectional view illustrating another example of the schematic structure of the planar illumination device according to the present invention.

FIGS. 22A, 22B, and 23 are enlarged cross sectional views illustrating the planar illumination device according to the still another embodiment of the present invention. A planar illumination device 110 illustrated in FIG. 22A, a planar illumination device 110' illustrated in FIG. 22B, and a planar illumination device 150 illustrated in FIG. 23 have the same symmetrical shape as the planar illumination device 10 and the planar illumination device 100, and hence only one of end portions is illustrated.

The planar illumination device 110 illustrated in FIG. 22A fundamentally has the same structure as the planar illumination device 10 except for the point that the inclined angle θ of the light emitting surface 40a relative to the reference plane S is set to 90°.

The light source 12 of the planar illumination device 110 is provided at a position in which the inclined angle θ of the light emitting surface 40a of the LED chip 40 is 90°, that is, provided such that the light emitting surface 40a is perpendicular to the first light incident surface 18d. The LED chip 40 is provided on the rear surface 18b side of the first light incident surface 18d. In other words, the LED chip 40 is provided adjacently to the end portion of the first light incident surface 18d which is located on the rear surface 18b side and in a direction in which the light emitting surface 40a is parallel to a direction perpendicular to the first light incident surface 18d.

A fluorescent member 17c is provided in contact with the light emitting surface 40a of the LED chip 40. A structure and shape of the fluorescent member 17c are equal to those of the fluorescent member 17 described above, and hence the description thereof is omitted.

An upper guide reflection plate 112 is a plate-shaped member folded at the end portion of the light exit surface of the light guide plate 18, and provided to cover a region including a part of the light exit surface 18a of the light guide plate 18 and the end portion of the light emitting surface 40a of the LED chip 40 which is located on a farther side than the first light incident surface 18d. The same material as that of the upper guide reflection plate 34 described above may be used for the upper guide reflection plate 112.

In the planar illumination device 110, light which is emitted from the light source 12 and passes through the fluorescent member 17c is directly incident on the light guide plate 18 from the first light incident surface 18d, or incident thereon after the light is reflected on the upper guide reflection plate 112. The light incident on the light guide plate 18 is emitted from the light exit surface as in the case of the planar illumination device 10 described above.

Even in the structure according to this embodiment, when the fluorescent member 17e is provided on the light emitting surface 40a of the LED chip 40 of the light source 12, the color temperature of the light emitted from the light exit surface 14 may be increased. When the shape of the blue light transmission portions, that is, the opening portions or the transparent portions are adjusted, the color temperature of the light emitted from the light exit surface 14a may be controlled to a desirable color temperature.

As described above, even when the inclined angle θ of the light emitting surface 40a is set to 90°, the light emitted from the light source whose light emitting surface is large, for example, the light source whose light emitting surface is longer than the effective cross sectional length of the light incident surface may be allowed to efficiently enter the light exit surface to improve the light use efficiency. When the inclined angle θ is set to 90°, the area of the light emitting surface may further be increased, and hence the light whose brightness or illuminance is high may be emitted from the light exit surface.

Even in this embodiment, the location of the fluorescent member is not particularly limited. As illustrated in FIG. 22B, a fluorescent member 17c may be provided at a position in contact with the first light incident surface 19d of the light guide plate 18 in the planar illumination device 110'.

The planar illumination device 150 illustrated in FIG. 23 has the same structure as the planar illumination device 110 illustrated in FIG. 22A except for a shape of a light guide plate 152.

The light guide plate 152 includes: a flat light exit surface 152a having a substantially rectangular shape; two side surfaces (first side surface 152f and second side surface 152g) inclined at a predetermined angle relative to the light exit surface 152a at both ends of the light exit surface 152a; a rear surface 152b which is located on an opposite side of the light exit surface 152a and symmetrical with respect to, as the center axis, the bisector α (see FIG. 1) which is parallel to the side surfaces and divides the light exit surface 152a into two; and two light incident surfaces (first light incident surface 152d and second light incident surface 152e) formed between the respective end portions of the rear surface 152b and end portions of the side surfaces. The rear surface 152b has a curved shape in which, in the cross section perpendicular to the bisector α, the distance from the light exit surface 152a increases with a shift from the end portion to the bisector α, the inclined angle relative to the light exit surface reduces with a shift from the end portion to the center, and the inclined angle is zero degree at the center. Note that the light guide plate 152 has a shape in which an angle formed between the light exit surface 152a and the first side surface 152d is larger than 90° and an angle formed between the first light incident surface 152d and the first side surface 152f is smaller than 90°. The first light incident surface 152d is formed such that the inclined angle θ1 relative to the reference plane S is 90°.

In this embodiment, a cross section of the light guide plate 152 in a direction substantially orthogonal to the light exit surface 152a at an edge of the first light incident surface 152d located on the end surface 152b side is an effective cross section of the light incident surface.

The planar illumination device 150 has the symmetrical shape, and hence only one end portion on the first side surface 152d side is illustrated in FIG. 23.

The light source 12 includes the plurality of LED chips 40 and the light source support portion 41 and is opposed to the first light incident surface 152d formed between the rear surface 152b and the first side surface 152f of the light guide plate 152.

The light source 12 is provided at the position in which the inclined angle θ of the light emitting surface 40a relative to the reference plane S is 90°. Therefore, the light emitting surface 40a of the light source 12 is parallel to the first light incident surface 152d.

The upper guide reflection plate 112 is provided along a shape of a part of the light exit surface 152a which is located on the first side surface 152f side and a shape of the first side surface 152f to cover the light guide plate 152. The end portion of the upper guide reflection plate 112 which is located on the first side surface 152f side of the light guide plate 152 is connected to the light source 12.

The lower guide reflection plate 36 and the reflection plate 24 are provided on the rear surface 152b side of the light guide plate 152.

In other words, in the light guide plate 152, the light exit surface 152a located on the first side surface 152f side, the first side surface 152f, the first light incident surface 152d, and the rear surface 152b are covered without gaps with the upper guide reflection plate 112, the light source 12, the lower guide reflection plate 36, and the reflection plate 24. In this embodiment, the reflection plate 24 is integrally formed with the lower guide reflection plate 36.

The fluorescent member 17e is provided between the first light incident surface 152d and the light emitting surface 40a of the LED. A shape and structure of the fluorescent member 17e are equal to those of the fluorescent member 17 described above, and hence the detailed description thereof is omitted.

Light emitted from the light emitting surface 40a of the light source 12 passes through the fluorescent member 17e and then is incident on the light guide plate 152 from the first light incident surface 152d. The light directly travels to the center side of the light guide plate 152 or is reflected on the first side surface 152f or the upper guide reflection plate 112 to travel to the center side of the light guide plate 152.

As in the case of the light guide plate 18 described above, the light traveling to the center side of the light guide plate 152 passes through the inner portion of the light guide plate 152 while being scattered by scatterers (described in detail later) contained in the inner portion of the light guide plate 152, and then is directly emitted from the light exit surface 152a or reflected on the rear surface 152b to be emitted therefrom.

Even in the structure according to this embodiment, when the fluorescent member 17e is provided on the light emitting surface 40a of the LED 40 of the light source 12, the color temperature of the light emitted from the light exit surface 14a may be increased. When the shape of the blue light transmission portions, that is, the opening portions or the transparent portions are adjusted, the color temperature of the light emitted from the light exit surface 14a may be controlled to a desirable color temperature.

The light emitting surface of the light source is inclined at the predetermined angle relative to the reference plane, the light incident surface of the light guide plate is inclined at the predetermined angle, and the side surface is provided between the light incident surface and the light exit surface of the light guide plate. Even in such a case, the light emitted from the light source may be allowed to efficiently enter the light guide plate to improve the light use efficiency.

When the side surface is provided for the light guide plate and the light exit surface is provided on the rear surface side, the area of the light emitting surface of the light source may further be increased, and hence the light whose brightness or illuminance is high may be emitted from the light exit surface.

The light incident on the light incident surface is reflected on the side surface inclined at the predetermined angle. Therefore, even when the light is caused to enter the light incident surface provided on the rear surface side, light having no unevenness may be emitted from the light exit surface.

The side surface is provided, and hence the light incident on the light incident surface may be reflected on the side surface. Therefore, even when the inclined angle of the light incident surface relative to the reference plane is increased, the light incident on the light incident surface may be simply guided in the center direction of the light guide plate.

As described in this embodiment, when the inclined angle θ1 of the first light incident surface 152d relative to the reference plane S is set to 90°, that is, when the first light incident surface 152 and the light exit surface are provided parallel to each other, the area of the light emitting surface of the light source may further be increased.

As described above, even in the case of the planar illumination device in which the light is caused to enter the end portion of the rear surface of the light guide plate, when a scattering cross section of scattering particles contained in the light guide plate 152 is expressed by $\Phi$, a distance between a contact between the side surface (first side surface 152f or second side surface 152g) of the light guide plate 152 and the light incident surface, that is, an end portion of the light guide plate, and a position in which a thickness (thickness (length) in direction perpendicular to light exit surface) of the light guide plate 152 is maximum, in a direction which is parallel to the light exit surface 152a and perpendicular to a tangent to the light exit surface 152a and the side surface, is expressed by $L_G$, a density of the scattering particles (number of particles per unit volume) contained in the light guide plate 152 is expressed by $N_p$, and a correction coefficient is expressed by $K_C$, it is preferable to satisfy a relationship in which a value of $\Phi \cdot N_p \cdot L_G \cdot K_C$ is equal to or larger than 1.1 and equal to or smaller than 8.2 and a value of the correction coefficient $K_C$ is equal to or larger than 0.005 and equal to or smaller than 0.1. The light guide plate 18 contains the scattering particles satisfying the relationship as described above, and hence illumination light, which is uniform and has less brightness unevenness may be emitted from the light exit surface 152a.

Even when the side surface is formed, a desirable mode is identical to that of the embodiment described above. For example, the inclined angle θ=θ1 is preferably set to satisfy 15°≦θ≦90°.

Hereinafter, the planar illumination device according to the present invention is described in more detail with reference to a specific example.

In this example, substantially the same size and structure as in the planar illumination device 10 were employed except for the point that θ=90°, that is, the inclined angle of the light emitting surface 40a of the LED chip of the light source, the shape of the upper guide reflection plate was the shape illustrated in the planar illumination device 110, and the length L of the upper guide reflection plate was set to 10 mm. The light use efficiency [%] of the light source of the planar illumination device 110 was measured. Light use efficiency [%] of the light source of a planar illumination device in which θ=45°, the length L of the upper guide reflection plate was set to 10 mm, and the light incident surface of the light guide plate and the light exit surface of the light source were provided parallel to the reference plane, was also measured.

Results obtained by measurement are illustrated in Table 6.

TABLE 6

| θ | 45 | 90 |
|---|---|---|
| Light use efficiency | 48.30% | 49.50% |

As is apparent from Table 6, even in the case of θ=90°, the light use efficiency may be increased as in the case of θ=45°.

Such a planar illumination device may be used as a planar illumination device for illuminating indoors and outdoors, a backlight for illuminating a liquid crystal panel of a liquid crystal display device, or a backlight for an advertising panel, an advertising tower, or a signboard.

For example, when a liquid crystal panel in which characters, figures, or images are displayed on a surface of the liquid crystal display panel 4 based on the fact that an electric field is partially applied to liquid crystal molecules oriented in advance in a specific direction to change the orientation of the molecules, thereby changing a refractive index in a liquid crystal cell, is provided on the light exit surface of the planar illumination device, and when the liquid crystal panel is illuminated with light emitted from the planar illumination device, a liquid crystal display device may be realized.

In all of the embodiments described above, the rear surface of the light guide plate has the curved shape. However, the present invention is not limited to this.

Hereinafter, another embodiment of the present invention is described.

Figure 24:
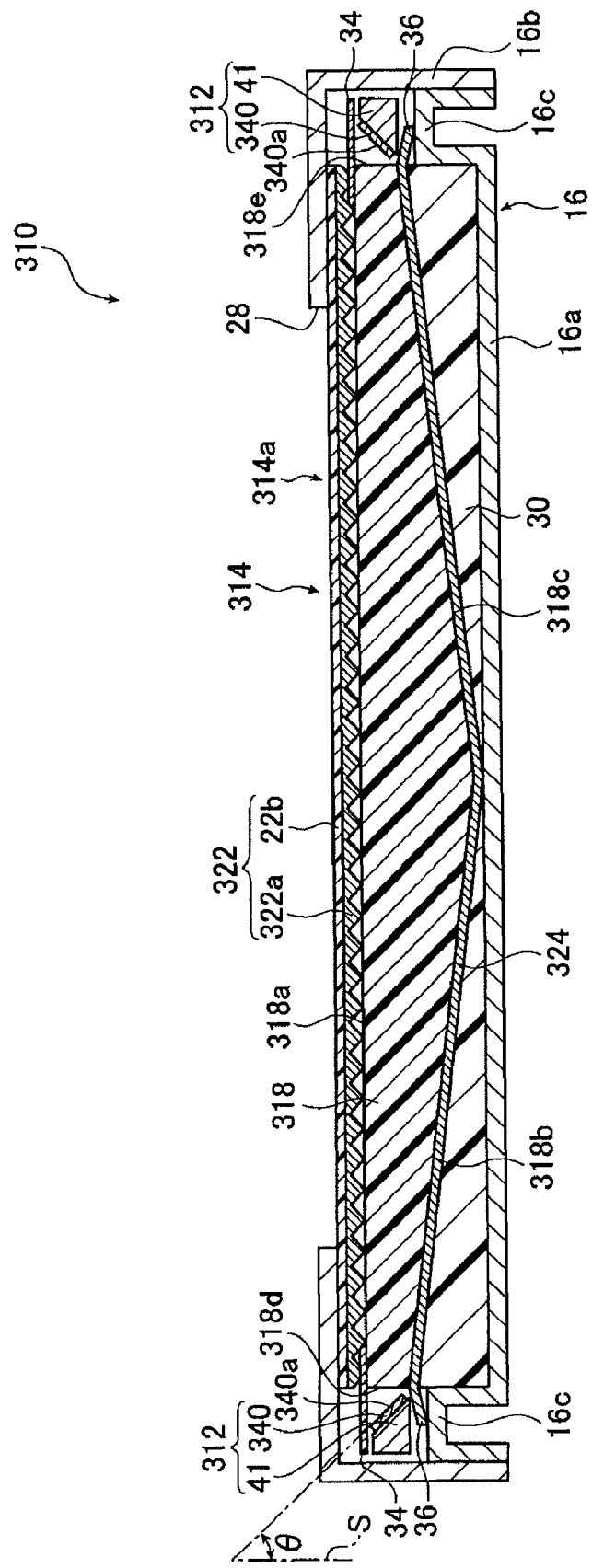
FIG. 24 is a cross sectional view illustrating another example of the schematic structure of the planar illumination device according to the present invention.

FIG. 24 is a schematic cross sectional view illustrating a schematic structure of a planar illumination device according to another embodiment of the present invention.

As illustrated in the drawing, a planar illumination device 300 includes light sources 312, an illumination device main body 314 for emitting uniform light from a rectangular-shaped light exit surface 314a, and a case 316 which accommodates the illumination device main body 314 and the light sources 312. As described later, the case 316 includes a main body portion 316a and an edge portion 316b.

The planar illumination device 300 fundamentally has the same structure as the planar illumination device 10. Therefore, the same constituent elements in both the planar illumination device 300 and the planar illumination device 10 are expressed by the same reference symbols and the detailed description thereof is omitted. Hereinafter, portions specific to the planar illumination device 300 are intensively described.

As in the light source 12, the light source 312 includes a plurality of light emitting diode chips (hereinafter referred to as "LED chips") 340 and a light source support portion 41.

Each of the LED chips 340 has a light emitting surface 340a with a predetermined area and emits white light from the light emitting surface 40.

The LED chip 340 according to this embodiment is a monochromatic LED adapted to convert the light emitted from the LED into white light using a fluorescent material. When a GaN base blue LED is used as a monochromatic LED, for example, white light may be obtained using yttrium aluminum garnet (YAG) base fluorescent material.

The light source support portion 41 has the same structure as the light source support portion 41 of the planar illumination device 10 described above.

Figure 25:
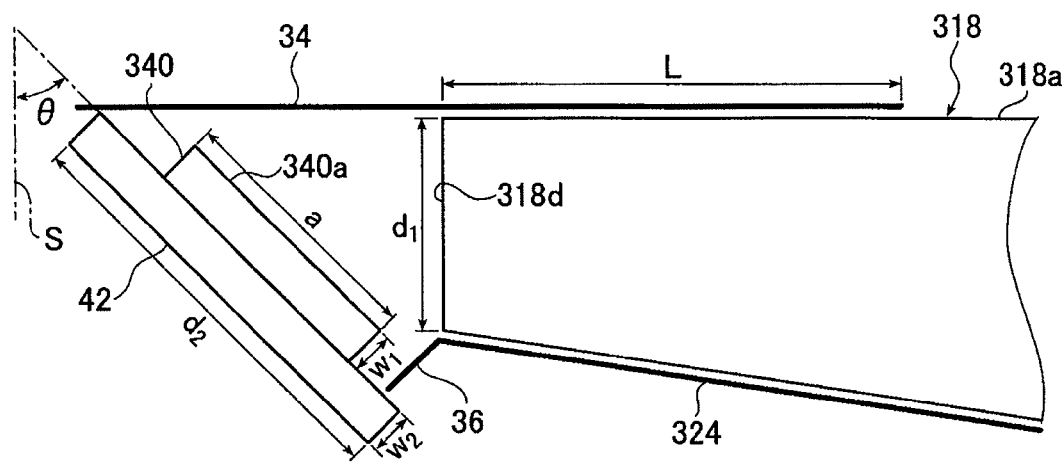
FIG. 25 is an enlarged cross sectional view illustrating an enlarged part of the planar illumination device illustrated in FIG. 24.

As illustrated in FIG. 25, the LED chip 340 and the array board 42 are inclined at a predetermined angle relative to a direction perpendicular to a light exit surface 318a of a light guide plate 318. In other words, the LED chip 340 is provided such that the light emitting surface 340a thereof is inclined at the predetermined angle relative to the direction perpendicular to the light exit surface 318a of the light guide plate 318 described later.

As illustrated in FIG. 24, the illumination device main body 314 fundamentally includes the light guide plate 318, an optical member unit 322, a reflection plate 324, the upper guide reflection plates 34, and the lower guide reflection plates 36.

Hereinafter, the optical members included in the illumination device main body 314 are described in detail.

First, the light guide plate 318 is described.

As illustrated in FIG. 24, the light guide plate 318 includes: a flat light exit surface 318a having a substantially rectangular shape; two light incident surfaces (first light incident surface 318d and second light incident surface 318e) formed substantially perpendicular to the light exit surface 318a at both ends of the light exit surface 318a; and two inclined surfaces (first inclined surface 318b and second inclined surface 318c) which are located on an opposite side of the light exit surface 318a, are symmetrical with respect to, as the center axis, the bisector α (see FIG. 1) which is parallel to the first light incident surface 318d and the second light incident surface 318e and divides the light exit surface 318a into two, and are inclined at a predetermined angle with respect to the light exit surface 318a. The first inclined surface 318b and the second inclined surface 318c are inclined such that a distance thereof from the light exit surface 318a increases (becomes larger) with increases in distances from the first light incident surface 318d and the second light incident surface 318e, that is, such that a thickness of the light guide plate in the direction perpendicular to the light exit surface increases with a shift from each of the first light incident surface 318d and the second light incident surface 318e to the center of the light guide plate. In other words, the light guide plate 318 becomes thinnest at both ends, that is, at the first light incident surface 318d and the second light incident surface 318e, and has a maximum thickness at the central portion, that is, at the position of the bisector α on which the first inclined surface 318b and the second inclined surface 318c intersect with each other. The inclined angle of the first inclined surface 318b and the second inclined surface 318c relative to the light exit surface 318a is not particularly limited.

The respective light sources 312 are opposed to the first light incident surface 318d and the second light incident surface 318e of the light guide plate 318. That is, in the planar illumination device 310, the two light sources 312 are provided so as to sandwich the light guide plate 318. In other words, the light guide plate 318 is interposed between the two light sources 312 opposed to each other at a predetermined interval.

As in the case of the light guide plate 18, in the light guide plate 318 illustrated in FIG. 24, light beams incident on the first light incident surface 318d and the second light incident surface 318e pass through the inner portion of the light guide plate 318 while being scattered by scatterers (described in detail later) contained in the inner portion of the light guide plate 318, and then are directly emitted from the light exit surface 318a or reflected on the first inclined surface 318b and the second inclined surface 318c to be emitted therefrom. At this time, there is a case where a part of light is leaked from the first inclined surface 318b and the second inclined surface 318c. However, the leaked light is reflected on the reflection plate 324 covering the first inclined surface 318b and the second inclined surface 318c of the light guide plate 318 and incident on the inner portion of the light guide plate 318 again.

Even in this embodiment, when a scattering cross section of scattering particles contained in the light guide plate 318 is expressed by Φ, a length between the first light incident surface 318d or the second light incident surface 318e of the light guide plate 318 and a position in which a thickness in a direction orthogonal to the light exit surface 318a is maximum, in a light incident direction (direction parallel to a traveling direction of light incident on the light guide plate or direction which is parallel to the light exit surface and perpendicular to a tangent to the light exit surface and the light incident surface (first light incident surface 318d or second light incident surface 318e)), that is, in this embodiment, a half length (length to a position of bisector a) of the light guide plate in the light incident direction (in this embodiment, direction perpendicular to the first light incident surface 318d of the light guide plate 318, hereinafter also referred to as "optical axis direction"), is expressed by $L_G$, a density of the scattering particles (number of particles per unit volume) contained in the light guide plate 318 is expressed by $N_p$, and a correction coefficient is expressed by $K_C$, it is preferable to satisfy a relationship in which a value of $\Phi \cdot N_p \cdot L_G \cdot K_C$ is equal to or larger than 1.1 and equal to or smaller than 8.2 and a value of the correction coefficient $K_C$ is equal to or larger than 0.005 and equal to or smaller than 0.1. When the scattering particles contained in the light guide plate 318 satisfies the relationship as described above, illumination light which is uniform and has less brightness unevenness may be emitted from the light exit surface 318a.

Hereinafter, the light guide plate 318 is described in more detail with reference to a specific example.

As in the case of the light guide plate 18, the scattering cross section Φ, the particle density $N_p$, the half length $L_G$ of the light guide plate in the optical axis direction, and the correction coefficient $K_C$ were set to various values, light use efficiencies of respective light guide plates having different values of $\Phi \cdot N_p \cdot L_G \cdot K_C$ were calculated by computer simulation and illuminance unevenness evaluation was performed.

According to the evaluation, the same results as in Table 1 and FIG. 6 were obtained.

As is apparent from Table 1 and FIG. 6, even in the case of the light guide plate 318, when $\Phi \cdot N_p \cdot L_G \cdot K_C$ is set to a value equal to or larger than 1.1, the light use efficiency may be increased, more specifically, light use efficiency equal to or larger than 50% may be obtained. In addition, when $\Phi \cdot N_p \cdot L_G \cdot K_C$ is set to a value equal to or smaller than 8.2, illuminance unevenness equal to or smaller than 150% may be obtained.

It is apparent that, when $K_C$ is set to a value equal to or larger than 0.005, the light use efficiency may be increased. It is apparent that, when $K_C$ is set to a value equal to or smaller than 0.1, the illuminance unevenness of light emitted from the light guide plate may be reduced.

Next, light guide plates having various values of the particle density $N_p$ of fine particles kneaded or dispersed in the light guide plate were prepared, and illuminance distributions of light emitted from various positions of the light exit surfaces of the respective light guide plates were measured. In this embodiment, the conditions other than the particle density $N_p$, more specifically, the scattering cross section Φ, the half length $L_G$ of the light guide plate in the optical axis direction, the correction coefficient $K_C$, and the shape of the light guide plate were set to the same values. Therefore, in this embodiment, $\Phi \cdot N_p \cdot L_G \cdot K_C$ changes proportionally to the particle density $N_p$.

FIG. 25 illustrates results obtained by measuring the illuminance distributions of light emitted from the respective light exit surfaces of the light guide plates having various particle densities. In FIG. 25, the ordinate indicates illuminance [lx] and the abscissa indicates a distance (light guide length) [mm] from one of the light incident surfaces of the light guide plate.

As in the case of the light guide plate 18, when maximum illuminance, minimum illuminance, and average illuminance of light emitted from a side wall of the light guide plate in a measured illuminance distribution are expressed by $I_{Max}$, $I_{Min}$, and $I_{Ave}$, respectively, illuminance unevenness was calculated by $[(I_{Max}-I_{Min})/I_{Ave}]\times 100$ [%].

According to the calculation, the same results as that of FIG. 7 were obtained.

Figure 26:
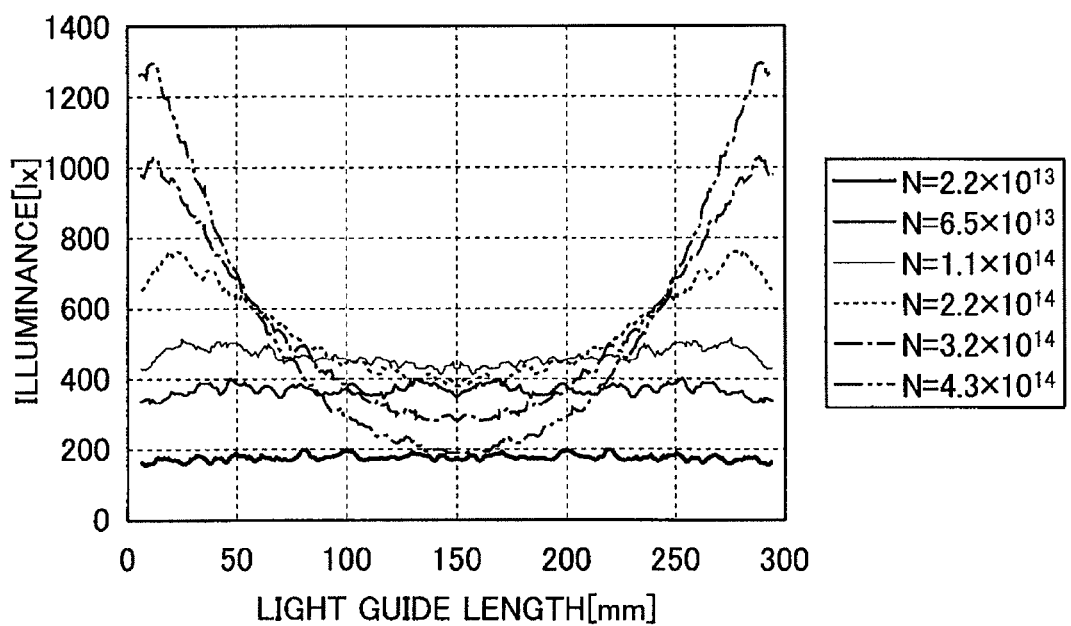
FIG. 26 illustrates results obtained by measuring illuminances of light beams emitted from respective light guides having different particle densities.

As is apparent from FIGS. 7 and 26, when the particle density is increased, that is, when $\Phi \cdot N_p \cdot L_G \cdot K_C$ is increased, the light use efficiency is improved and the illuminance unevenness becomes larger. It is apparent that, when the particle density is reduced, that is, when $\Phi \cdot N_p \cdot L_G \cdot K_C$ is reduced, the light use efficiency is reduced and the illuminance unevenness becomes smaller.

More specifically, when $\Phi \cdot N_p \cdot L_G \cdot K_C$ is set to a value equal to or larger than 1.1 and equal to or smaller than 8.2, the light use efficiency equal to or larger than 50% and the illuminance unevenness equal to or smaller than 150% may be obtained. When the illuminance unevenness equal to or smaller than 150% is obtained, less remarkable illuminance unevenness may be realized.

In other words, it is apparent that, when $\Phi \cdot N_p \cdot L_G \cdot K_C$ is set to a value equal to or larger than 1.1 and equal to or smaller than 8.2, the light use efficiency equal to or larger than a predetermined value may be obtained and the illuminance unevenness may be reduced.

The shape of the light guide plate is not limited to the shape described above, and thus various shapes in which the thickness of the light guide plate increases with the increase in distance from the light incident surface may be used.

For example, prism rows may be formed on the first inclined surface 318b and the second inclined surface 318c in the direction parallel to the first light incident surface 318d and the second light incident surface 318e. Further, instead of the prism rows, optical elements similar to prisms may be formed regularly. For example, optical elements having lens effects, such as lenticular lenses, concave lenses, convex lenses, or optical elements in pyramidal shape, may be formed on the inclined surfaces of the light guide plate.

The shape of the light guide plate is not limited to the shape of this embodiment, and thus may be, for example, a shape obtained by dividing the light guide plate illustrated in FIG. 2 into two by the bisector α, that is, a shape which has only a single light incident surface and whose thickness increases with the increase in distance from the light incident surface, in other words, a shape in which the light incident surface is a light incident surface formed at an end side of the light exit surface, the inclined surface is an inclined surface which is inclined such that the distance from the light exit surface increases with a shift from the light incident surface to another end surface opposed to the light incident surface, and the thickness is minimum at the light incident surface and maximum at the other end surface. The shape of the light guide plate may be a shape in which the light sources are provided on all side surfaces of the light guide plate, four side surfaces are used as light incident surfaces, and the thickness increases with a shift from the four light incident surfaces to the center, that is, a shape in which a surface located on an opposite side of the light exit surface of the light guide plate has a quadrangular pyramid shape, in other words, a shape in which the light incident surfaces are four light incident surfaces formed at four end sides of the light exit surface, the inclined surfaces are four inclined surfaces which are inclined such that distances from the light exit surface increase with shifts from the four light incident surfaces to the center, and the thickness is minimum at the light incident surfaces and maximum at an intersection of the four inclined surfaces.

Even in the case where the light guide plate is formed into the shape as described above, when the length between the light incident surface of the light guide plate and a position in which the thickness in the direction orthogonal to the light exit surface is maximum, in the light incident direction, is expressed by $L_G$, it is preferable to satisfy the relationship in which $\Phi \cdot N_p \cdot L_G \cdot K_C$ is equal to or larger than 1.1 and equal to or smaller than 8.2. When the relationship is satisfied, illuminance unevenness may be reduced and light having high light use efficiency may be emitted from the light exit surface.

Next, the optical member unit 322 is described.

The optical member unit 322 includes a prism sheet 322a and the diffusion film 22b.

As illustrated in FIG. 24, the prism sheet 322a is provided between the light guide plate 318 and the diffusion film 322b. That is, the prism sheet 322a is opposed to the light exit surface 318a of the light guide plate 318.

The prism sheet 322a is an optical member formed by arranging a plurality of slender prisms parallel to each other on a surface of a transparent sheet, and may improve the light condensing property of light emitted from the light exit surface of the light guide plate 318 to increase brightness. Respective prisms 322a of the prism sheet 322a are arranged such that the vertexes thereof are opposed to the light exit surface 318a of the light guide plate 318, that is, the vertexes thereof are provided in the downward direction in the drawing. In another mode, a second prism sheet having the same structure may be provided on the prism sheet 322a such that their prisms intersect with prisms. Another prism sheet having a structure in which a large number of triangular-pyramid-shaped (pyramid-shaped) prisms are arranged on a transparent sheet surface may be used.

The diffusion prism 22b is provided on a surface of the prism sheet 322a which is located on an opposite side of the light guide plate 318. That is, the prism sheet 322a and the diffusion film 22b are laminated on the light exit surface 318a of the light guide plate 318 in this order from the light exit surface 318a side.

In FIG. 24, the diffusion film 22b is provided on the prism sheet 322a. However, the arrangement location of the diffusion film 322b is not particularly limited. The diffusion film may be provided between the light guide plate 318 and the prism sheet 322a.

Next, the reflection plate 324 of the illumination device main body is described.

The reflection plate 324 is provided to reflect light leaked from the first inclined surface 318b and the second inclined surface 318c of the light guide plate 318, thereby causing the light to be incident on the light guide plate 318 again, and hence light use efficiency may be improved. The reflection plate 324 has a shape which corresponds to the first inclined surface 318b and the second inclined surface 318c of the light guide plate 318 and is formed to cover the first inclined surface 318b and the second inclined surface 318c. In this embodiment, the first inclined surface 318b and the second inclined surface 318c of the light guide plate 318 are formed into a triangular shape in cross section, and hence the reflection plate 324 is formed into a complementary shape thereto.

As in the case of the upper guide reflection plates 34 of the planar illumination device 10, the upper guide reflection plates 34 are provided between the light guide plate 18 and the prism sheet 20, that is, on the light exit surface 18a side of the light guide plate 18 so as to cover the light sources 12 and the end portions of the light exit surface 18a of the light guide plate 18.

As in the case of the lower guide reflection plates 36 of the planar illumination device 10, the lower guide reflection plates 36 are provided on an opposite side to the light exit surface 18a side of the light guide plate 18 so as to cover parts of the light sources 12. End portions of the lower guide reflection plates 36 which are located on the center side of the light guide plate are connected to the reflection plate 24.

The case 16 accommodates and supports the light sources 312 and the illumination device main body 314, and fundamentally includes the lower case 16a, the upper case 16b, and the folding member 16c. The case 16 has the same structure as the case 16 of the planar illumination device 10, and hence the detailed description thereof is omitted.

In the planar illumination device 310 according to this embodiment, the light guide plate support portion 30 is provided between the lower case 16a and the reflection plate 324. The power supply storing portion 32 (see FIG. 1) for storing a power supply (not shown) of the light sources 312 is attached to the rear side of the lower case 16a.

The planar illumination device 310 fundamentally has the structure as described above.

As illustrated in FIGS. 24 and 25, the LED chips 340 and the array board 42 in the light source 312 of the planar illumination device 310 according to this embodiment are inclined at the predetermined angle θ relative to the plane S which is perpendicular to the light exit surface 318a of the light guide plate 318 and parallel to the side in the long side direction of the first light incident surface 318d or the second light incident surface 318e (hereinafter also referred to as "reference plane S"). Specifically, the light emitting surface 340a of the LED chip 340 is inclined at the angle θ relative to the reference plane S. In other words, the light emitting surface 340a is provided at a position obtained by rotation from the reference plane S to the light exit surface 318a by the angle θ.

As described above, the light source 312 is inclined, and hence the light emitted from the light source whose light emitting surface is large may be allowed to efficiently enter the light guide plate. The light source whose light emitting surface is large is used, and hence the amount of light emitted from the light source may be increased. In other words, the light emitted from the light source whose light emitting surface is large is efficiently allowed to enter the light guide plate, and hence high-brightness light may be emitted from the light exit surface of the light guide plate.

Therefore, even in the case where the rear surface of the light guide plate has the shape other than the curved shape (in this embodiment, inclined surface having linear cross section), when the light source is inclined, the effect described above may be obtained.

Even in the case where the light emitting surface is inclined at the predetermined angle, when the upper guide reflection plate and the lower guide reflection plate are provided to reflect the light emitted from the light source, the light emitted from the light source may be prevented from being emitted without being incident on the light guide plate, and hence the light emitted from the light source may be allowed to efficiently enter the first light incident surface or the second light incident surface of the light guide plate.

In the LED chip 340 of the light source 312, the length of the light emitting surface 340a in the inclined direction, that is, the length "a" of the light emitting surface 340a of the LED chip 340 in the direction orthogonal to the arrangement direction of the LED chips 340 in this embodiment (see FIG. 4) is preferably longer than the cross sectional length of the first light incident surface in the direction orthogonal to the light exit surface 318a at the first light incident surface 318d located on the edge side of the light exit surface 318a, in this embodiment, the length d1 of each of the first light incident surface 318d and the second light incident surface 318e of the light guide plate 318 in the direction perpendicular to the light exit surface 318a of the light guide plate 318 (hereinafter referred to as "effective cross sectional length d1 of light incident surface"), that is, the length of the light guide plate in the thickness direction in each of the first light incident surface 18d and the second light incident surface 18e.

When the length "a" of the light emitting surface 340a is set to a value larger than the effective cross sectional length d1 of the light incident surface, a larger amount of light may be emitted from the light emitting surface 340a.

In the case where the light emitting surface 340a is inclined at the predetermined angle θ relative to the reference plane S, even when the length "a" of the light emitting surface 340a is set to the value larger than the effective cross sectional length d1 of the light incident surface, the light may be allowed to efficiently enter the light guide plate, and the light whose brightness is high may efficiently be emitted from the light exit surface of the light guide plate as described above.

Figure 27A:
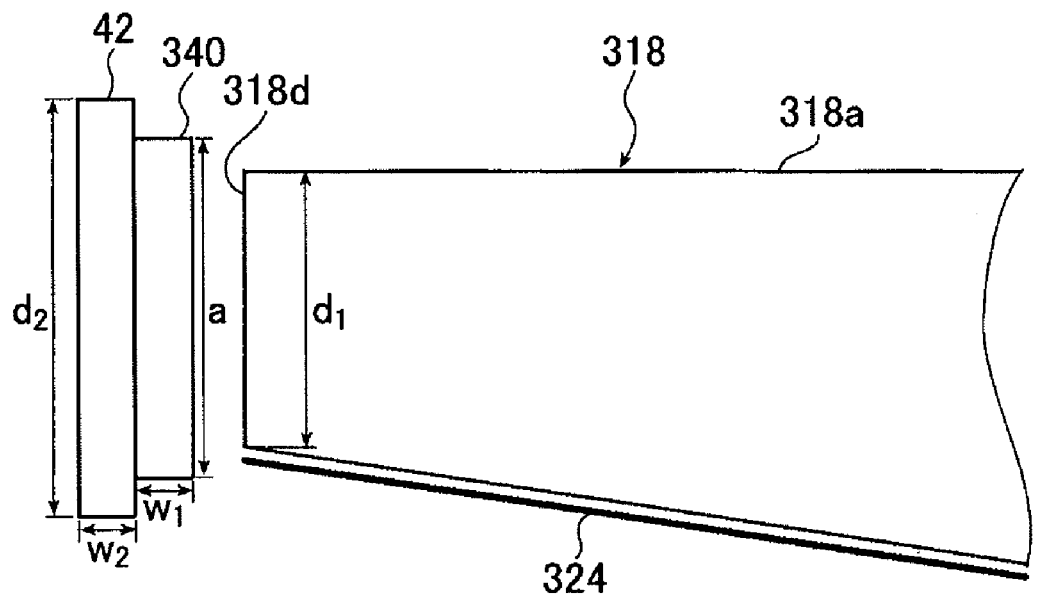
FIGS. 27A and 27B are enlarged cross sectional views illustrating respectively other examples of the schematic structure of the planar illumination device according to the present invention.
Figure 27B:
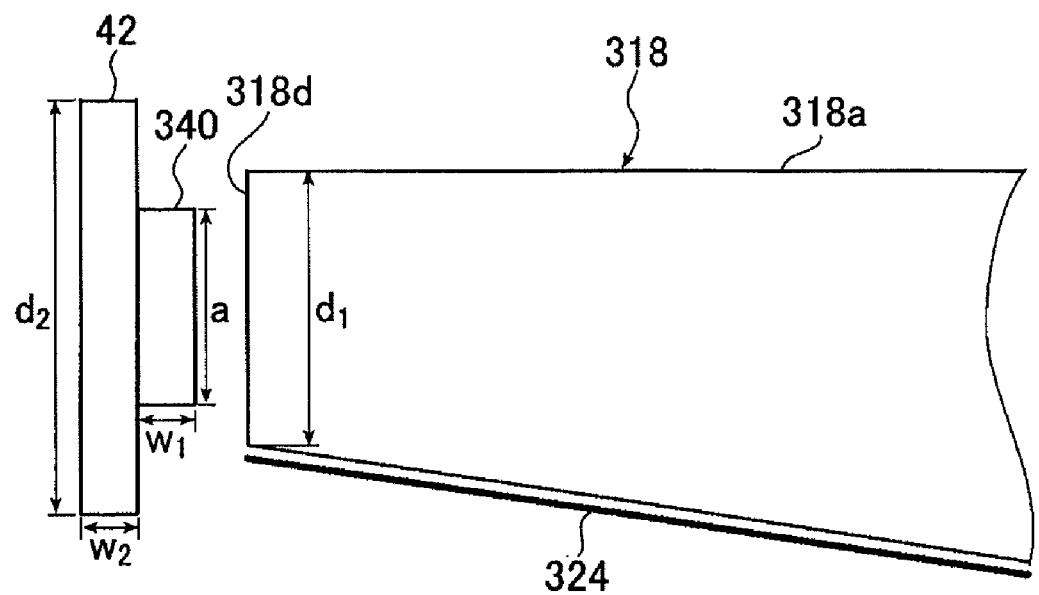

Even in this embodiment, a brightness distribution and light use efficiency were measured using a planar illumination device having the same shapes as the respective portions of the planar illumination device 10 except for the shapes of the inclined surfaces of the light guide plate and the shape of the reflection plane. More specifically, the light use efficiencies were measured in a case where the inclined angle θ of the light source is changed to various angles and in comparative cases where a light source of a=2.5 mm and a light source of a=1.45 mm are respectively provided at a position in which the inclined angle θ of the emitting surface 340a is equal to 0° as illustrated in FIGS. 27A and 27B.

According to the measurement, the same results as Table 3 and FIG. 18 were obtained.

Therefore, even in this embodiment, the inclined angle θ of the light emitting surface 40a relative to the reference plane S is preferably equal to or larger than 15° and equal to or smaller than 90°, that is, satisfies 15°≦θ≦90°, more preferably equal to or larger than 15° and equal to or smaller than 75°, that is, satisfies 15°≦θ≦75°.

As described above, the inclined angle θ of the light emitting surface 40a is set to satisfy 15°≦θ≦90°, and hence the light use efficiency may further be increased and the light emitted from the light exit surface may be made uniform. When the angle is set to satisfy 15°≦θ≦75°, the light use efficiency may further be increased and the light may be made more uniform.

Next, a planar illumination device according to another embodiment is described.

Figure 28:
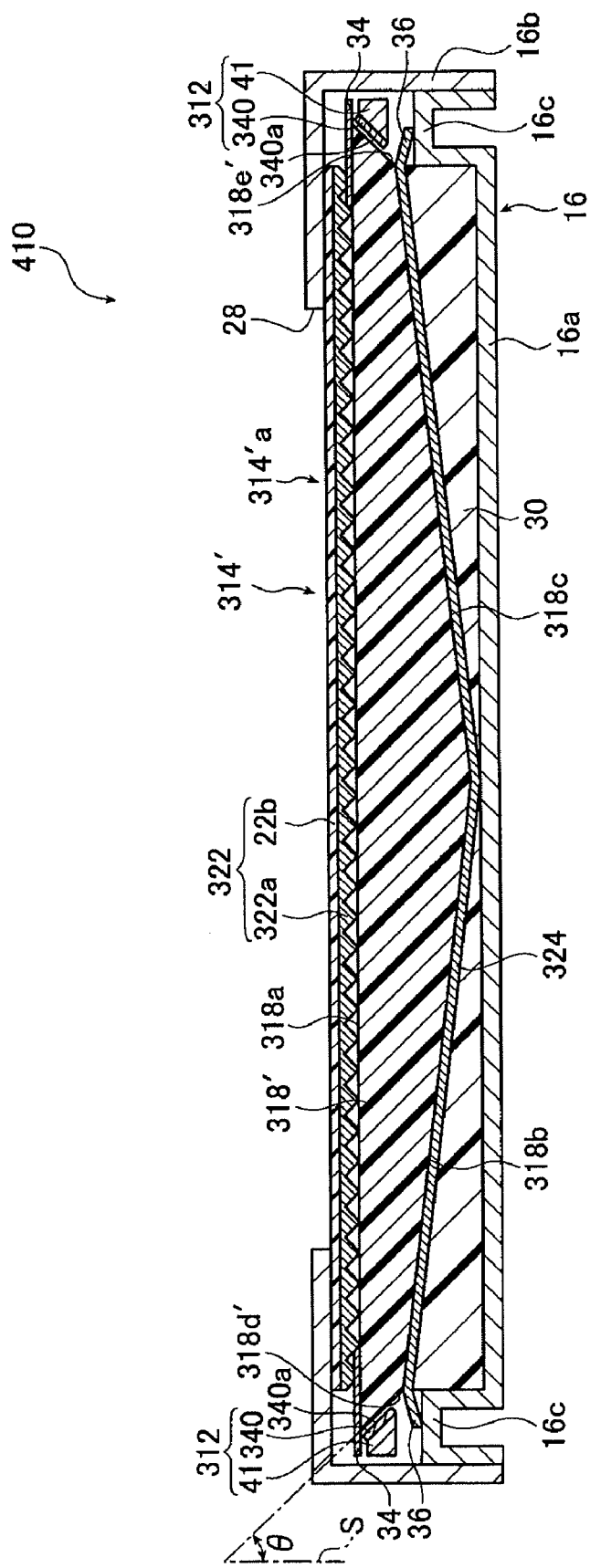
FIG. 28 is a cross sectional view illustrating a schematic structure of a planar illumination device according to another embodiment of the present invention.
Figure 29:
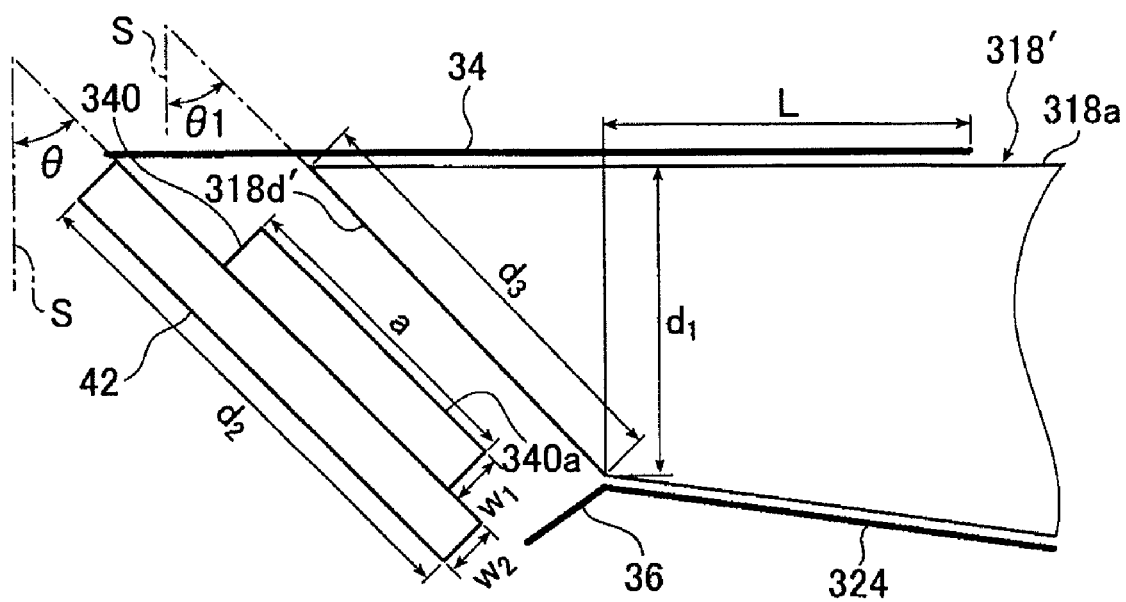
FIG. 29 is an enlarged cross sectional view illustrating an enlarged part of the planar illumination device illustrated in FIG. 28.

FIG. 28 is a schematic cross sectional view illustrating the planar illumination device according to the another embodiment of the present invention. FIG. 29 is an enlarged cross sectional view illustrating an enlarged part of the planar illumination device illustrated in FIG. 28.

A planar illumination device 410 illustrated in FIGS. 28 and 29 has the same structure as the planar illumination device 310 illustrated in FIGS. 24 and 25 except for a shape of a first light incident surface 318d' and a shape of a second light incident surface 318e' in a light guide plate 318'. Therefore, the same constituent elements in both devices are expressed by the same reference symbols and the detailed description thereof is omitted. Hereinafter, portions specific to the planar illumination device 410 are intensively described.

The planar illumination device 410 includes the light sources 312, an illumination device main body 314' for emitting uniform light from the rectangular-shaped light exit surface 314'a, and the case 16 which accommodates the illumination device main body 314' and the light sources 312. The illumination device main body 314' includes the light guide plate 318', the optical member unit 322, the reflection plate 324, the upper guide reflection plates 34, and the lower guide reflection plates 36. Note that the light sources 312, the case 16, the optical member unit 322, the reflection plate 324, the upper guide reflection plates 34, and the lower guide reflection plates 36 are identical to those in the planar illumination device 310 described above, and hence the detailed description thereof is omitted.

As illustrated in FIGS. 28 and 29, the light guide plate 318' includes: the flat light exit surface 318a having the substantially rectangular shape; the two light incident surfaces (first light incident surface 318d' and second light incident surface 318e') inclined at the predetermined angle θ1 relative to the reference plane S perpendicular to the light exit surface 318a at both ends of the light exit surface 318a; and the two inclined surfaces (first inclined surface 318b and second inclined surface 318c) which are located on the opposite side of the light exit surface 318a, are symmetrical with respect to, as the center axis, the bisector α (see FIG. 1) which is parallel to the first light incident surface 318d' and the second light incident surface 318e' and divides the light exit surface 318a into two, and are inclined at a predetermined angle with respect to the light exit surface 318a. The first inclined surface 318b and the second inclined surface 318c are inclined such that the distance from the light exit surface 318a increases (becomes larger) with increases in distances from the first light incident surface 318d' and the second light incident surface 318e', that is, such that the thickness of the light guide plate in the direction perpendicular to the light exit surface increases with a shift from each of the first light incident surface 318d' and the second light incident surface 318e' to the center of the light guide plate 318'. In other words, the light guide plate 318' becomes thinnest at both ends, that is, at the first light incident surface 318d' and the second light incident surface 318e', and has a maximum thickness at the central portion, that is, at the position of the bisector α on which the first inclined surface 318b and the second inclined surface 318c intersect with each other. The inclined angle of the first inclined surface 318b and the second inclined surface 318c relative to the light exit surface 318a is not particularly limited.

The respective light sources 312 are opposed to the first light incident surface 318d' and the second light incident surface 318e' of the light guide plate 318'. That is, in the planar illumination device 410, the two light sources 312 are provided so as to sandwich the light guide plate 318'. In other words, the light guide plate 318' is interposed between the two light sources 312 opposed to each other at a predetermined interval.

The planar illumination device 410 has a symmetrical shape with respect to the bisector α as the center axis as in the case of the planar illumination device 310 described above. Therefore, the first light incident surface side is typically described.

As illustrated in FIG. 29, in the planar illumination device 410 according to this embodiment, the inclined angle θ1 of the first light incident surface 318d' relative to the reference plane S is equal to the inclined angle θ relative to the reference plane S, of the light emitting surface 340a of the LED chip 340 of the light source 312 which is opposed to the first light incident surface 318d'. That is, the first light incident surface 318d' and the light emitting surface 340a are provided parallel to each other.

When the first light incident surface 318d' of the light guide plate 318 is inclined at the predetermined angle θ1 relative to the reference plane S, a surface area of the first light incident surface 318' may be made larger than a surface area of an effective cross section of the first light incident surface 318'. Therefore, the light emitted from the light emitting surface 340a of the light source 312 may be allowed to efficiently enter the light guide plate 318'.

When the first light incident surface 318d' is inclined as described in this embodiment, a cross section in a direction substantially orthogonal to the light exit surface 318a at the edge of the first light incident surface 318d' located on the light exit surface 318a side, that is, at a contact (tangent, that is, connection position) between the first light incident surface 318d' and the light exit surface 318a, is an effective cross section of the light incident surface.

As described in this embodiment, when the first light incident surface 318d' of the light guide plate 318 is provided parallel to the light emitting surface 340a of the light source 312, that is, when the inclined angle of the first light incident surface relative to the reference plane S is made equal to the inclined angle of the light emitting surfaces of the light sources opposed to each other, the light emitted from the light emitting surface 340a may be allowed to efficiently enter the first light incident surface 318d' of the light guide plate 318.

As described in this embodiment, the inclined angle θ1 of the first light incident surface 318d' is preferably to set to an angle equal to the inclined angle θ of the light emitting surface 340a of the light source. However, the present invention is not limited to this. The inclined angle θ1 may be different from the inclined angle θ. In other words, the light emitting surface 340a may be inclined at the predetermined angle relative to the first light incident surface 318d'.

Even in the case of the planar illumination device 410, the same results as that in the specific example of the planar illumination device 100 described above were obtained.

Therefore, when the light emitting surface of the light source and the light incident surface of the light guide plate are inclined at the predetermined angle as described in this embodiment, the substantially same light use efficiency as in the case where the light emitting surface 340a is provided at the position, that is, the angle to be parallel to the reference plane S, may be obtained, or the light use efficiency may be increased more than in the case where the light emitting surface 340a is provided at the position to be parallel to the reference plane S. In this embodiment, the light sources whose length "a" are equal to each other were used for comparison. However, when the light emitting surface is inclined, the area of the light emitting surface of the light source may further be increased. In other words, a larger amount of light may be allowed to enter the light guide plate to further increase brightness or illuminance of light emitted from the light source.

In this example, it is apparent that, when the inclined angle θ of the light emitting surface 340a and the inclined angle θ1 in the light guide plate are set to satisfy θ=θ1 and 15°≦θ≦60°, the light use efficiency may be increased more than in Comparative Example 2 in which the LED chip 340 is provided in which the length "a" of the light emitting surface 340a of the LED chip 340 in the direction orthogonal to the arrangement direction of the LED chips 340 is shorter than the effective cross sectional length of the light incident surface.

In other words, when the inclined angle θ of the light emitting surface and the inclined angle θ1 in the light guide plate are adjusted, the light emitted from the light source may be more efficiently allowed to enter the light guide plate to emit the light whose brightness and illuminance are higher from the light exit surface.

In this example, brightness distributions and illuminance distributions on the light exit surface were measured in a case where the inclined angle θ of the light emitting surface, the inclined angle θ1 in the light guide plate, and the distance L between the end portion of the first light incident surface 318d and the end portion of the upper guide reflection plate 34 which is located on the center side of the light guide plate 18, are set to the respective conditions of Table 5.

Figure 30:
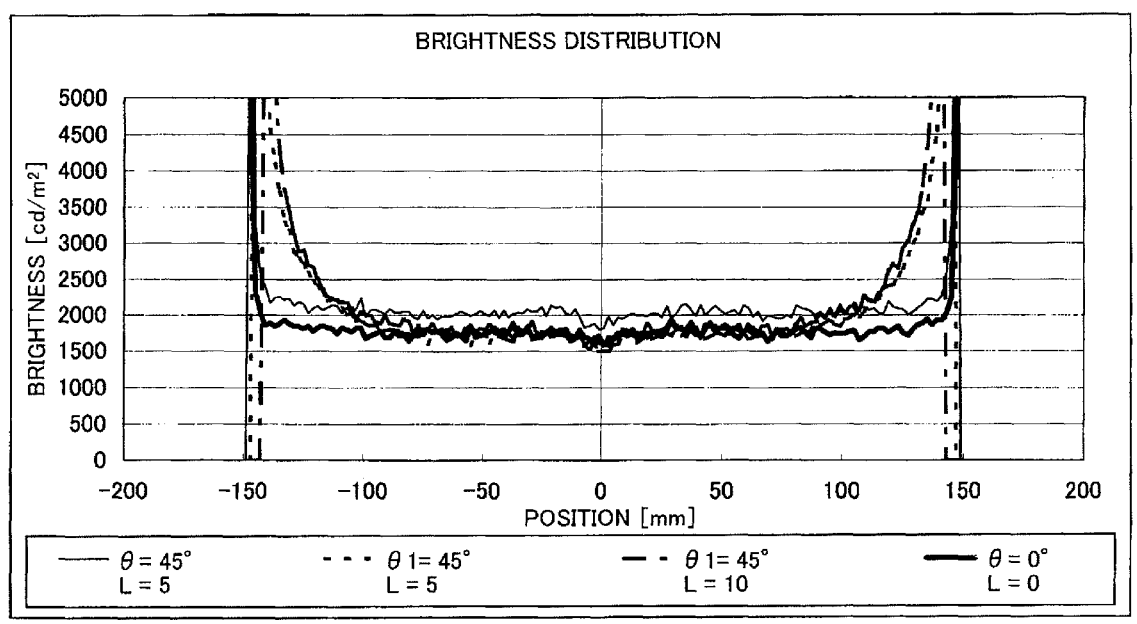
FIG. 30 is a graph illustrating brightness distributions of light emitted from a light exit surface of the planar illumination device at various values of each of an inclined angle between a light emitting surface of a light source and a light incident surface and an attachment length of an upper guide reflection plate.
Figure 31:
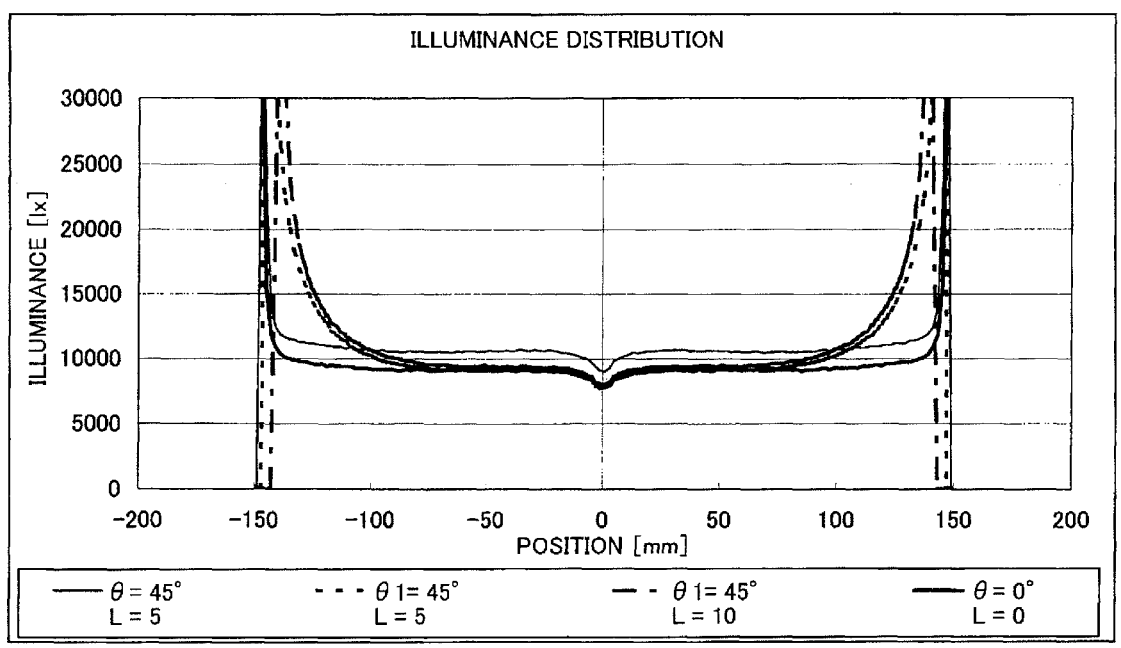
FIG. 31 is a graph illustrating illuminance distributions of light emitted from the light exit surface of the planar illumination device at various values of each of the inclined angle between the light emitting surface of the light source and the light incident surface and the attachment length of the upper guide reflection plate.

The measured brightness distributions are illustrated in FIG. 30 and the measured illuminance distributions are illustrated in FIG. 31. In FIG. 30, the ordinate indicates brightness (cd/m$^2$) and the abscissa indicates a distance [mm] from the center of the light guide plate. In FIG. 31, the ordinate indicates illuminance [1×] and the abscissa indicates a distance [mm] from the center of the light guide plate.

As is apparent from FIGS. 30 and 31, when the light emitting surface of the light source is inclined and the light incident surface of the light guide plate is inclined, brightness and illuminance at each position on the center side of the light guide plate may be increased.

Therefore, an effect of the present invention is apparent.

Figure 32A:
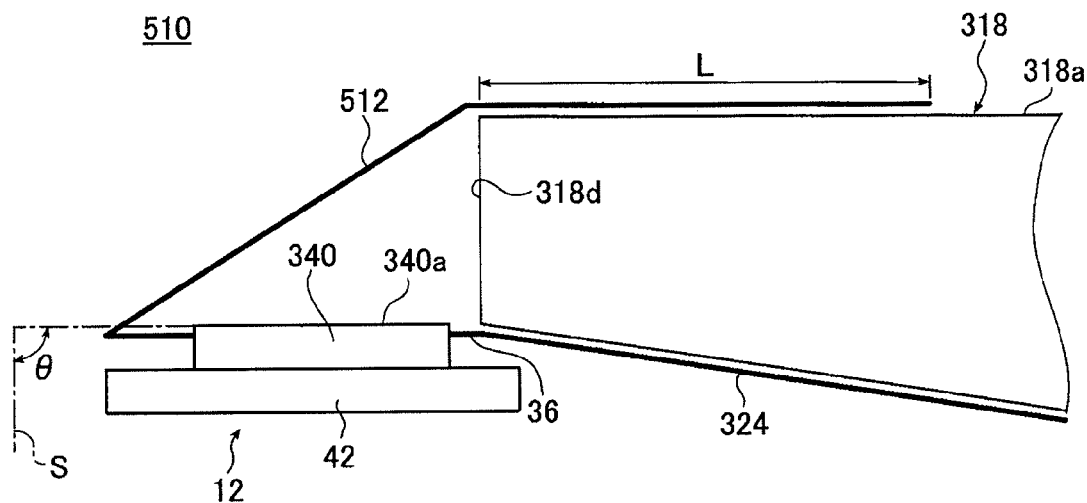
FIGS. 32A and 32B are enlarged cross sectional views illustrating respectively other examples of the schematic structure of the planar illumination device according to the present invention.

Even in the case of the planar illumination device having the light guide plate whose rear surface includes the inclined surfaces as described in this embodiment, as illustrated in FIG. 32A, the inclined angle θ of the light emitting surface 40a relative to the reference plane S in the light source 340 of a planar illumination device 510 may be set to 90°. In the planar illumination device 510, the light source 312 and the light guide plate 318 as illustrated in FIG. 24 are provided instead of the light source and the light guide plate in the planar illumination device 110 illustrated in FIG. 22A. The respective portions are the same members as the members described above, and hence the detailed description thereof is omitted.

Figure 32B:
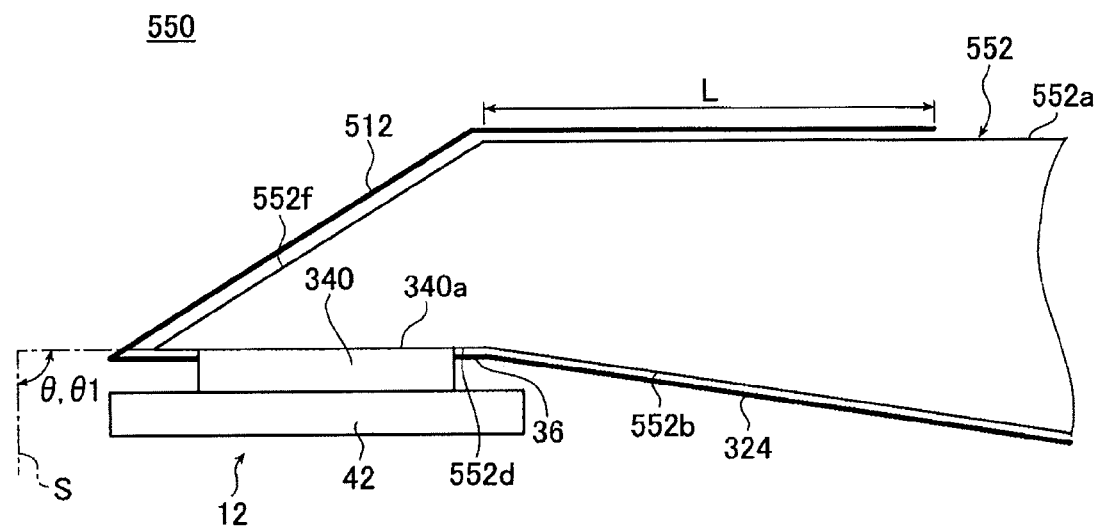

As illustrated in FIG. 32B, the inclined angle θ of the light emitting surface 340a relative to the reference plane S in a planar illumination device 550 may be set to 90° and a light incident surface 552 of a light guide plate 552 may be provided parallel to the light emitting surface 340a. In the planar illumination device 550, except for the point that the shape of the end portion of the light guide plate which is located on the light incident surface side is equal to that of the light guide plate 152 illustrated in FIG. 23, the other portions are identical to those in the planar illumination device 510, and hence the detailed description thereof is omitted.

Therefore, even when the light emitting surface of the light source is inclined at the predetermined angle relative to the reference plane, the light incident surface of the light guide plate is also inclined at the predetermined angle relative to the reference plane, and the side surface is provided between the light incident surface and the light exit surface of the light guide plate, the light emitted from the light source may be allowed to efficiently enter the light guide plate to improve the light use efficiency.

When the side surface is provided to the light guide plate and the light exit surface is provided on the inclined surface side, the area of the light emitting surface of the light source may further be increased, and hence the light whose brightness or illuminance is high may be emitted from the light exit surface. The light incident on the light incident surface is reflected on the side surface inclined at the predetermined angle. Therefore, even when light is allowed to enter the light incident surface provided on the inclined surface side, light having no unevenness may be emitted from the light exit surface.

Even in the case of the planar illumination device according to this embodiment, the same results as that in the specific example of the planar illumination device 110 described above were obtained.

Figure 33:
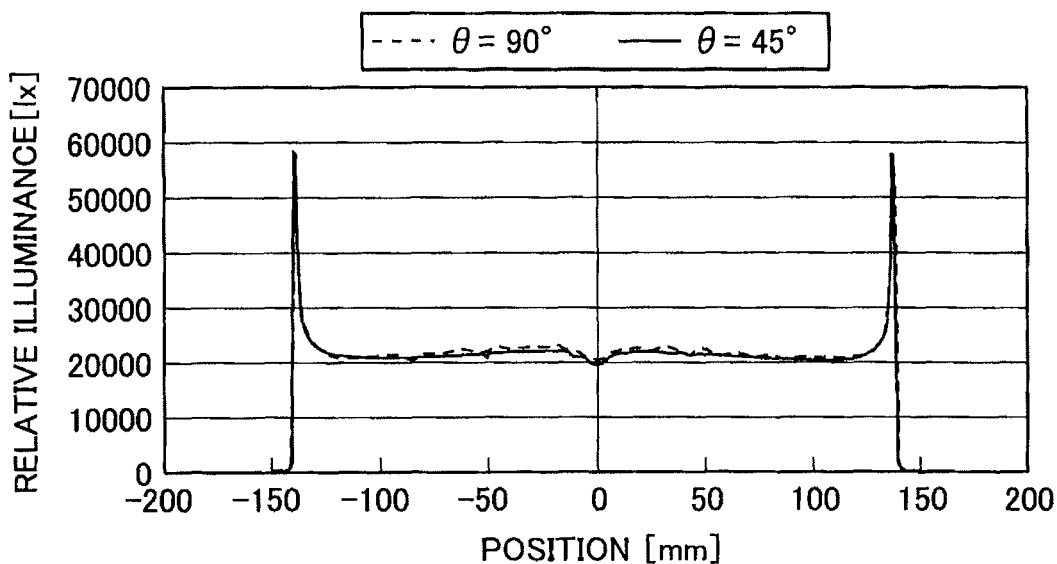
FIG. 33 is a graph illustrating illuminance distributions of light emitted from the light exit surface of the planar illumination device.

FIG. 33 is a graph illustrating an illuminance distribution measured in this embodiment. In FIG. 33, the ordinate indicates illuminance [1×] and the abscissa indicates a distance [mm] from the center of the light guide plate.

As is apparent from FIG. 33, uniform light may be emitted from the central portion of the light guide plate.

Therefore, an effect of the present invention is apparent.

The planar illumination devices according to the present invention are described in detail. The present invention is not limited to the embodiments described above, and thus various modifications and changes may be made without departing from the scope of the present invention.

In all of the embodiments described above, as illustrated in FIG. 2, the light guide plate support portion 30 made of a resin is provided between the lower case 16a and the reflection plate 324 to support the reflection plate 324 from the rear surface 18bc side of the light guide plate 18, thereby bringing the light guide plate 18 and the reflection plate 324 into close contact with each other. However, the present invention is not limited to this.

A buffer member is preferably provided on the surface of the reflection plate 324 which is located on an opposite side to the light guide plate 18, that is, provided between the lower case 16a and the reflection plate 324 in this embodiment. The buffer member is a member which is deformed along the shape of the light guide plate and has a lower rigidity than the light guide plate, and is, for example, a sponge.

When the reflection plate 324 and the rear surface 18b side of the light guide plate 18 are supported by the buffer member, the reflection plate 324 may be brought into close contact with the light guide plate 18, and hence the reflection plate 324 may be prevented from distorting. When the support is used as the buffer member, the light guide plate and the reflection plate may be brought into contact with each other without unevenness. Therefore, it is prevented that only a part of the reflection plate is in contact with the light guide plate to diffusely reflect light, which is to be visually recognized as a bright part of light emitted from the light exit surface, with the result that uniform light may be emitted from the light exit surface.

FIGS. 34A to 34D are exploded cross sectional views illustrating examples of a schematic structure of the buffer member for supporting the light guide plate and the reflection plate.

Figure 34A:
FIGS. 34A to 34D are exploded structural views illustrating respectively examples of a buffer member for supporting a light guide plate and a reflection plate.

For example, as illustrated in FIG. 34A, a rectangular-shaped buffer member 202 may be provided on a surface of the reflection plate 24 which is located on an opposite side to the light guide plate 18. The buffer member 202 is preferably made of a material in which a maximum stress applied from the buffer member 202 to the light guide plate 18 in a case where a planar illumination device is assembled, in this embodiment, a stress applied to a connection portion with the rear surface, is equal to or smaller than 5 [N/cm$^2$].

Figure 34B:
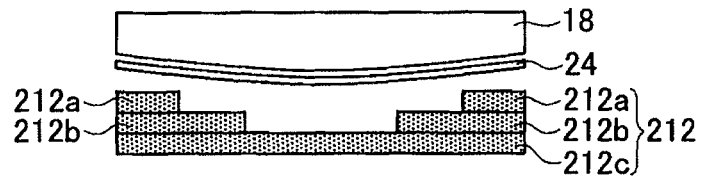

As illustrated in FIG. 34B, a buffer member 212 including multilayered buffers 212a, 212b, and 212c may be provided on the surface of the reflection plate 24 which is located on the opposite side to the light guide plate 18, and the thickness of the buffer member 212 may be changed according to positions depending on the shape of the light guide plate 18. When the thickness of the buffer member 212 is changed according to positions, a compression ratio of the buffer member may be reduced to lower the maximum stress applied to the light guide plate. Therefore, the stress applied to the light guide plate may be made more uniform, and hence the light guide plate and the reflection plate may be uniformly brought into close contact with each other.

Figure 34C:
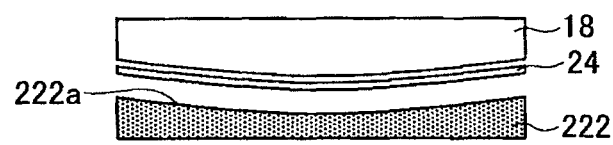

As illustrated in FIG. 34C, a buffer member 222 may be formed into a shape along the rear surface of the light guide plate 18. In other words, the buffer member 222 has a shape in which a curved surface 222a with the same shape as the rear surface of the light guide plate 18 is formed on the surface located on the light guide plate 18 side.

As described above, even when the buffer member is formed into the shape along the rear surface of the light guide plate, the light guide plate and the reflection plate may be uniformly brought into close contact with each other.

Figure 34D:
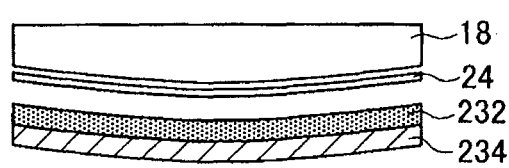

As illustrated in FIG. 34D, a structure may be employed in which a buffer member 232 is formed into a shape along the rear surface of the light guide plate 18, and a sheet metal member 234 is provided on the surface of the buffer member 232 which is located on the opposite side to the light guide plate 18 along the shape of the rear surface of the light guide plate 18.

When the sheet metal member 234 is provided on the surface of the buffer member 232 which is located on the opposite side to the light guide plate 18 along the shape of the rear surface of the light guide plate 18, a uniform compression ratio of the buffer member may be obtained. In addition, when the sheet metal member 234 supports the reflection plate through the buffer member, the light guide plate and the reflection plate may be brought into close contact with each other.

In FIGS. 34A to 34D, the case where the rear surface of the light guide plate is curved is described. However, even in the case where the rear surface has the two inclined surfaces as in the case of the light guide plate 318 illustrated in FIG. 24, the same is expected.

In all of the embodiments described above, the LED chips of the light source are arranged in the single direction in the single row. However, the present invention is not limited to this. A structure in which LED chips are arranged in a plurality of rows, that is, a structure in which LED chips are arranged in matrix may be employed. A structure in which a plurality of units in each of which LED chips are arranged on a support in a single row are stacked, that is, a stacked structure may be employed.

Meanwhile, in this embodiment, the plurality of LED chips are arranged in a row. However, the present invention is not limited to this. A structure in which only one LED chip is provided may be employed.

In this embodiment, due to the fact that the light emitted from the light source may efficiently be used, the light emitting surface of the light source is inclined at the predetermined angle relative to the direction orthogonal to the light exit surface of the light guide plate. However, the present invention is not limited to this. The light emitting surface of the light source may be provided perpendicularly to the light exit surface of the light guide plate.

In this embodiment, due to the fact that the structure may be simplified and a cost is low, the structure in which the YAG fluorescent material is applied to the light emitting surface of the blue LED in the LED chip of the light source is employed. However, the present invention is not limited to this. An LED chip having a structure in which a fluorescent material is provided on the light emitting surface of a monochromatic LED such as a red LED or a green LED may be used.

An LED unit having a structure in which three types of LEDs, that is, the red LED, the green LED, and the blue LED are combined may also be used as the light source. In this case, light beams emitted from the three types of LEDs may be mixed to obtain white light.

A semiconductor laser (LD) may be used instead of the LED.

The brightness distribution may be suitably achieved as the bell-shape and any of the planar illumination devices described above may be suitably used as a planar illumination device of a liquid crystal display device. Therefore, the shape of the light guide plate is preferably the curved shape in which the thickness increases with the shift from the end surface to the central portion as illustrated in FIG. 2. However, the present invention is not limited to the shapes of the embodiments. The shape of the light guide plate may be, for example, the shape obtained by dividing the light guide plate illustrated in FIG. 2 into two, that is, the shape which has only a single light incident surface and whose thickness increases with the increase in distance from the light incident surface, in other words, the shape in which the light incident surface includes a light incident surface formed at an end side of the light exit surface, the rear surface includes the curved surface (curved line in cross section) which is inclined such that the distance from the light exit surface increases with the shift from the light incident surface to another end surface opposed to the light incident surface and which has the inclined angle relative to the light exit surface which is reduced with the increase in distance from the light incident surface, the thickness is minimum at the light incident surface and maximum at the other end surface.

The shape of the light guide plate may be the shape in which the light sources are provided on all side surfaces of the light guide plate, the four side surfaces are used as light incident surfaces, and the thickness increases with the shift of the rear surface from the four light incident surfaces to the center, in other words, the shape in which four light incident surfaces are formed at four end sides of the light exit surface, the rear surface is the curved surface (curved line in cross section) which is inclined such that the distance from the light exit surface increases with the shift from the four light incident surfaces to the center, which has the inclined angle relative to the light exit surface which is reduced with the shift from the light incident surface to the central portion, and which has the inclined angle of zero degree at the central portion, and the thickness is minimum at the light incident surface and maximum at the central portion of the rear surface.

Even when the light guide plate is formed into such a shape, light may be sent to a position farther away from the light incident surface while a thin type is maintained, and the light use efficiency may further be improved. Therefore, the light guide plate may be reduced in thickness and the light exit surface may be increased in size. In addition, the light use efficiency may be improved.

Even when the light guide plate is formed into the shape as described above, when the length between the light incident surface of the light guide plate and a position in which the thickness in the direction orthogonal to the light exit surface is maximum, in the light incident direction, is expressed by $L_G$, it is preferable to satisfy the relationship in which $\Phi \cdot N_p \cdot L_G \cdot K_C$ is equal to or larger than 1.1 and equal to or smaller than 8.2. When the relationship is satisfied, illuminance unevenness may be reduced and light having high light use efficiency may be emitted from the light exit surface.

The light guide plate may be formed by mixing a transparent resin with a plasticizer.

Forming the light guide plate from a material thus prepared by mixing a transparent material with a plasticizer makes the light guide plate flexible, that is, provides a flexible light guide plate, allowing the light guide plate to be deformed into various shapes. Accordingly, the surface of the light guide plate may be formed into various curved surfaces.

When the light guide plate is made flexible in this manner, the light guide plate or the planar illumination device using the light guide plate may even be mounted to a wall having a curvature when used, for example, for a display board of ornamental lighting (illuminations). Accordingly, the light guide plate may be used for a wider variety of applications and in a wider application range including ornamental lighting and point-of-purchase (POP) advertising.

The plasticizer is exemplified by phthalates, or, specifically, dimethyl phthalate (DMP), diethyl phthalate (DEP), dibutyl phthalate (DBP), di(2-ethylhexyl) phthalate (DOP (DEHP)), di-n-octyl phthalate (DnOP), diisononyl phthalate (DINP), dinonyl phthalate (DNP), diisodecyl phthalate (DIDP), phthalic acid mixed-base ester ($C_6$ to $C_{11}$) (610P, 711P, etc.) and butyl benzyl phthalate (BBP). Besides phthalates, the plasticizer is also exemplified by dioctyl adipate (DOA), diisononyl adipate (DINA), dinormal alkyl adipate ($C_{6,8,10}$) (610A), dialkyl adipate ($C_{7,9}$) (79A), dioctyl azelate (DOZ), dibutyl sebacate (DBS), dioctyl sebacate (DOS), tricresyl phosphate (TCP), tributyl acetylcitrate (ATBC), epoxidized soybean oil (ESBO), trioctyl trimellitate (TOTM), polyesters, and chlorinated paraffins.

INDUSTRIAL APPLICABILITY

The planar illumination devices according to the present invention may be used as a planar illumination device (backlight unit) used for a liquid crystal display, an overhead projector, an advertising ornamental lighting signboard, and indoor and outdoor illumination.

The invention claimed is:

1. A planar illumination device comprising:
   a first light source and a second light source which are arranged at predetermined intervals;
   a light guide plate which is arranged between the first light source and the second light source and has:
      a light exit surface;
      a first light incident surface which is opposed to the first light source and includes a side of the light exit surface;
      a second light incident surface which is opposed to the second light source and includes an opposite side to the side; and
      a rear surface which is formed to be opposed to the light exit surface,
      wherein the light guide plate allows the light entered from the first and second light incident surfaces to travel along a first direction parallel to the light exit surface as well as to emit as the planar light from the light exit surface; and
   guide reflection plates which are arranged on a light exit surface side of the light guide plate and on a rear surface side of the light guide plate with respect to each of the first and second light incident surfaces of the light guide plate and which guide the light emitted from the first and second light sources to the first and second light incident surfaces, respectively,
   wherein a cross section on a plane perpendicular to the side, of the rear surface of the light guide plate has a curved line in which a distance from the light exit surface to the rear surface of the light guide plate along a direction normal to the light exit surface increases with a shift from the first light incident surface and the second light incident surface to a center of the light guide plate, an inclined angle relative to the light exit surface reduces with a shift from the first light incident surface or the second light incident surface to the center, and the inclined angle relative to the light exit surface is zero degrees at the center, wherein the first and second light sources have respective light emitting surfaces longer in length in a second direction substantially orthogonal to the light exit surface than effective cross sections of the first and second light incident surfaces obtained by projecting the first and second light incident surfaces of the light guide plate onto an orthogonal plane substantially orthogonal to the first direction and which are arranged such that the light emitting surfaces are inclined at a predetermined angle relative to the orthogonal plane and the light emitting surfaces are located toward the first and second light incident surfaces of the light guide plate, respectively, wherein the guide reflection plates include a first guide reflection plate attached to an end portion of the light exit surface of the light guide plate and a second guide reflection plate which is attached to an end portion of the inclined surface of the light guide plate and has an extension portion extending from an edge of the inclined surface to an outside of the inclined surface, and wherein the light emitted from the first and second light emitting surfaces of the first and second light sources are allowed to enter the first and second light incident surfaces of the light guide plate, converted into the planar light, and emitted as the planar light from the light exit surface.

2. The planar illumination device according to claim 1, wherein the cross section on the plane perpendicular to the side, of the rear surface of the light guide plate is expressed by a part of a curved line satisfying a higher-order polynomial expression.

3. The planar illumination device according to claim 2, wherein a function of the curved line expressing the cross section of the rear surface of the light guide plate on the plane perpendicular to the side is a function whose derivative has no discontinuity.

4. The planar illumination device according to claim 1, wherein the cross section on the plane perpendicular to the side, of the rear surface of the light guide plate is expressed by a part of a curved line satisfying the following expression (where $a_i$, $a_j$, $a_k$, $b_i$, $b_j$, and $b_k$ denote arbitrary real numbers, i, j, and k denote arbitrary natural numbers, $S_i$, $S_j$, and $S_k$ denote real numbers satisfying $-1 \leq S_i \leq 1$, $-1 \leq S_j \leq 1$, and $-1 \leq S_k \leq 1$, and $n_1$, $n_2$, and $n_3$ denote arbitrary natural numbers)

$$\sum_{i=1}^{n_1} S_i \left( \frac{x^{2i}}{a_i^{2i}} + \frac{y^{2i}}{b_i^{2i}} \right) + \sum_{j=1}^{n_2} S_j \left( \frac{x^{2j}}{a_j^{2j}} - \frac{y^{2j}}{b_j^{2j}} \right) + y^2 - \sum_{k=1}^{n_3} S_k (a_k (x^{2k})^2) = C.$$

[Equation 1]

5. The planar illumination device according to claim 1, wherein the cross section on the plane perpendicular to the side, of the rear surface of the light guide plate is expressed by a part of an ellipsoid.

6. The planar illumination device according to claim 1, wherein the cross section on the plane perpendicular to the side, of the rear surface of the light guide plate has a symmetrical shape with respect to a straight line which is perpendicular to the light exit surface and passes through an intermediate point between the first light incident surface and the second light incident surface.

7. The planar illumination device according to claim 1, wherein the light guide plate contains a large number of scattering particles, and when a scattering cross section of the scattering particles is expressed by $\Phi$, a density of the scattering particles is expressed by $N_p$, a correction coefficient is expressed by $K_C$, and a length between the first or second light incident surface of the light guide plate and a position in which a thickness of the light guide plate is maximum, in a light incident direction, is expressed by $L_G$, it is to satisfy inequalities $1.1 \leq \Phi \cdot N_p \cdot L_G \cdot K_C \leq 8.2$ and $0.005 \leq K_C \leq 0.1$.

8. The planar illumination device according to claim 1, wherein the light source includes:
at least one LED chip for emitting blue light from a light emitting surface; and
a fluorescent member which is arranged between the light emitting surface of the LED chip and the light guide plate and has:
a phosphor applying portion for converting the blue light emitted from the light emitting surface into white light and emitting the white light; and
a blue light transmission portion for emitting the blue light emitted from the light emitting surface as blue light.

9. A planar illumination device comprising:
a transparent light guide plate which has:
a light exit surface which emits planar light;
a light incident surface which is formed at an edge of the light exit surface and on which light enters; and
an inclined surface which is a surface located on an opposite side of the light exit surface and inclined such that a distance from the light exit surface increases with an increase in distance from the light incident surface;
wherein the transparent light guide plate allows the light entered from the light incident surface to travel along a first direction parallel to the light exit surface as well as to emit as the planar light from the light exit surface;
a light source which has a light emitting surface longer in length in a second direction substantially orthogonal to the light exit surface than an effective cross section of the light incident surface obtained by projecting the light incident surface of the transparent light guide plate onto an orthogonal plane substantially orthogonal to the first direction and which is arranged such that the light emitting surface is inclined at a predetermined angle relative to the orthogonal plane and the light emitting surface is located toward the light incident surface of the transparent light guide plate; and
guide reflection plates which are arranged on a light exit surface side of the transparent light guide plate and on an inclined surface side of the transparent light guide plate with respect to the light incident surface of the transparent light guide plate and which guide the light emitted from the light source to the light incident surface, wherein the guide reflection plates include a first guide reflection plate attached to an end portion of the light exit surface of the transparent light guide plate and a second guide reflection plate which is attached to an end portion of the inclined surface of the transparent light guide plate and has an extension portion extending from an edge of the inclined surface to an outside of the inclined surface, and wherein the light emitted from the light emitting surface of the light source is allowed to enter the light incident surface of the transparent light guide plate, converted into the planar light, and emitted as the planar light from the light exit surface.

10. The planar illumination device according to claim 9, wherein the light incident surface of the transparent light guide plate is a flat surface substantially orthogonal to the light exit surface at the edge of the light exit surface, the effective cross section of the light incident surface corresponds to the flat surface and the light emitting surface of the light source is substantially orthogonal to the flat surface.

11. The planar illumination device according to claim 9, wherein the light incident surface of the transparent light guide plate is a flat surface inclined relative to the orthogonal plane, and the effective cross section of the light incident surface corresponds to a cross section of the transparent light guide plate substantially orthogonal to the first direction along a cross line between the light incident surface and the inclined surface or a cross line between the light incident surface and the light exit surface.

12. The planar illumination device according to claim 9, wherein the inclined angle of the light emitting surface of the light source relative to the direction substantially orthogonal to the light exit surface is equal to or larger than 15 degrees and equal to or smaller than 90 degrees.

13. The planar illumination device according to claim 9, wherein the light source is a planar or linear light source which includes a plurality of light emitting diodes or semiconductor lasers arranged in array along a longitudinal direction of the light incident surface of the transparent light guide plate and an array board having a mounting surface which is inclined parallel to the light emitting surface, for mounting the light emitting diodes or the semiconductor lasers.

14. The planar illumination device according to claim 9, wherein the transparent light guide plate has a shape in which the light exit surface is rectangular,
the light incident surface includes two light incident surfaces formed at two opposed end sides of the light exit surfaces,
the inclined surface includes two inclined surfaces which are inclined such that distances from the light exit surface increase with shifts from the two opposed light incident surfaces to the center,
a thickness at the light incident surfaces is minimum and a thickness at an intersection of the two inclined surfaces is maximum.

15. The planar illumination device according to claim 9, wherein the transparent light guide plate has a shape in which the light exit surface is rectangular,
the light incident light is formed of a light incident surface formed at an end side of the light exit surface,
the inclined surface is formed of an inclined surface which are inclined such that a distance from the light exit surface increases with a shift from the light incident surface to another end surface opposed to the light incident surface, and
a thickness is minimum at the light incident surface and maximum at the another end surface.

16. The planar illumination device according to claim 9, wherein the transparent light guide plate has a shape in which the light exit surface is rectangular,
the light incident light includes four light incident surfaces formed at four end sides of the light exit surface,
the inclined surface includes four inclined surfaces which are inclined such that distances from the light exit surface increase with shifts from the four light incident surfaces to the center, and
a thickness at the light incident surfaces is minimum and a thickness at an intersection of the four inclined surfaces is maximum.

17. The planar illumination device according to claim 9, wherein
the transparent light guide plate contains a large number of scattering particles, and when a scattering cross section of the scattering particles is expressed by $\Phi$, a density of the scattering particles is expressed by $N_p$, a correction coefficient is expressed by $K_C$, and a length between the light incident surface of the transparent light guide plate in a light incident direction and a position in which a thickness in a direction perpendicular to the light exit surface is maximum, is expressed by $L_G$, it is to satisfy inequalities $$1.1 \leq \Phi \cdot N_p \cdot L_G \cdot K_C \leq 8.2 \text{ and}$$

$$0.005 \leq K_C \leq 0.1.$$

18. A planar illumination device comprising:
a transparent light guide plate which has:
a light exit surface for emitting planar light;
a side surface which is inclined at an angle larger than 90° relative to the light exit surface and formed at an edge of the light exit surface;
an inclined surface which is a surface located on an opposite side of the light exit surface and inclined such that a distance from the light exit surface increases with an increase in distance from the side surface; and
a light incident surface which is formed between the side surface and the inclined surface and enters incident light;
wherein the transparent light guide plate allows the light entered from the light incident surface to travel along a first direction parallel to the light exit surface as well as to emit as the planar light from the light exit surface;
a light source which has a light emitting surface longer in length in a second direction substantially orthogonal to the light exit surface than a cross section of the transparent light guide plate substantially orthogonal to the first direction along a cross line between the light incident surface and the inclined surface, and which is arranged such that the light emitting surface is inclined at a predetermined angle relative to the cross section and the light emitting surface is located toward the light incident surface of the transparent light guide plate; and
guide reflection plates include a first guide reflection plate which is attached to an end portion of the light exit surface of the transparent light guide plate and arranged to cover a part of the light exit surface of the transparent light guide plate which is located on the side surface side, and the side surface, and a second guide reflection plate which is attached to an end portion of the inclined surface of the transparent light guide plate and has an extension portion extending from an edge of the inclined surface to an outside of the inclined surface and arranged to cover a part of the inclined surface of the transparent light guide plate which is located on the light incident surface side, and which guides the light incident on the light incident surface in a center direction of the transparent light guide plate,
wherein the light emitted from the light emitting surface of the light source is allowed to enter the light incident surface of the transparent light guide plate, converted into the planar light, and emitted as the planar light from the light exit surface.

19. The planar illumination device according to claim 18, wherein
the light incident surface of the transparent light guide plate is formed parallel to the light exit surface and
the light source is arranged at an angle at which the light emitting surface is parallel to the light exit surface.

20. The planar illumination device according to claim 18, wherein
the transparent light guide plate contains a large number of scattering particles, and when a scattering cross section of the scattering particles is expressed by $\Phi$, a density of the scattering particles is expressed by $N_p$, a correction coefficient is expressed by $K_C$, and a length from a contact between the side surface and the light incident surface to a position in which a thickness in the direction perpendicular to the light exit surface is maximum, is expressed by LG, it is to satisfy inequalities $1.1 \leq \Phi \cdot Np \cdot LG \cdot KC \leq 8.2$ and $0.005 \leq KC \leq 0.1$.

* * * * *